(12) United States Patent
Fujisawa et al.

(10) Patent No.: US 10,510,212 B2
(45) Date of Patent: Dec. 17, 2019

(54) GAMING MACHINE

(71) Applicants: Universal Entertainment Corporation, Tokyo (JP); Aruze Gaming (Hong Kong) Limited, Kowloon (HK)

(72) Inventors: Masumi Fujisawa, Tokyo (JP); Yukinori Inamura, Tokyo (JP); Kenta Kitamura, Tokyo (JP)

(73) Assignees: UNIVERSAL ENTERTAINMENT CORPORATION, Tokyo (JP); ARUZE GAMING (HONG KONG) LIMITED, Kowloon (HK)

( * ) Notice: Subject to any disclaimer, the term of this patent is extended or adjusted under 35 U.S.C. 154(b) by 148 days.

(21) Appl. No.: 15/255,222

(22) Filed: Sep. 2, 2016

(65) Prior Publication Data

US 2017/0069170 A1    Mar. 9, 2017

(30) Foreign Application Priority Data

Sep. 3, 2015 (JP) ................................ 2015-174184
Sep. 3, 2015 (JP) ................................ 2015-174185
Sep. 3, 2015 (JP) ................................ 2015-174186
Jan. 13, 2016 (JP) ................................ 2016-004642

(51) Int. Cl.
| | | |
|---|---|---|
| *G07F 17/00* | (2006.01) | |
| *G07F 19/00* | (2006.01) | |
| *G07F 17/32* | (2006.01) | |
| *G07F 17/34* | (2006.01) | |
| *G06F 7/58* | (2006.01) | |

(52) U.S. Cl.
CPC ...... *G07F 17/3267* (2013.01); *G07F 17/3213* (2013.01); *G07F 17/3244* (2013.01); *G07F 17/34* (2013.01); *G06F 7/588* (2013.01)

(58) Field of Classification Search
CPC .. G07F 17/34; G07F 17/3213; G07F 17/3244; G07F 17/326; G07F 17/3267; G06F 7/588
See application file for complete search history.

(56) References Cited

U.S. PATENT DOCUMENTS

| | | | | |
|---|---|---|---|---|
| 4,527,798 A | * | 7/1985 | Siekierski | ............... G06F 7/588 |
| | | | | 463/17 |
| 2009/0117973 A1 | * | 5/2009 | Suda | ..................... G07F 17/323 |
| | | | | 463/20 |
| 2013/0288774 A1 | * | 10/2013 | Kondo | ................ G07F 17/3213 |
| | | | | 463/20 |
| 2015/0310699 A1 | * | 10/2015 | Meyer | ................... G07F 17/326 |
| | | | | 463/20 |

* cited by examiner

*Primary Examiner* — Milap Shah
(74) *Attorney, Agent, or Firm* — Lex IP Meister, PLLC

(57) ABSTRACT

A gaming machine which makes it possible to avoid monotonous game play is provided. At the start of each game play, gaming machine executes processes of: randomly selecting one of symbol random determination tables in which a probability of rearrangement of each symbol on each reel is defined, based on a symbol random determination table determination table in which a probability of random selection of one of the symbol random determination tables for each of the random determination tables; a symbol random determination process of randomly determining symbols to be rearranged based on the selected symbol random determination table; and displaying the determined symbols on a display device by rearranging the reels.

9 Claims, 53 Drawing Sheets

FIG.5

| NO. | FIRST REEL SYMBOL | SECOND REEL SYMBOL | THIRD REEL SYMBOL |
|---|---|---|---|
| 0 | FIRE7 | FIRE7 | FIRE7 |
| 1 | BLANK | BLANK | BLANK |
| 2 | 2BAR | 2BAR | 2BAR |
| 3 | BLANK | BLANK | BLANK |
| 4 | RED7 | RED7 | RED7 |
| 5 | BLANK | BLANK | BLANK |
| 6 | 1BAR | 1BAR | 1BAR |
| 7 | BLANK | BLANK | BLANK |
| 8 | 3BAR | 3BAR | 3BAR |
| 9 | BLANK | BLANK | BLANK |
| 10 | FIRE7 | 1BAR | FIRE7 |
| 11 | BLANK | BLANK | BLANK |
| 12 | 2BAR | 2BAR | 2BAR |
| 13 | BLANK | BLANK | BLANK |
| 14 | 1BAR | 1BAR | 1BAR |
| 15 | BLANK | BLANK | BLANK |
| 16 | RED7 | RED7 | RED7 |
| 17 | BLANK | BLANK | BLANK |
| 18 | 2BAR | 1BAR | 1BAR |
| 19 | BLANK | BLANK | BLANK |
| 20 | 3BAR | 3BAR | 3BAR |
| 21 | BLANK | BLANK | BLANK |
|  |  |  |  |

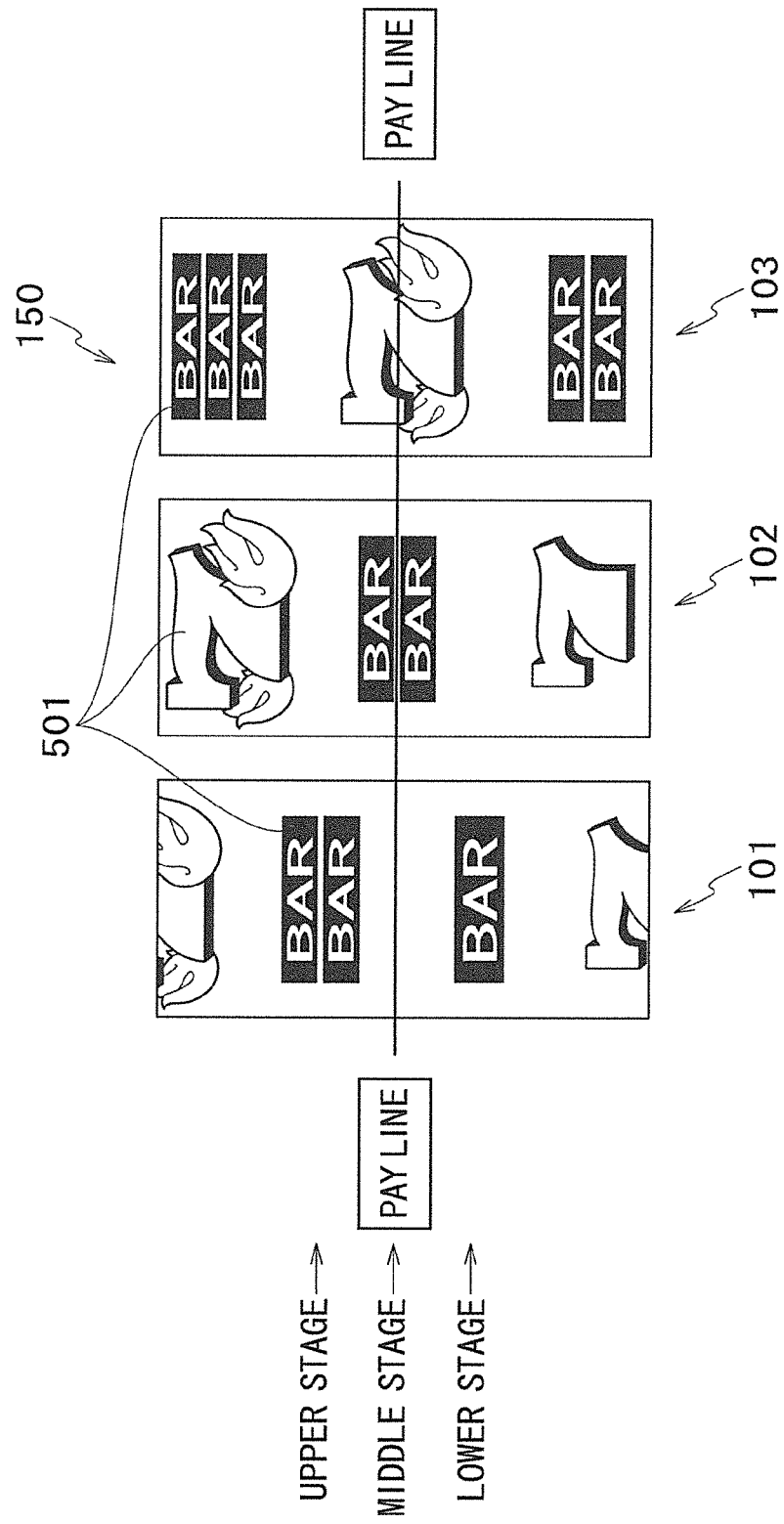

FIG.9

SYMBOL COMBINATION TABLE

| TYPES OF SYMBOLS \ NUMBER OF BETS | 1BET | 2BET | 3BET |
|---|---|---|---|
| FIRE7 | 0 | 500 | 1000※ |
| RED7 | 0 | 150 | 300 |
| ANY7 | 0 | 100 | 200 |
| 3BAR | 60 | 60 | 60 |
| 2BAR | 40 | 40 | 40 |
| 1BAR | 20 | 20 | 20 |
| ANY BAR | 10 | 10 | 10 |
| BLANK | 2 | 2 | 2 |

※WHEN THE GAME IS PLAYED WITH THREE BETS, PROGRESSIVE PAYOUT (INITIAL VALUE 1000 + INCREMENTED AMOUNT) IS AWARDED WHEN THREE "FIRE7" ARE REARRANGED ON A PAYLINE

FIG.10

(NORMAL MODE SYMBOL RANDOM DETERMINATION TABLE DETERMINATION TABLE)

| TYPES OF SYMBOL RANDOM DETERMINATION TABLES | WEIGHT |
|---|---|
| SYMBOL RANDOM DETERMINATION TABLE 0 | 5200/5542 |
| SYMBOL RANDOM DETERMINATION TABLE 1 | 100/5542 |
| SYMBOL RANDOM DETERMINATION TABLE 2 | 100/5542 |
| SYMBOL RANDOM DETERMINATION TABLE 3 | 96/5542 |
| SYMBOL RANDOM DETERMINATION TABLE 4 | 14/5542 |
| SYMBOL RANDOM DETERMINATION TABLE 5 | 14/5542 |
| SYMBOL RANDOM DETERMINATION TABLE 6 | 14/5542 |
| SYMBOL RANDOM DETERMINATION TABLE 7 | 2/5542 |
| SYMBOL RANDOM DETERMINATION TABLE 8 | 1/5542 |
| SYMBOL RANDOM DETERMINATION TABLE 9 | 1/5542 |
| TOTAL | 5542/5542 |

FIG.11

(1BET-2BET SYMBOL RANDOM DETERMINATION TABLE DETERMINATION TABLE)

| TYPES OF SYMBOL RANDOM DETERMINATION TABLES | WEIGHT |
|---|---|
| SYMBOL RANDOM DETERMINATION TABLE 0 | 3340/4168 |
| SYMBOL RANDOM DETERMINATION TABLE 1 | 280/4168 |
| SYMBOL RANDOM DETERMINATION TABLE 2 | 220/4168 |
| SYMBOL RANDOM DETERMINATION TABLE 3 | 200/4168 |
| SYMBOL RANDOM DETERMINATION TABLE 4 | 36/4168 |
| SYMBOL RANDOM DETERMINATION TABLE 5 | 30/4168 |
| SYMBOL RANDOM DETERMINATION TABLE 6 | 30/4168 |
| SYMBOL RANDOM DETERMINATION TABLE 7 | 21/4168 |
| SYMBOL RANDOM DETERMINATION TABLE 8 | 10/4168 |
| SYMBOL RANDOM DETERMINATION TABLE 9 | 1/4168 |
| TOTAL | 4168/4168 |

FIG.12

(HIGH-PROBABILITY MODE SYMBOL RANDOM DETERMINATION TABLE DETERMINATION TABLE)

| TYPES OF SYMBOL RANDOM DETERMINATION TABLES | WEIGHT |
|---|---|
| SYMBOL RANDOM DETERMINATION TABLE 0 | 20/644 |
| SYMBOL RANDOM DETERMINATION TABLE 1 | 50/644 |
| SYMBOL RANDOM DETERMINATION TABLE 2 | 60/644 |
| SYMBOL RANDOM DETERMINATION TABLE 3 | 80/644 |
| SYMBOL RANDOM DETERMINATION TABLE 4 | 300/644 |
| SYMBOL RANDOM DETERMINATION TABLE 5 | 100/644 |
| SYMBOL RANDOM DETERMINATION TABLE 6 | 10/644 |
| SYMBOL RANDOM DETERMINATION TABLE 7 | 6/644 |
| SYMBOL RANDOM DETERMINATION TABLE 8 | 17/644 |
| SYMBOL RANDOM DETERMINATION TABLE 9 | 1/644 |
| TOTAL | 644/644 |

FIG.13

(SYMBOL RANDOM DETERMINATION TABLE 0)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 4 | FIRE7 | 1 | FIRE7 | 1 |
| 1 | BLANK | 2 | BLANK | 6 | BLANK | 2 |
| 2 | 2BAR | 4 | 2BAR | 6 | 2BAR | 4 |
| 3 | BLANK | 2 | BLANK | 9 | BLANK | 2 |
| 4 | RED7 | 12 | RED7 | 1 | RED7 | 2 |
| 5 | BLANK | 2 | BLANK | 9 | BLANK | 2 |
| 6 | 1BAR | 4 | 1BAR | 8 | 1BAR | 4 |
| 7 | BLANK | 2 | BLANK | 6 | BLANK | 2 |
| 8 | 3BAR | 2 | 3BAR | 4 | 3BAR | 4 |
| 9 | BLANK | 1 | BLANK | 4 | BLANK | 2 |
| 10 | FIRE7 | 4 | 1BAR | 8 | FIRE7 | 1 |
| 11 | BLANK | 1 | BLANK | 4 | BLANK | 2 |
| 12 | 2BAR | 4 | 2BAR | 7 | 2BAR | 2 |
| 13 | BLANK | 2 | BLANK | 5 | BLANK | 2 |
| 14 | 1BAR | 4 | 1BAR | 4 | 1BAR | 2 |
| 15 | BLANK | 1 | BLANK | 9 | BLANK | 1 |
| 16 | RED7 | 8 | RED7 | 1 | RED7 | 1 |
| 17 | BLANK | 1 | BLANK | 8 | BLANK | 1 |
| 18 | 2BAR | 4 | 1BAR | 4 | 1BAR | 4 |
| 19 | BLANK | 2 | BLANK | 5 | BLANK | 2 |
| 20 | 3BAR | 4 | 3BAR | 5 | 3BAR | 2 |
| 21 | BLANK | 1 | BLANK | 6 | BLANK | 1 |
|  |  | 71 |  | 120 |  | 46 |

FIG.14 (SYMBOL RANDOM DETERMINATION TABLE 1)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 20 | FIRE7 | 1 | FIRE7 | 5 |
| 1 | BLANK | 1 | BLANK | 1 | BLANK | 30 |
| 2 | 2BAR | 1 | 2BAR | 1 | 2BAR | 1 |
| 3 | BLANK | 1 | BLANK | 10 | BLANK | 60 |
| 4 | RED7 | 1 | RED7 | 10 | RED7 | 10 |
| 5 | BLANK | 1 | BLANK | 10 | BLANK | 60 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 30 |
| 10 | FIRE7 | 20 | 1BAR | 1 | FIRE7 | 5 |
| 11 | BLANK | 1 | BLANK | 1 | BLANK | 30 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 10 | BLANK | 60 |
| 16 | RED7 | 1 | RED7 | 10 | RED7 | 10 |
| 17 | BLANK | 1 | BLANK | 10 | BLANK | 60 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 30 |
| 21 | BLANK | 1 | BLANK | 1 | BLANK | 1 |
|  |  | 60 |  | 76 |  | 400 |

FIG.15

(SYMBOL RANDOM DETERMINATION TABLE 2)

| NO. | FIRST REEL | | SECOND REEL | | THIRD REEL | |
|---|---|---|---|---|---|---|
| | SYMBOL | WEIGHT | SYMBOL | WEIGHT | SYMBOL | WEIGHT |
| 0 | FIRE7 | 1 | FIRE7 | 1 | FIRE7 | 1 |
| 1 | BLANK | 1 | BLANK | 1 | BLANK | 1 |
| 2 | 2BAR | 1 | 2BAR | 1 | 2BAR | 1 |
| 3 | BLANK | 1 | BLANK | 60 | BLANK | 60 |
| 4 | RED7 | 10 | RED7 | 10 | RED7 | 10 |
| 5 | BLANK | 1 | BLANK | 60 | BLANK | 60 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 1 | 1BAR | 1 | FIRE7 | 1 |
| 11 | BLANK | 1 | BLANK | 1 | BLANK | 1 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 60 | BLANK | 60 |
| 16 | RED7 | 10 | RED7 | 10 | RED7 | 10 |
| 17 | BLANK | 1 | BLANK | 60 | BLANK | 60 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 1 |
| | | 40 | | 276 | | 276 |

FIG.16

(SYMBOL RANDOM DETERMINATION TABLE 3)

| NO. | FIRST REEL | | SECOND REEL | | THIRD REEL | |
|---|---|---|---|---|---|---|
| | SYMBOL | WEIGHT | SYMBOL | WEIGHT | SYMBOL | WEIGHT |
| 0 | FIRE7 | 10 | FIRE7 | 10 | FIRE7 | 10 |
| 1 | BLANK | 1 | BLANK | 60 | BLANK | 60 |
| 2 | 2BAR | 1 | 2BAR | 1 | 2BAR | 1 |
| 3 | BLANK | 1 | BLANK | 1 | BLANK | 1 |
| 4 | RED7 | 1 | RED7 | 1 | RED7 | 1 |
| 5 | BLANK | 1 | BLANK | 1 | BLANK | 1 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 10 | 1BAR | 1 | FIRE7 | 60 |
| 11 | BLANK | 1 | BLANK | 1 | BLANK | 10 |
| 12 | 2BAR | 1 | 2BAR | 1 | 2BAR | 60 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 1 |
| 16 | RED7 | 1 | RED7 | 1 | RED7 | 1 |
| 17 | BLANK | 1 | BLANK | 1 | BLANK | 1 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 60 | BLANK | 60 |
| | | 40 | | 149 | | 276 |

FIG.17

(SYMBOL RANDOM DETERMINATION TABLE 4)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 30 | FIRE7 | 5 | FIRE7 | 1 |
| 1 | BLANK | 1 | BLANK | 1 | BLANK | 6 |
| 2 | 2BAR | 1 | 2BAR | 1 | 2BAR | 1 |
| 3 | BLANK | 1 | BLANK | 1 | BLANK | 60 |
| 4 | RED7 | 5 | RED7 | 40 | RED7 | 10 |
| 5 | BLANK | 1 | BLANK | 1 | BLANK | 60 |
| 6 | 1BAR | 1 | 1BAR | 1 | 1BAR | 1 |
| 7 | BLANK | 1 | BLANK | 1 | BLANK | 5 |
| 8 | 3BAR | 1 | 3BAR | 1 | 3BAR | 1 |
| 9 | BLANK | 1 | BLANK | 1 | BLANK | 6 |
| 10 | FIRE7 | 30 | 1BAR | 1 | FIRE7 | 1 |
| 11 | BLANK | 1 | BLANK | 1 | BLANK | 6 |
| 12 | 2BAR | 1 | 2BAR | 1 | 2BAR | 1 |
| 13 | BLANK | 1 | BLANK | 1 | BLANK | 5 |
| 14 | 1BAR | 1 | 1BAR | 1 | 1BAR | 1 |
| 15 | BLANK | 1 | BLANK | 1 | BLANK | 60 |
| 16 | RED7 | 5 | RED7 | 40 | RED7 | 10 |
| 17 | BLANK | 1 | BLANK | 1 | BLANK | 60 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 6 |
|  |  | 88 |  | 104 |  | 304 |

FIG.18

(SYMBOL RANDOM DETERMINATION TABLE 5)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 5 | FIRE7 | 40 | FIRE7 | 1 |
| 1 | BLANK | 1 | BLANK | 1 | BLANK | 1 |
| 2 | 2BAR | 1 | 2BAR | 1 | 2BAR | 1 |
| 3 | BLANK | 1 | BLANK | 1 | BLANK | 60 |
| 4 | RED7 | 20 | RED7 | 1 | RED7 | 10 |
| 5 | BLANK | 1 | BLANK | 5 | BLANK | 60 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 5 | 1BAR | 1 | FIRE7 | 1 |
| 11 | BLANK | 1 | BLANK | 1 | BLANK | 1 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 60 |
| 16 | RED7 | 20 | RED7 | 5 | RED7 | 10 |
| 17 | BLANK | 1 | BLANK | 1 | BLANK | 60 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 1 |
| | | 68 | | 69 | | 276 |

FIG.19

(SYMBOL RANDOM DETERMINATION TABLE 6)

| NO. | FIRST REEL | | SECOND REEL | | THIRD REEL | |
|---|---|---|---|---|---|---|
| | SYMBOL | WEIGHT | SYMBOL | WEIGHT | SYMBOL | WEIGHT |
| 0 | FIRE7 | 10 | FIRE7 | 10 | FIRE7 | 10 |
| 1 | BLANK | 1 | BLANK | 1 | BLANK | 60 |
| 2 | 2BAR | 1 | 2BAR | 1 | 2BAR | 1 |
| 3 | BLANK | 1 | BLANK | 1 | BLANK | 60 |
| 4 | RED7 | 1 | RED7 | 1 | RED7 | 10 |
| 5 | BLANK | 1 | BLANK | 1 | BLANK | 60 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 60 |
| 10 | FIRE7 | 10 | 1BAR | 1 | FIRE7 | 10 |
| 11 | BLANK | 1 | BLANK | 1 | BLANK | 60 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 60 |
| 16 | RED7 | 1 | RED7 | 1 | RED7 | 10 |
| 17 | BLANK | 1 | BLANK | 1 | BLANK | 60 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 60 |
| | | 40 | | 31 | | 530 |

FIG.20

(SYMBOL RANDOM DETERMINATION TABLE 7)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 40 | FIRE7 | 1 | FIRE7 | 10 |
| 1 | BLANK | 1 | BLANK | 1 | BLANK | 1 |
| 2 | 2BAR | 1 | 2BAR | 1 | 2BAR | 1 |
| 3 | BLANK | 1 | BLANK | 1 | BLANK | 1 |
| 4 | RED7 | 20 | RED7 | 60 | RED7 | 20 |
| 5 | BLANK | 1 | BLANK | 1 | BLANK | 1 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 40 | 1BAR | 1 | FIRE7 | 10 |
| 11 | BLANK | 1 | BLANK | 1 | BLANK | 1 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 1 |
| 16 | RED7 | 20 | RED7 | 60 | RED7 | 20 |
| 17 | BLANK | 1 | BLANK | 1 | BLANK | 1 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 1 |
|  |  | 138 |  | 140 |  | 78 |

FIG.21

(SYMBOL RANDOM DETERMINATION TABLE 8)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 1 | FIRE7 | 1 | FIRE7 | 1 |
| 1 | BLANK | 1 | BLANK | 1 | BLANK | 1 |
| 2 | 2BAR | 1 | 2BAR | 1 | 2BAR | 1 |
| 3 | BLANK | 1 | BLANK | 1 | BLANK | 1 |
| 4 | RED7 | 40 | RED7 | 40 | RED7 | 40 |
| 5 | BLANK | 1 | BLANK | 1 | BLANK | 1 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 1 | 1BAR | 1 | FIRE7 | 1 |
| 11 | BLANK | 1 | BLANK | 1 | BLANK | 1 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 1 |
| 16 | RED7 | 40 | RED7 | 40 | RED7 | 40 |
| 17 | BLANK | 1 | BLANK | 1 | BLANK | 1 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 1 |
|  |  | 100 |  | 100 |  | 100 |

FIG.22

(SYMBOL RANDOM DETERMINATION TABLE 9)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | FIRE7 | 10 | FIRE7 | 10 | FIRE7 | 10 |
| 1 | BLANK | 1 | BLANK | 1 | BLANK | 1 |
| 2 | 2BAR | 1 | 2BAR | 1 | 2BAR | 1 |
| 3 | BLANK | 1 | BLANK | 1 | BLANK | 1 |
| 4 | RED7 | 1 | RED7 | 1 | RED7 | 1 |
| 5 | BLANK | 1 | BLANK | 1 | BLANK | 1 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 1 | BLANK | 1 | BLANK | 1 |
| 10 | FIRE7 | 10 | 1BAR | 1 | FIRE7 | 10 |
| 11 | BLANK | 1 | BLANK | 1 | BLANK | 1 |
| 12 | 2BAR | 1 | 2BAR | 1 | 2BAR | 1 |
| 13 | BLANK | 1 | BLANK | 1 | BLANK | 1 |
| 14 | 1BAR | 1 | 1BAR | 1 | 1BAR | 1 |
| 15 | BLANK | 1 | BLANK | 1 | BLANK | 1 |
| 16 | RED7 | 1 | RED7 | 1 | RED7 | 1 |
| 17 | BLANK | 1 | BLANK | 1 | BLANK | 1 |
| 18 | 2BAR | 1 | 1BAR | 1 | 1BAR | 1 |
| 19 | BLANK | 1 | BLANK | 1 | BLANK | 1 |
| 20 | 3BAR | 1 | 3BAR | 1 | 3BAR | 1 |
| 21 | BLANK | 1 | BLANK | 1 | BLANK | 1 |
|  |  | 40 |  | 31 |  | 40 |

FIG.23

(HIGH-PROBABILITY MODE SHIFTING RANDOM DETERMINATION TABLE)

| GROUP | SHIFT TO HIGH-PROBABILITY MODE (WEIGHT) | LOST (WEIGHT) |
|---|---|---|
| A | 95/100 | 5/100 |
| B | 75/100 | 25/100 |
| C | 55/100 | 45/100 |
| D | 30/100 | 70/100 |
| E | 19/100 | 81/100 |
| F | 10/100 | 90/100 |
| G | 5/100 | 95/100 |
| H | 1/100 | 99/100 |

FIG.24
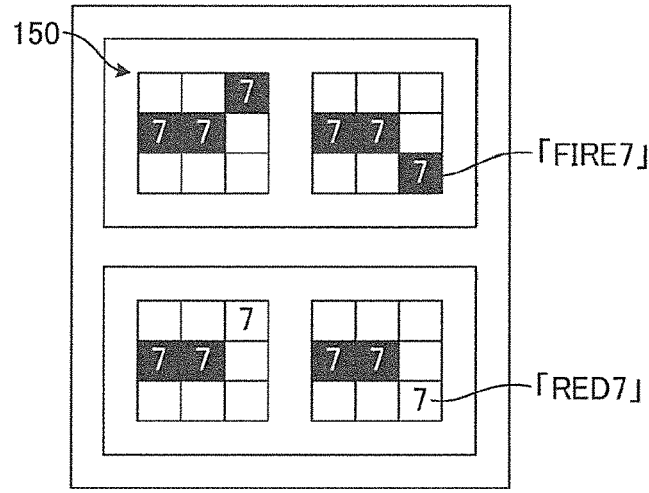
「FIRE7」
「RED7」
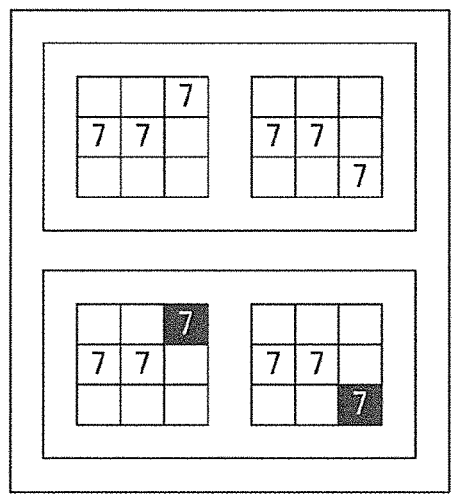
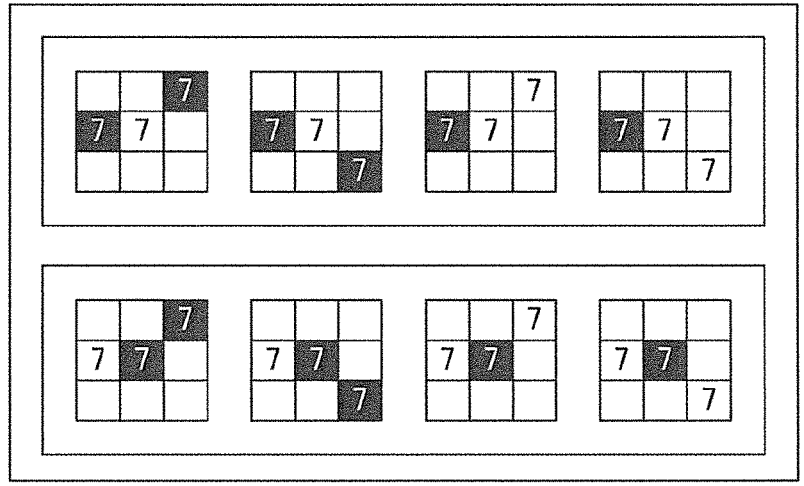

FIG.26
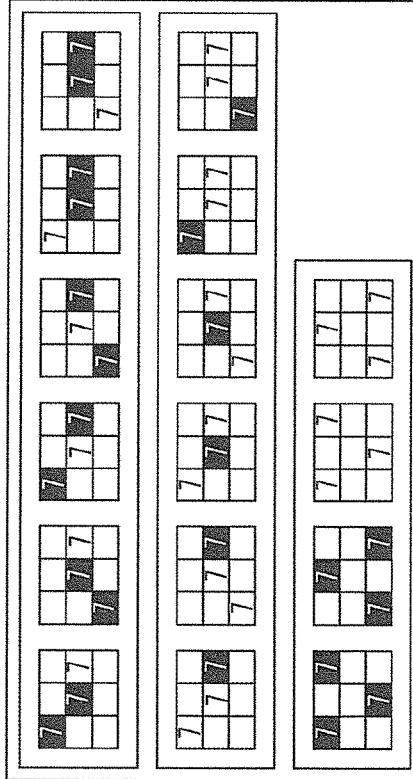
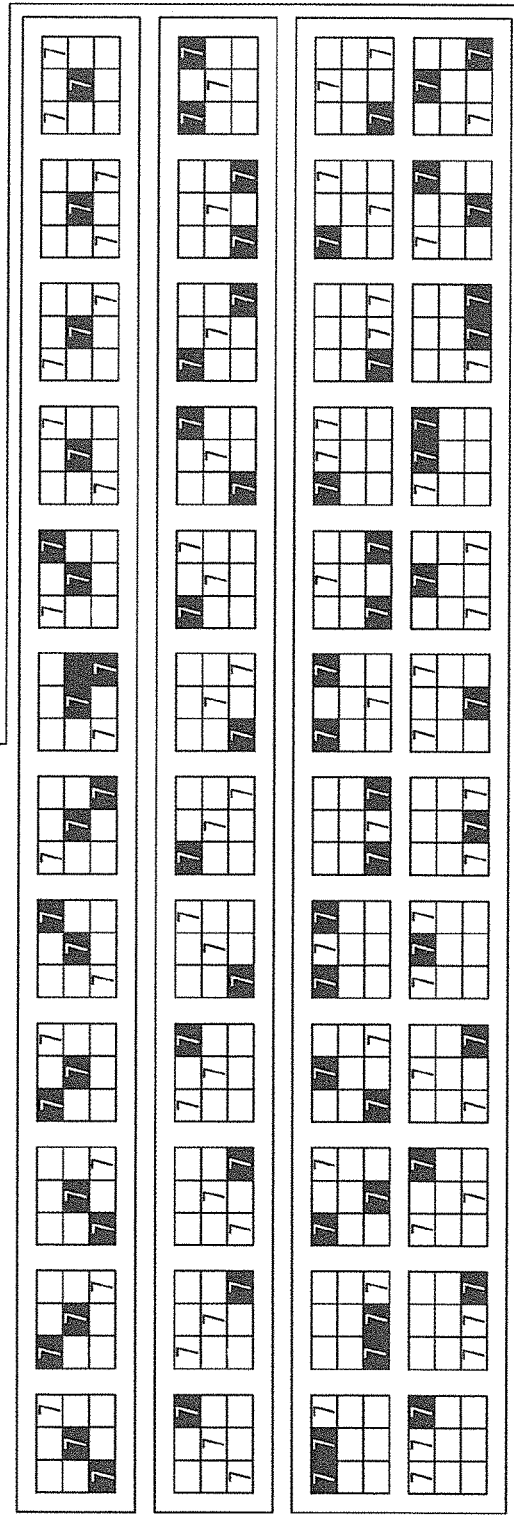

| | | | | |
|---|---|---|---|---|
|1|7|7|7| |
|2|7|7|7| HIGH |
|3|7|7|7| |
|4|7|7|7| |
|5|7|7|7| |
|6|7|7|7| |
|7|7|7|7| LOW |
|8|7|7|7| |

FIG.31

(FALLING TABLE)

| HIGH-PROBABILITY MODE IS MAINTAINED (WEIGHT) | FALLING (SHIFT TO NORMAL MODE) (WEIGHT) |
|---|---|
| 70/100 | 30/100 |

FIG.42

| NO. | FIRST REEL SYMBOL | SECOND REEL SYMBOL | THIRD REEL SYMBOL |
|---|---|---|---|
| 0 | 1BAR | 1BAR | 1BAR |
| 1 | BLANK | BLANK | BLANK |
| 2 | 2BAR | 2BAR | 2BAR |
| 3 | BLANK | BLANK | BLANK |
| 4 | RED7 | RED7 | RED7 |
| 5 | BLANK | BLANK | BLANK |
| 6 | 1BAR | 1BAR | 1BAR |
| 7 | BLANK | BLANK | BLANK |
| 8 | 3BAR | 3BAR | 3BAR |
| 9 | BLANK | BLANK | BLANK |
| 10 | 1BAR | 1BAR | 1BAR |
| 11 | BLANK | BLANK | BLANK |
| 12 | 2BAR | 2BAR | 2BAR |
| 13 | BLANK | BLANK | BLANK |
| 14 | FEATURE | FEATURE | FEATURE |
| 15 | BLANK | BLANK | BLANK |
| 16 | 1BAR | 1BAR | 1BAR |
| 17 | BLANK | BLANK | BLANK |
| 18 | 2BAR | 1BAR | 1BAR |
| 19 | BLANK | BLANK | BLANK |
| 20 | 3BAR | 3BAR | 3BAR |
| 21 | BLANK | BLANK | BLANK |

FIG.46

SYMBOL COMBINATION TABLE

| TYPES OF SYMBOLS \ NUMBER OF BETS | 1BET | 2BET | 3BET |
|---|---|---|---|
| RED7 | 0 | 200 | 300※1 |
| 3BAR | 60 | 120 | 180 |
| 2BAR | 40 | 60 | 80 |
| 1BAR | 20 | 30 | 40 |
| ANY BAR | 10 | 20 | 30 |
| BLANK | 2 | 4 | 6 |
| FEATURE | AWARD RIGHT TO EXECUTE FREE GAME 10 TIMES | | |

※1 WHEN THE GAME IS PLAYED WITH THREE BETS, PROGRESSIVE PAYOUT (INITIAL VALUE 300 + INCREMENTED AMOUNT) IS AWARDED WHEN THREE "RED7" ARE REARRANGED ON A PAYLINE

FIG.47

(SYMBOL RANDOM DETERMINATION TABLE)

| NO. | FIRST REEL SYMBOL | WEIGHT | SECOND REEL SYMBOL | WEIGHT | THIRD REEL SYMBOL | WEIGHT |
|---|---|---|---|---|---|---|
| 0 | 1BAR | 1 | 1BAR | 1 | 1BAR | 1 |
| 1 | BLANK | 1 | BLANK | 1 | BLANK | 1 |
| 2 | 2BAR | 1 | 2BAR | 1 | 2BAR | 1 |
| 3 | BLANK | 3 | BLANK | 10 | BLANK | 1 |
| 4 | RED7 | 20 | RED7 | 5 | RED7 | 10 |
| 5 | BLANK | 2 | BLANK | 5 | BLANK | 1 |
| 6 | 1BAR | 1 | 1BAR | 1 | 1BAR | 1 |
| 7 | BLANK | 1 | BLANK | 1 | BLANK | 1 |
| 8 | 3BAR | 1 | 3BAR | 1 | 3BAR | 1 |
| 9 | BLANK | 2 | BLANK | 1 | BLANK | 1 |
| 10 | 1BAR | 2 | 1BAR | 1 | 1BAR | 1 |
| 11 | BLANK | 2 | BLANK | 1 | BLANK | 2 |
| 12 | 2BAR | 2 | 2BAR | 2 | 2BAR | 2 |
| 13 | BLANK | 2 | BLANK | 2 | BLANK | 2 |
| 14 | FEATURE | 1 | FEATURE | 2 | FEATURE | 1 |
| 15 | BLANK | 1 | BLANK | 3 | BLANK | 2 |
| 16 | 1BAR | 1 | 1BAR | 3 | 1BAR | 2 |
| 17 | BLANK | 1 | BLANK | 3 | BLANK | 2 |
| 18 | 2BAR | 1 | 1BAR | 3 | 1BAR | 2 |
| 19 | BLANK | 1 | BLANK | 1 | BLANK | 2 |
| 20 | 3BAR | 2 | 3BAR | 1 | 3BAR | 2 |
| 21 | BLANK | 1 | BLANK | 1 | BLANK | 1 |
| TOTAL | | 50 | | 50 | | 40 |

FIG.48

(INDICATION EFFECT TABLE)

| TO-BE-STOPPED SYMBOLS | INDICATION OCCURRENCE PROBABILITIES |
|---|---|
| "RED7" "RED7", AND "RED7" (ESTABLISHMENT OF WINNING WITH "RED7") | 80/100 (80%) |
| "RED7", "RED7", AND "A SYMBOL OTHER THAN RED7" (ESTABLISHMENT OF TENPAI OF WINNING WITH "RED7") | 10/100 (10%) |
| SYMBOL COMBINATION OF THREE "RED7" IN DISPLAY WINDOW 150 (BUT WINNING WITH "RED7" IS NOT ESTABLISHED) | 5/100 (5%) |

FIG.49

| TO-BE-STOPPED SYMBOLS | INDICATION OCCURRENCE PROBABILITIES | PROBABILITY OF ESTABLISHMENT | PROBABILITY OF OCCURRENCE OF INDICATION EFFECT IN EACH GAME PLAY |
|---|---|---|---|
| "RED7", "RED7", AND "RED7" (ESTABLISHMENT OF WINNING WITH "RED7") | 80/100 | 1/100(1%) | 80/10000 |
| "RED7", "RED7", AND "A SYMBOL OTHER THAN RED7" (ESTABLISHMENT OF TENPAI OF WINNING WITH "RED7") | 10/100 | 3/100(3%) | 30/10000 |
| SYMBOL COMBINATION OF THREE "RED7" IN DISPLAY WINDOW 150 (BUT WINNING WITH "RED7" IS NOT ESTABLISHED) | 5/100 | 5/100(5%) | 25/10000 |
| | | | TOTAL 135/10000 |

FIG.54
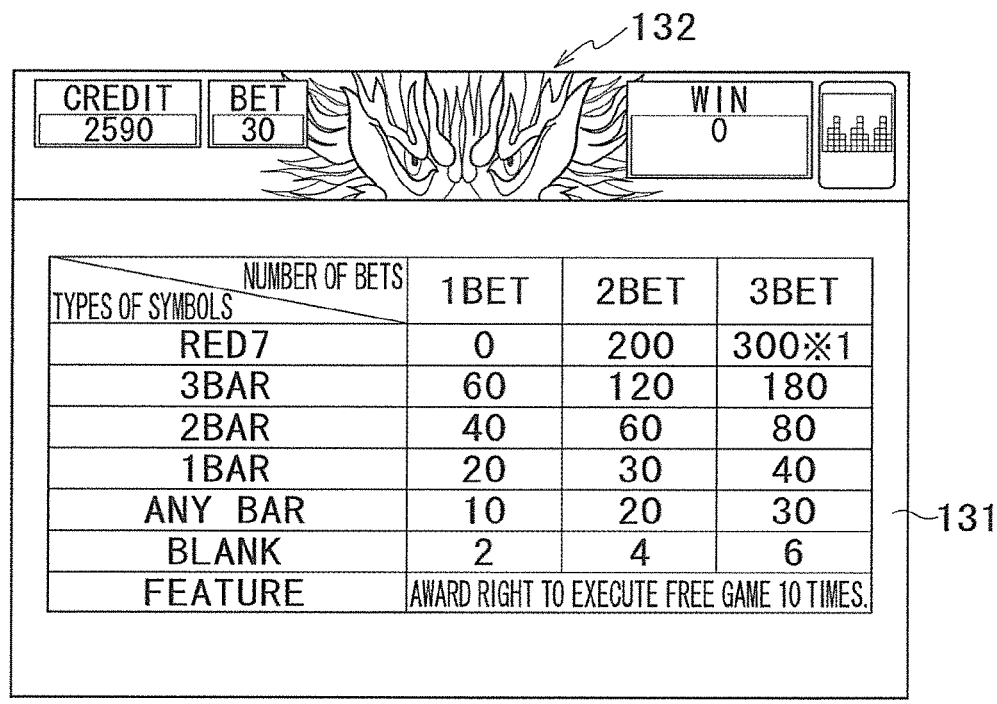
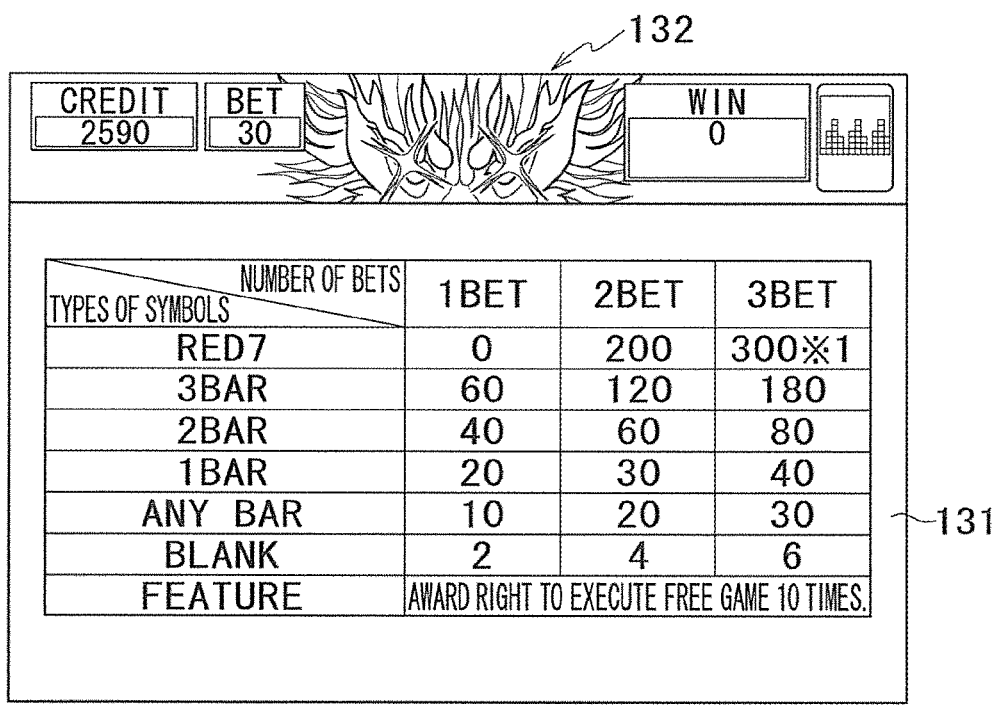

GAMING MACHINE

CROSS-REFERENCE TO RELATED APPLICATION

This application claims the benefit of Japanese. Pat. App. No. 2015-174184 filed Sep. 3, 2015, Japanese. Pat. App. No. 2015-174185 filed Sep. 3, 2015, Japanese. Pat. App. No. 2015-174186 filed Sep. 3, 2015, and Japanese. Pat. App. No. 2016-004642 filed Jan. 13, 2016 which applications are incorporated herein by reference in its entirety.

FIELD OF THE INVENTION

As a typical gaming machine, a slot machine is arranged such that, each time a player presses a button on a control panel, reels on which symbols are provided are rotated and then stopped, with the result that the symbols are rearranged. In such slot machines, a benefit such as a payout is awarded to a player based on a combination of rearranged symbols.

BACKGROUND OF THE INVENTION

A type of the slot machines is arranged such that, after each reel is rotated and stopped, symbols are rearranged at equal probabilities. For example, when 22 symbols are arranged on a reel, a probability of rearrangement of each of 22 symbols is 1/22. In the meanwhile, another type of the slot machines is arranged such that, after each reel is rotated and stopped, symbols are rearranged at not equal but different probabilities. In such a slot machine, for example, when 22 symbols are arranged on a reel, a probability of rearrangement of each symbol is different between the symbols, e.g., a probability of rearrangement of a symbol A is 1/10 whereas a probability of rearrangement of a symbol B is 1/50, and a random determination table in which a probability of rearrangement is associated with each symbol is provided (see Patent Literature 1 (Japanese Unexamined Patent Publication No. 2013-153875)).

BRIEF SUMMARY OF THE INVENTION

Technical Problem

In the slot machine above, the random determination table in which a probability of rearrangement is associated with each symbol is typically identical between games, with the result that game play may be monotonous.

An object of the present invention is to provide a gaming machine which makes it possible to avoid monotonous game play.

Technical Solution

The present invention relates to a gaming machine including: a display device configured to display a game result by rearranging reels on which symbols are arranged;
a storage device configured to store symbol random determination tables in which a probability of rearrangement of each of the symbols on the reels is defined and a symbol random determination table determination table in which a probability of random selection of one of the symbol random determination tables is defined for each of the symbol random determination tables; and a controller configured to execute the processes of:

(1A) at start of each game play, randomly selecting one of the symbol random determination tables based on the symbol random determination table determination table;
(1B) randomly determining symbols to be rearranged, based on the symbol random determination table selected in the process (1A); and
(1C) displaying the symbols determined in the process (1B) on the display device by rearranging the reels.

According to the arrangement above, at the start of each game play, one of the symbol random determination tables is randomly selected, and symbols to be rearranged are determined based on the randomly selected symbol random determination table. This makes it possible to avoid monotonousness in the game.

In the present invention, the above-described gaming machine is arranged such that the symbol random determination tables include a symbol random determination table in which a probability of rearrangement of a predetermined symbol is high as compared to the other symbol random determination tables.

According to the arrangement above, when a symbol random determination table in which a probability of rearrangement of a predetermined symbol is high as compared to the other symbol random determination tables is randomly selected based on the symbol random determination table determination table, the probability of rearrangement of the predetermined symbol in the symbol random determination process is high, and hence the predetermined symbol is more probable to be rearranged on the display device. This may increase the player's expectation on payout based on a combination of predetermined symbols.

In the present invention, the above-described gaming machine is arranged such that the symbol random determination tables include a symbol random determination table in which a probability of rearrangement of a predetermined symbol on reels one short of the all reels is high as compared to the other symbol random determination tables.

According to the arrangement above, when a symbol random determination table in which a probability of rearrangement of a predetermined symbol on reels one short of the all reels is high as compared to the other symbol random determination tables is randomly selected based on the symbol random determination table determination table, the probability of rearrangement of the predetermined symbol on reels one short of the all reels in the symbol random determination process is high, and hence the predetermined symbol is more probable to be rearranged on reels one short of the all reels. As a result, a combination one short of a combination of the predetermined symbol (so-called tenpai) is more probable to be established. The player therefore often sees a state in which the predetermined symbol forms tenpai, and hence player's expectation on a payout based on a combination of the predetermined symbol may be increased.

In the present invention, the above-described gaming machine is arranged such that the controller is configured to further execute a process of awarding a payout in accordance with a combination of the symbols rearranged on the display device, and the symbol random determination tables include, in regard to a probability of rearrangement of a symbol, a low-expectation symbol random determination table which is arranged so that expectation on the payout is low as compared to the other symbol random determination tables and a high-expectation symbol random determination table which is arranged so that expectation on the payout is high as compared to the other symbol random determination tables.

According to the arrangement above, when the high-expectation symbol random determination table is randomly selected based on the symbol random determination table determination table, a probability of selection of a symbol with which expectation on a payout is high is increased in the symbol random determination process, and hence such a symbol with which expectation on a payout is high is more probable to be rearranged. In the meanwhile, when the low-expectation symbol random determination table is randomly selected based on the symbol random determination table determination table, a probability of selection of a symbol with which expectation on a payout is low is increased in the symbol random determination process, and hence such a symbol with which expectation on a payout is low is more probable to be rearranged. With this, expectation on payout awarded as a result of a combination of rearranged symbols is easily changeable.

In addition to the above, in the present invention, the storage device includes plural symbol random determination table determination tables, and the symbol random determination table determination tables include a high-probability symbol random determination table determination table in which the symbol random determination table in which the probability of rearrangement of the predetermined symbol is high is more probable to be selected as compared to the other symbol random determination table determination tables.

According to the arrangement above, when random determination based on the high-probability symbol random determination table determination table is performed, the symbol random determination table in which the probability of rearrangement of the predetermined symbol is high is more probable to be selected as compared to random determination based on the other symbol random determination table determination tables. In other words, in the slot machine, when random determination is performed based on the high-probability symbol random determination table determination table, a symbol random determination table in which a probability of rearrangement of a predetermined symbol is high is more probable to be selected. In this way, a state in which the predetermined symbol is more probable to be rearranged as a result of the symbol random determination process is established. This may increase the player's expectation on payout based on a combination of predetermined symbols.

In addition to the above, in the present invention, the storage device includes plural symbol random determination table determination tables, and the symbol random determination table determination tables include a high-probability symbol random determination table determination table in which the symbol random determination table in which the probability of rearrangement of the predetermined symbol is high is more probable to be selected as compared to the other symbol random determination table determination tables.

According to the arrangement above, when random determination based on the high-probability symbol random determination table determination table is performed, the symbol random determination table in which the probability of rearrangement of the predetermined symbol on reels one short of all of the reels is high is more probable to be selected in the symbol random determination process as compared to random determination based on the other symbol random determination table determination tables. In other words, in the slot machine, when random determination is performed based on the high-probability symbol random determination table determination table, a symbol random determination table in which a combination one short of a combination of the predetermined symbol (so-called tenpai) is more probable to be established is more probable to be selected. In this way, a state in which a combination one short of a combination of the predetermined symbol is more probable to be established as a result of the symbol random determination process is established. This may increase the player's expectation on payout based on a combination of predetermined symbols.

In addition to the above, in the present invention, the storage device includes plural symbol random determination table determination tables, and the symbol random determination table determination tables include a high-probability symbol random determination table determination table in which the high-expectation symbol random determination table is more probable to be selected as compared to the other symbol random determination table determination tables.

According to the arrangement above, when random determination is performed based on the high-probability symbol random determination table determination table, a symbol random determination table in which expectation on the payout is high is more probable to be selected as compared to random determination based on the other symbol random determination table determination table. Therefore, in the slot machine, a symbol random determination table in which expectation on the payout is high is more probable to be selected in random determination based on the high-probability symbol random determination table determination table, a state in which expectation on the payout is high is established as a result of the symbol random determination process. This may increase the player's expectation on the payout.

In the present invention, the above-described slot machine is arranged such that the game is run in a normal mode in which a symbol random determination table is randomly selected based on the another symbol random determination table determination table or in a high-probability mode in which a symbol random determination table is randomly selected based on the high-probability symbol random determination table determination table, and the symbol random determination tables are shared between the normal mode and the high-probability mode.

According to the arrangement above, the symbol random determination tables are shared between the normal mode and the high-probability mode. It is therefore possible to save the memory space of the storage device as compared to a case where a dedicated symbol random determination table is prepared for each of the normal mode and the high-probability mode.

The present invention relates to a gaming machine including: a display device configured to display a game result by rearranging reels on which symbols are arranged; a storage device including: symbol random determination tables in which probabilities of rearrangement of a predetermined symbol are different as a probability of rearrangement of each symbol on the reels is set; a normal mode symbol random determination table determination table in which a probability of random selection of one of the symbol random determination tables is defined for each of the symbol random determination tables; a high-probability mode symbol random determination table determination table in which a probability of random selection of one of the symbol random determination tables is defined for each of the symbol random determination tables such that a symbol random determination table in which a probability of rearrangement of the predetermined symbol is high is more probable to be selected as compared to the normal mode symbol random determination table determination table; and a high-probability mode shifting random determination table in which a winning probability of shifting from a normal mode to a high-probability mode is defined; and a controller configured to execute the processes of:

(1A) at start of game play in the normal mode, randomly selecting one of the symbol random determination tables based on the normal mode symbol random determination table determination table;

(1B) randomly determining symbols to be rearranged based on the symbol random determination table selected in the process (1A);

(1C) displaying the symbols determined in the process (1B) on the display device by rearranging the reels;

(1D) when a combination of the symbols to be rearranged as a result of the process (1B) is a combination of a specific symbol, randomly determining whether to shift the normal mode to the high-probability mode based on the high-probability mode shifting random determination table;

(1E) when shifting from the normal mode to the high-probability mode occurs as a result of the process (1D), at start of game play in the high-probability mode, randomly selecting one of the symbol random determination tables based on the high-probability mode symbol random determination table determination table;

(1F) randomly determining symbols to be rearranged, based on the symbol random determination table selected in the process (1E); and (1G) displaying the symbols determined in the process (1F) on the display device by rearranging the reels.

According to the arrangement above, at the start of each game play, one of the symbol random determination table is randomly selected irrespective of the normal mode or the high-probability mode. Because this makes it possible to change the probability of rearrangement of symbols without requiring complicated control, monotonous game play is avoidable.

In the present invention, the above-described gaming machine is arranged such that there are plural combinations of the specific symbol, and in the high-probability mode shifting random determination table, the winning probability of shifting from the normal mode to the high-probability mode is defined in accordance with the combinations of the specific symbol.

According to the arrangement above, because the winning probabilities of shifting from the normal mode to the high-probability mode are differentiated in accordance with the types of the combinations of the specific symbol rearranged on the display device, it is possible to change the winning probability of shifting from the normal mode to the high-probability mode without performing complicated control.

In the present invention, the above-described gaming machine is arranged such that the symbol random determination tables are shared between the normal mode and the high-probability mode.

According to the arrangement above, the symbol random determination tables are shared between the normal mode and the high-probability mode. It is therefore possible to save the memory space of the storage device as compared to a case where a dedicated symbol random determination table is prepared for each of the normal mode and the high-probability mode.

The present invention relates to a gaming machine including: a display device configured to display a game result by rearranging reels on which symbols including a specific symbol are arranged;

an input device capable of receiving an input of plural types of bet values; and a controller configured to control game modes which are different in a probability of rearrangement of the specific symbol, the controller switching the game mode in accordance with a bet value input by the input device.

According to the arrangement above, monotonousness in game progress is avoidable as the player participates in the game progress by operating the input device.

In the present invention, the above-described gaming machine is arranged such that the game modes include a high-probability mode in which a probability of rearrangement of the specific symbol is high as compared to another game mode, and the controller is configured to further execute the processes of:

determining whether a bet value received by the input device is equal to or larger than a predetermined value; and when the bet value received by the input device is equal to or larger than the predetermined value, running a game in the high-probability mode.

According to the arrangement above, when the bet value received by the input device is equal to or larger than the predetermined value, the game is run in the high-probability mode in which the probability of rearrangement of the predetermined symbol is high as compared to the other game mode. With this, added values may be provided to the placement of bet equal to or larger than the predetermined value, and the player may be induced to place bet equal to or larger than the predetermined value.

In the present invention, the above-described gaming machine is arranged such that the controller is configured to further execute the processes of:

switching the game mode from another game mode to the high-probability mode when symbols rearranged on the display device include the specific symbol; and in the game after switching to the high-probability mode, the high-probability mode is maintained when the bet value received by the input device is equal to or larger than the predetermined value, or the high-probability mode is switched to another game mode when the bet value is smaller than the predetermined value.

According to the arrangement above, when the received bet is smaller than the predetermined value in the running of the game in the high-probability mode, the game is run not in the high-probability mode but in the other game mode. With this, added values may be provided to the placement of bet equal to or larger than the predetermined value, and the player may be induced to place bet equal to or larger than the predetermined value.

The present invention relates to a gaming machine including: a display device configured to display a game result by rearranging reels on which symbols are arranged;

an effect means (equivalent to an effect image of emitting light from eyes of a dragon character 132 displayed on an upper image display panel 131);

a storage device configured to store, for each of the reels, a symbol random determination table in which a probability of rearrangement of each symbol is defined and an indication effect table in which a combination of symbols to be rearranged is associated with an occurrence probability of a predetermined indication effect executed by the effect means; and a controller configured to execute the processes of:

(1A) at start of game play, randomly determining a combination of symbols to be displayed on the display device based on the symbol random determination table;

(1B) determining whether to execute the predetermined indication effect by the effect means with reference to the combination of the symbols determined in the process (1A) and the indication effect table;

(1C) executing the predetermined indication effect by the effect means when it is determined in the process (1B) that the predetermined indication effect is executed by the effect means (equivalent to an indication effect random determination process); and (1D) displaying a combination of the symbols determined in the process (1A) on the display device by rearranging the reels (equivalent to a symbol display control process).

According to the arrangement above, the occurrence probability for determining whether to perform the predetermined indication effect by the effect means corresponds to a symbol combination determined in the symbol random determination process, and the symbol combination determined in the symbol random determination process is based on the symbol random determination table. On this account, the occurrence probability for determining whether to perform the predetermined indication effect by the effect means is changeable by the probability of rearrangement of each symbol in the symbol random determination table. That is to say, whether to execute the indication effect by the effect means is adjustable by the probability of rearrangement of each symbol in the symbol random determination table and the occurrence probability in the indication effect table. This makes it possible to avoid monotonousness in the indication effect in the game.

In the present invention, the above-described gaming machine is arranged such that, in the symbol random determination table and the indication effect table, values calculated by multiplying rates of rearrangement of combinations of symbols by occurrence probabilities of the indication effect corresponding to the respective combinations in each unit game are all added up as an overall probability, and the overall probability is higher than a rate of rearrangement of a combination of a predetermined symbol.

According to the arrangement above, because the overall probability of occurrence of the predetermined indication effect in one game play is higher than the probability of rearrangement of the combination of the predetermined symbol, the occurrence frequency of the predetermined indication effect is higher than the frequency of the rearrangement of the combination of the predetermined symbol on the display device. With this, when the predetermined indication effect occurs, the player may highly expect rearrangement of the combination of the predetermined symbol on the display device, with the result that monotonousness in the indication effect in the game is avoided.

Advantageous Effects

A gaming machine which makes it possible to avoid monotonous game play is provided.

BRIEF DESCRIPTION OF THE DRAWINGS

FIG. 5 shows a symbol array on each reel of the slot machine of the embodiment of the present invention.

FIG. 6 is an explanatory diagram of a reel displayed in a display window of the slot machine of the embodiment of the present invention.

FIG. 9 shows a symbol combination table of the slot machine of the embodiment of the present invention.

FIG. 10 shows a normal mode symbol random determination table determination table of the slot machine of the embodiment of the present invention.

FIG. 11 shows a 1BET-2BET symbol random determination table determination table of the slot machine of the embodiment of the present invention.

FIG. 12 shows a high-probability mode symbol random determination table determination table of the slot machine of the embodiment of the present invention.

FIG. 13 shows a symbol random determination table 0 of the slot machine of the embodiment of the present invention.

FIG. 14 shows a symbol random determination table 1 of the slot machine of the embodiment of the present invention.

FIG. 15 shows a symbol random determination table 2 of the slot machine of the embodiment of the present invention.

FIG. 16 shows a symbol random determination table 3 of the slot machine of the embodiment of the present invention.

FIG. 17 shows a symbol random determination table 4 of the slot machine of the embodiment of the present invention.

FIG. 18 shows a symbol random determination table 5 of the slot machine of the embodiment of the present invention.

FIG. 19 shows a symbol random determination table 6 of the slot machine of the embodiment of the present invention.

FIG. 20 shows a symbol random determination table 7 of the slot machine of the embodiment of the present invention.

FIG. 21 shows a symbol random determination table 8 of the slot machine of the embodiment of the present invention.

FIG. 22 shows a symbol random determination table 9 of the slot machine of the embodiment of the present invention.

FIG. 23 shows a high-probability mode shifting random determination table of the slot machine of the embodiment of the present invention.

FIG. 24 illustrates groups corresponding to combinations of symbols in the slot machine of the embodiment of the present invention.

FIG. 26 illustrates groups corresponding to combinations of symbols in the slot machine of the embodiment of the present invention.

FIG. 29 illustrates the rule of grouping in the embodiment of the present invention.

FIG. 30 illustrates the rule of grouping in the embodiment of the present invention.

FIG. 31 shows a falling table in the slot machine of the embodiment of the present invention.

FIG. 42 shows a symbol array on each reel of the slot machine of the embodiment of the present invention.

FIG. 46 shows a symbol combination table of the slot machine of the embodiment of the present invention.

FIG. 47 shows a symbol random determination table of the slot machine of the embodiment of the present invention.

FIG. 48 is an indication effect table of the slot machine of the embodiment of the present invention.

FIG. 49 shows a probability of occurrence of an indication effect by executing a game once or the like in the slot machine of the embodiment of the present invention.

FIG. 54 illustrates an indication effect in the slot machine of the embodiment of the present invention.

DETAILED DESCRIPTION OF THE PREFERRED EMBODIMENT (Outline of Present Invention)

Figure 1:
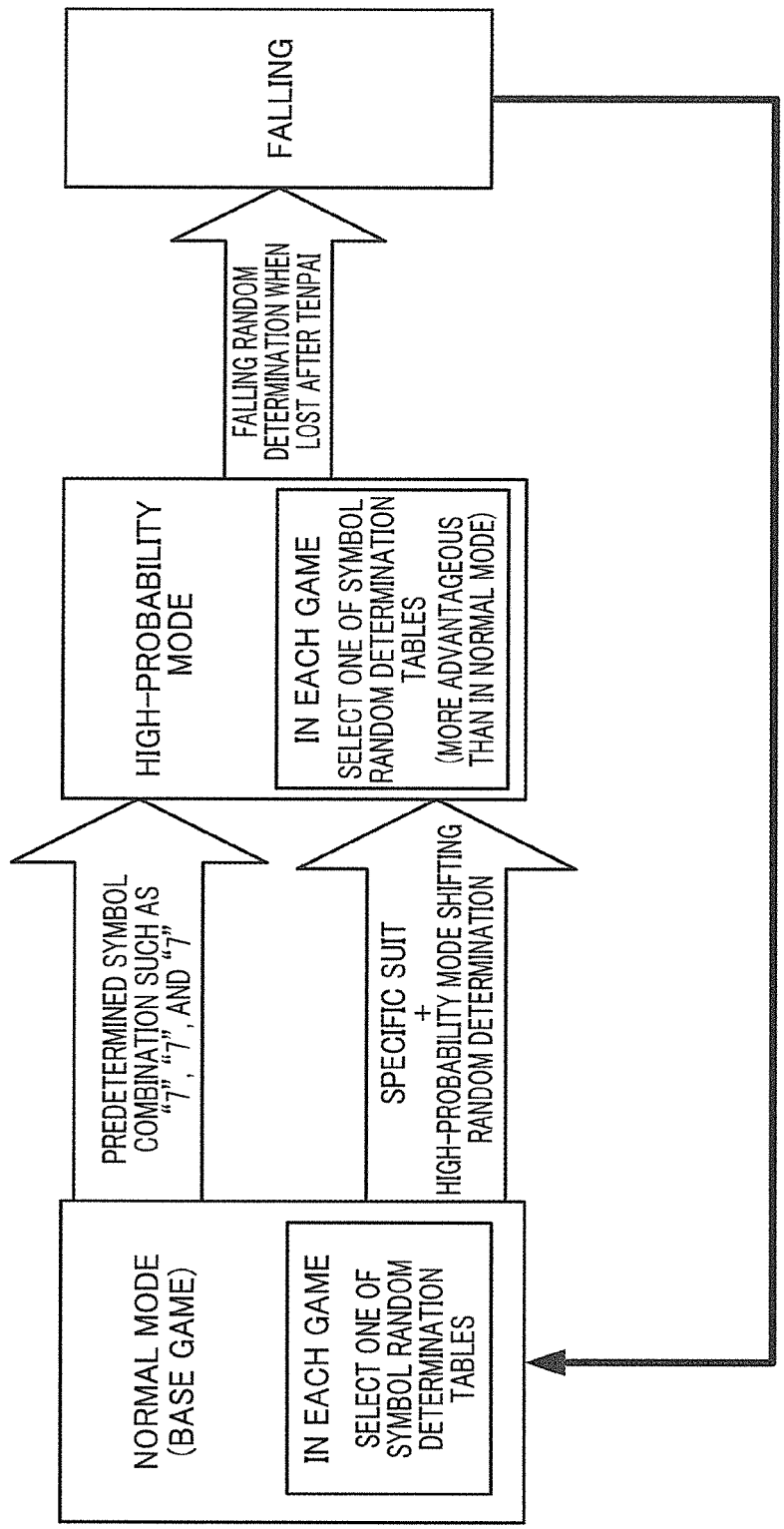
FIG. 1 shows the outline of game content of a slot machine according to an embodiment of the present invention.

The following will describe an embodiment the present invention with reference to figures. FIG. 1 shows the outline of a game flow of a slot machine according to the embodiment of the present invention. As shown in FIG. 1, in the slot machine of the embodiment of the present invention, a slot game in a normal mode (normal game: one of plural game modes) and a slot game in a high-probability mode (one of plural game modes) shifted from the normal mode are executed.

The slot games are of a line type (Left to Right). The slot games employ mechanical reels. The reels are formed of three reels. That is to say, the reels are formed of a first reel, a second reel, and a third reel. Furthermore, a single payline is set.

In the normal mode, symbol random determination table random determination is carried out in such a way that one of symbol random determination tables is selected. In each of the symbol random determination tables, a probability that each of symbols arranged on three reels is rearranged in a display window is associated with that symbol. Based on the symbol random determination table selected in the symbol random determination table random determination, a symbol random determination process is carried out to randomly determine symbols to be rearranged in the display window, the determined symbols are rearranged in the display window, and a benefit is awarded based on a combination of symbols rearranged on a payline.

When the combination of the symbols rearranged on the payline is a combination of a predetermined symbol (e.g., "7", "7", and "7"), the routine shifts to a high-probability mode. Furthermore, when the symbols rearranged in the display window form a specific suit (e.g., "7", "7", and "-"), high-probability mode shifting random determination is carried out to determine whether to shift to the high-probability mode. As a result of this determination, the routine may shift to the high-probability mode.

Also in the high-probability mode, symbol random determination table random determination is carried out in such a way that one of symbol random determination tables is selected. In each of the symbol random determination tables, a probability that each of symbols arranged on three reels is rearranged in a display window is associated with that symbol. In the symbol random determination table random determination carried out in the high-probability mode, a symbol random determination table in which a predetermined symbol is more probable to be rearranged is more probable to be selected as compared to the symbol random determination table random determination carried out in the normal mode. Based on the symbol random determination table selected in the symbol random determination table random determination, a symbol random determination process is carried out to randomly determine symbols to be rearranged in the display window, the determined symbols are rearranged in the display window, and a prize is awarded based on a combination of symbols rearranged on a payline.

Subsequently, after the symbols rearranged on the payline form tenpai (a state in which a combination of symbols is one short of a predetermined symbol combination), if the predetermined symbol combination is not established, falling random determination is carried out to determine whether shifting to the normal mode occurs or the high-probability mode is maintained. When the shift to the normal mode is selected in the falling random determination (falling), the routine returns to the normal mode (see FIG. 1).

(Definition)

The present embodiment deals with a case where the slot machine 1 is the gaming machine; however, the present invention is not limited to this, and is applicable to any given device configured to independently run any type of normal mode (normal game) and another game which develops from the normal game (i.e., a game which is more advantageous for players than the normal game).

The normal game in the present embodiment is run by the slot machines 1, in the present embodiment. The normal game is a slot game of rearranging symbols. The rearrangement of symbols in the slot game is carried out by a mechanical reel unit (equivalent to a display device). The normal game in the normal mode is a game in which, on condition that a gaming value is bet, symbols are rearranged in the display window by the mechanical reel unit, and a payout is awarded according to the rearranged symbols. The high-probability game in the high-probability mode in the present embodiment is a slot game in which symbols are rearranged in a manner similar to those in the normal game. The high-probability game is a game, the gaming state of which is more advantageous for the player than that of the normal game. In the high-probability game of the present embodiment, a symbol random determination table in which a predetermined symbol is more probable to be rearranged is more probable to be selected as compared to the symbol random determination table random determination carried out in the normal mode. In addition to the above, the high-probability game includes, for example, a free game which does not require betting of a gaming value, a game in which a payout amount and a payout rate are higher than those in the normal game, a mini game different from the normal game, and a game in which a predetermined condition is more probable to be established as compared to the normal game.

The symbols collectively mean "FIRE7", "RED7", "3BAR", "2BAR", "1BAR", and "BLANK".

The gaming value is electrically valuable information such as electronic money and the like. It is to be noted that the gaming value in the present invention is not limited to these, and for example a gaming medium such as a medal, a token, a coin, a ticket or the like can be adopted. The ticket is not particularly limited, and for example, a ticket having data of credit amount and the like in the form of bar code. Alternatively, the gaming value may be a game point not including valuable information.

The term "rearrangement" indicates that the symbols are rearranged after the arrangement of the symbols is dismissed. Arrangement means a state where the symbols can be visually confirmed by a player. More specifically, "rearrangement" is a state in which, after the symbols on the reels are variably displayed as the reels rotate, the variable display of the symbols stops as the rotation of the reels stops, and the symbols stop in the display window.

(Functional Flow)

Figure 2:
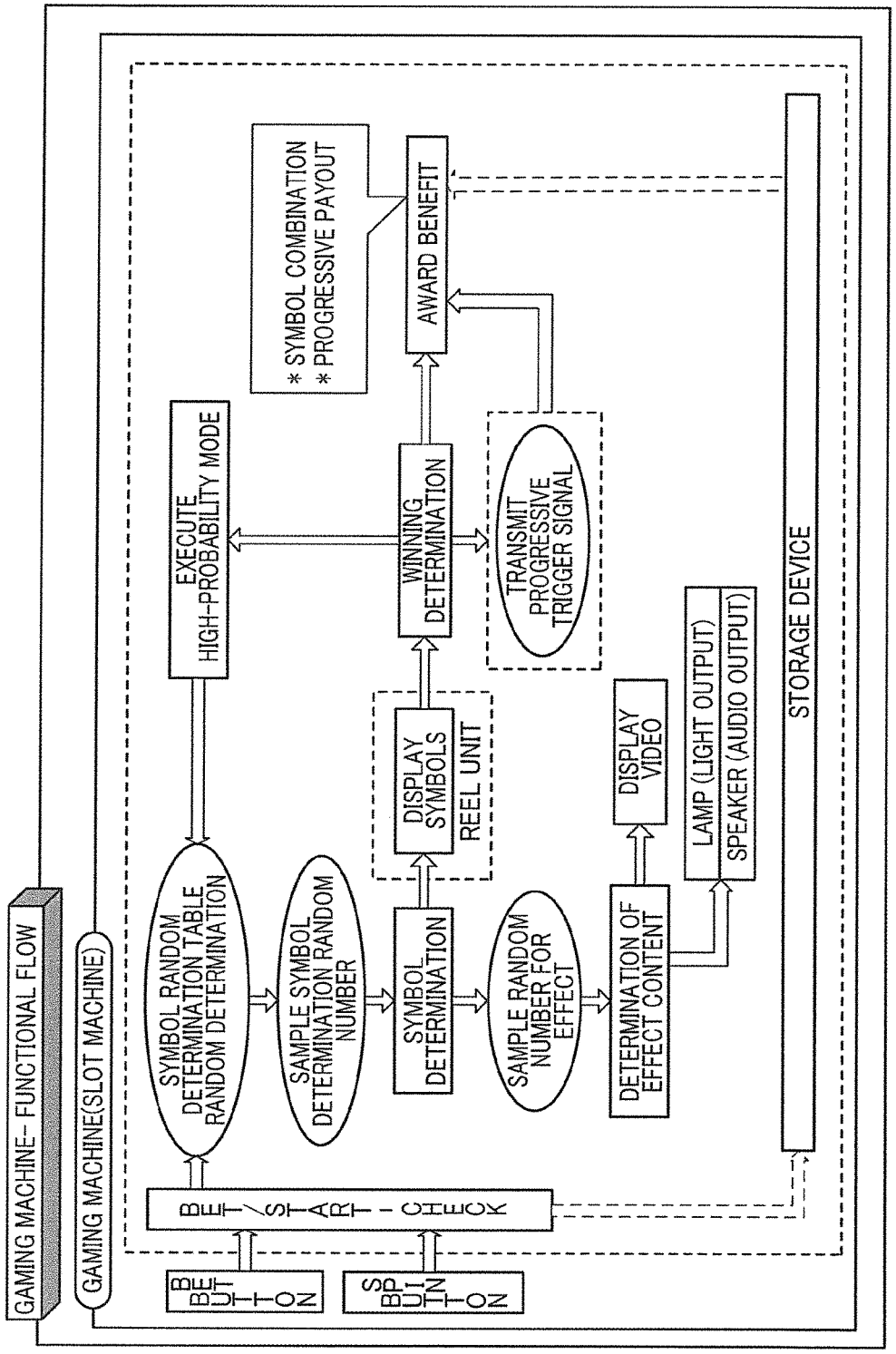
FIG. 2 shows a functional flow of the slot machine of the embodiment of the present invention.

The following describes basic functions of the slot machine related to the embodiment of the present invention, with reference to FIG. 2. FIG. 2 is a diagram showing functional flow of the slot machine related to the embodiment of the present invention.

<Bet/Start-Check>

First, the slot machine checks whether or not a BET button has been pressed by a player, and subsequently checks whether or not a spin button has been pressed by the player.

<Symbol Random Determination Table Determination>

Subsequently, in the normal mode, the slot machine carries out symbol random determination table random determination to select one of the symbol random determination tables in which different possibilities are associated with the respective symbols.

<Symbol Determination>

Subsequently, when the spin button is pressed by the player, the slot machine extracts a random number for symbol determination, and determines, with reference to the symbol random determination table selected in the symbol random determination table random determination, symbols to be displayed (rearranged) for the player at the time of stopping the scroll of the reel, for respective reels.

<Reel Control>

Thereafter, the slot machine starts the rotation of each reel and stops the rotation of each reel so that the determined symbols are displayed for the player (symbol display).

<Winning Determination>

Subsequently, as the rotation of each reel is stopped, the slot machine determines whether the combination of the symbols displayed for the player is a combination related to winning.

<Awarding Benefit>

When the combination of the symbols displayed for the player is a combination related to winning, the slot machine offers, to the player, benefit according to the type of the combination. For example, when a combination of symbols related to awarding of a credit is displayed, the slot machine awards credits to the player, the amount of which corresponds to the combination of the symbols.

In addition to the above, the slot machine may accumulatively add a part of a bet amount to progressive payout stored in the storage device, each time the unit game is executed. When progressive payout is employed, the slot machine awards the progressive payout accumulatively stored in the storage device to the player, when a progressive trigger condition is established. The progressive (jackpot) is a function of accumulating at least one of coins betted by a player at a slot machine (or slot machines) in the progressive payout and awarding the accumulated progressive payout to a slot machine in which a progressive trigger is established. When the progressive payout is accumulated by plural slot machines, an amount (accumulative amount) accumulated to the progressive payout is calculated and transmitted to an external controller each time the game is executed. The external controller adds the accumulative amount sent from each slot machine to the progressive payout.

When a predetermined condition is satisfied in winning determination, the slot machine is shifted from the normal mode to the high-probability mode. When the high-probability mode is executed, symbol random determination table random determination is carried out. In the symbol random determination table random determination carried out in the high-probability mode, a symbol random determination table in which a predetermined symbol is more probable to be rearranged is more probable to be selected as compared to the symbol random determination table random determination carried out in the normal mode.

The slot machine may have other benefits such as a mystery bonus and insurance. In the mystery bonus, a predetermined number of coins are paid out when a win is achieved in dedicated random determination. When a spin button is pressed, the slot machine samples a random number for the mystery bonus, and whether a mystery bonus trigger is established is randomly determined.

The insurance is a function for saving the player when the free game is not executed for a long period of time. Whether the insurance is activated or not is freely determined by an administrator of the slot machine. When the insurance is activated, a predetermined insurance activation amount must be paid. When the insurance is activated, the slot machine starts to count the number of plays of the game. When the counted number of plays reaches a predetermined number without a large amount of payout, the slot machine pays out coins, the amount of which has been set for the insurance.

<Determination of Effect>

The slot machine produces an effect by displaying an image on a display, outputting light from a lamp, and outputting sound from a speaker. The slot machine samples an effect-use random number and determines the content of an effect based on randomly determined symbols or the like.

[Overall Structure of Game System]

Figure 3:
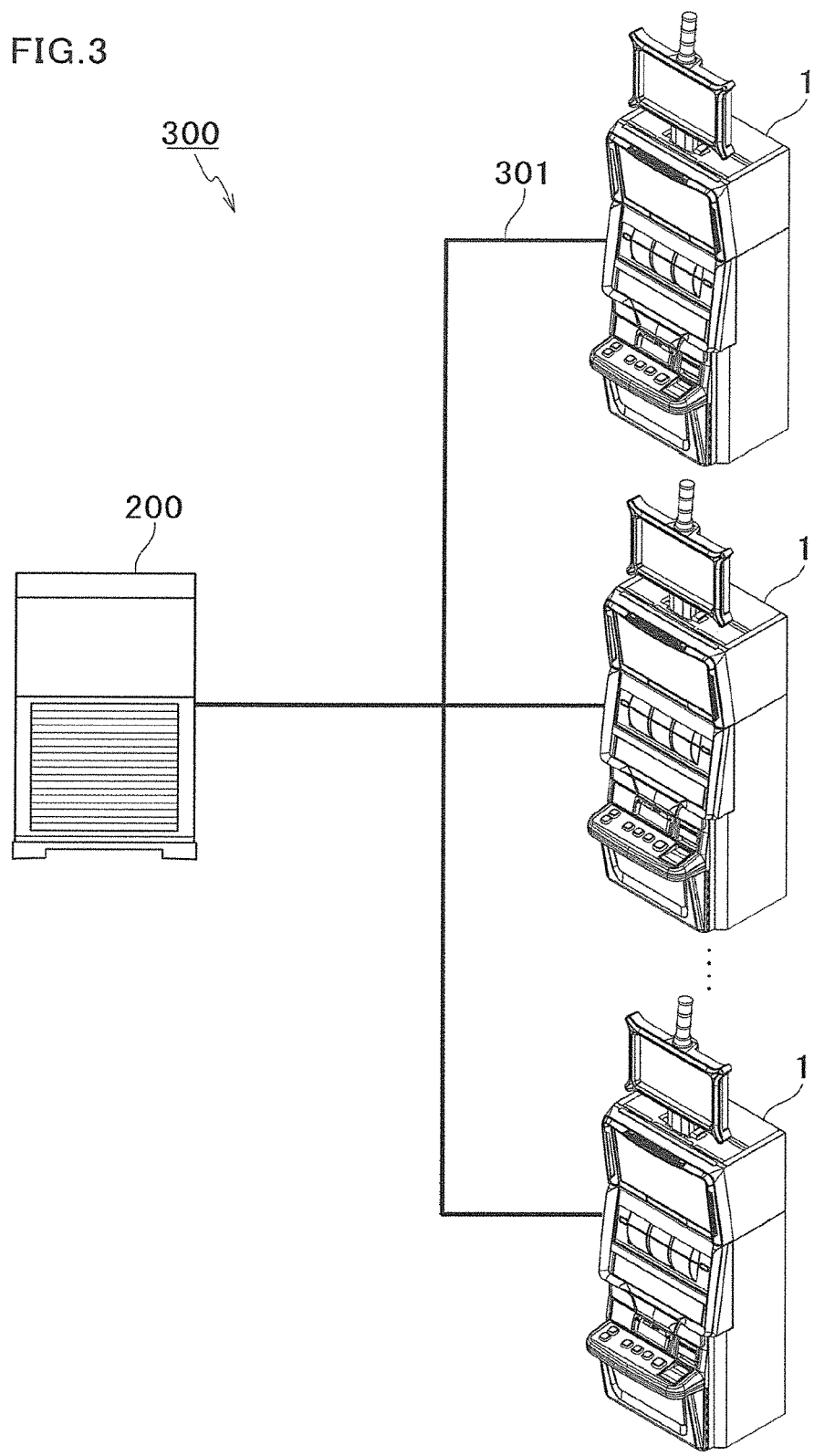
FIG. 3 shows a game system including the slot machine of the embodiment of the present invention.

The basic functions of the slot machine have been described as above. Now, referring to FIG. 3, a game system including the slot machine will be described. FIG. 3 shows a game system including the slot machine of the embodiment of the present invention.

A game system 300 includes a plurality of slot machines 1 and an external controller 200 connected with the slot machines 1 via a communication line 301.

The external controller 200 is for controlling the plurality of slot machines 1. In the embodiment of the present invention, the external controller 200 is a so-called hall server installed in a gaming facility where the plurality of slot machines 1 are provided. Each of the slot machines 1 has a unique identification number, and the external controller 200 identifies which one of the slot machines 1 transmitted data, by referring to the identification number. Further, the external controller 200 determines transmission target of data with the identification number when transmitting data to a slot machine 1.

It is to be noted that the game system 300 may be constructed within a single gaming facility where various games can be performed, such as a casino, or may be constructed among a plurality of gaming facilities. Further, when the game system 300 is constructed in a single gaming facility, the gaming system may be constructed in each floor or section of the gaming facility. The communication line 301 may be a wired or wireless line, and can adopt a dedicated line, an exchange line or the like.

The game system 300 is of a network type in which the slot machines 1 are connected with the external controller 200 by a communication line 301, but the game system 300 may be of a standalone type in which each slot machine 1 independently executes a game.

[Overall Structure of Slot Machine]

Figure 4:
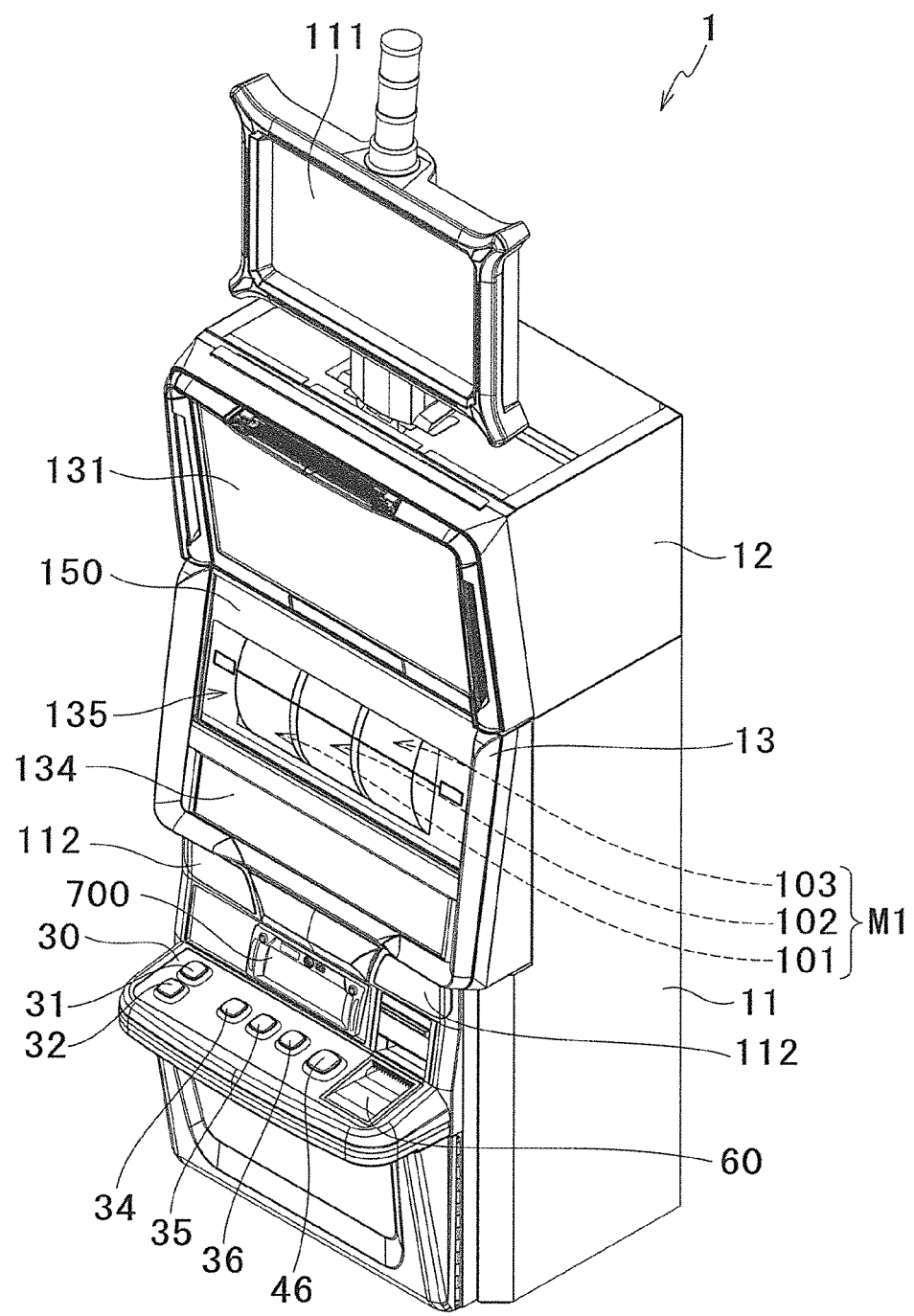
FIG. 4 shows the overall structure of the slot machine of the embodiment of the present invention.

Now, referring to FIG. 4, the overall structure of the slot machine 1 will be described. FIG. 4 shows the overall structure of the slot machine of the embodiment of the present invention.

Electrically valuable information such as electronic money is used as a gaming value in the slot machine 1. It is to be noted that the gaming value is not limited to these, and for example a coin, a medal, a token, a ticket with a bar code and the like can be adopted.

The slot machine 1 includes a cabinet 11, a top box 12 installed on the upper side of the cabinet 11, and a main door 13 provided at the front surface of the cabinet 11. Above the top box 12, a digital signage 111 is provided.

The main door 13 is provided with a reel unit M1 (corresponding to a symbol display device) constituted by three reels 101, 102, and 103. A reel cover 135 is provided in front of the reel unit M1. On the front surface of the reel cover 135, a liquid crystal display device 134 by which a game status is reported to the player and a transparent panel are provided. This liquid crystal display device 134 is provided with a touch panel 137. The reel cover 135 has the display window 150 at its central portion. In the display window 150, one symbol 501 is provided in each of the upper stage, the middle stage, and the lower stage of each of the reels 101, 102, and 103 (see FIG. 6). To put it differently, 9 symbols 501 forming a 3 by 3 matrix are visibly displayed in the display window 150. On the outer circumferential surface of each of the reels 101, 102, and 103, 22 symbols are depicted (see FIG. 5). These 22 symbols 501 are lined up along the rotational direction of the reels 101, 102, and 103 to form a symbol array. Each of the symbol arrays is a combination of "FIRE7", "RED7", "3BAR", "2BAR", "1BAR", and "BLANK". To the main door 13 is provided a speaker 112.

As shown in FIG. 6, a payline for result determination of symbols 501 rearranged in the display window 150 is set in the slot machine 1. In the present embodiment, one payline is formed at the middle stage of the display window 150 as shown in FIG. 6. Alternatively, plural paylines may be provided and each payline may be activated upon selection by a player.

As shown in FIG. 6, the reel unit M1 rearranges the symbols 501 on the display window 150 by drivingly rotating the reels 101, 102, and 103 each having the symbols 501 on the outer circumferential surface. In the descriptions below, the reels may be referred to as a first reel 101, a second reel 102, and a third reel 103 from the left end in front elevation.

On the inner circumferential side of each of the reels 101, 102, and 103 arranged as above, a backlight unit M7 (not illustrated) is provided. The backlight unit emits illumination light from the inner circumferential side of the reels 101, 102, and 103 to the outer circumferential surface of the reels and is arranged so that the illumination light passing through the outer circumferential surface of the reels is seen from the outside of the display window 150. The backlight unit is configured to be able to change the amount of illumination light in multiple stages. The degree of freedom in the effects using illumination light is therefore high. Furthermore, each backlight unit is able to emit light in multiple colors, and to illuminate the symbols individually with the illumination light.

It should be noted that the present embodiment deals with a case where the slot machine 1 employs the reel unit M1 in the form of mechanical reels; however, the slot machine 1 of the present invention may adopt video reels that display simulated reels, or adopt a combination of the video reels and the mechanical reels.

Figure 7:
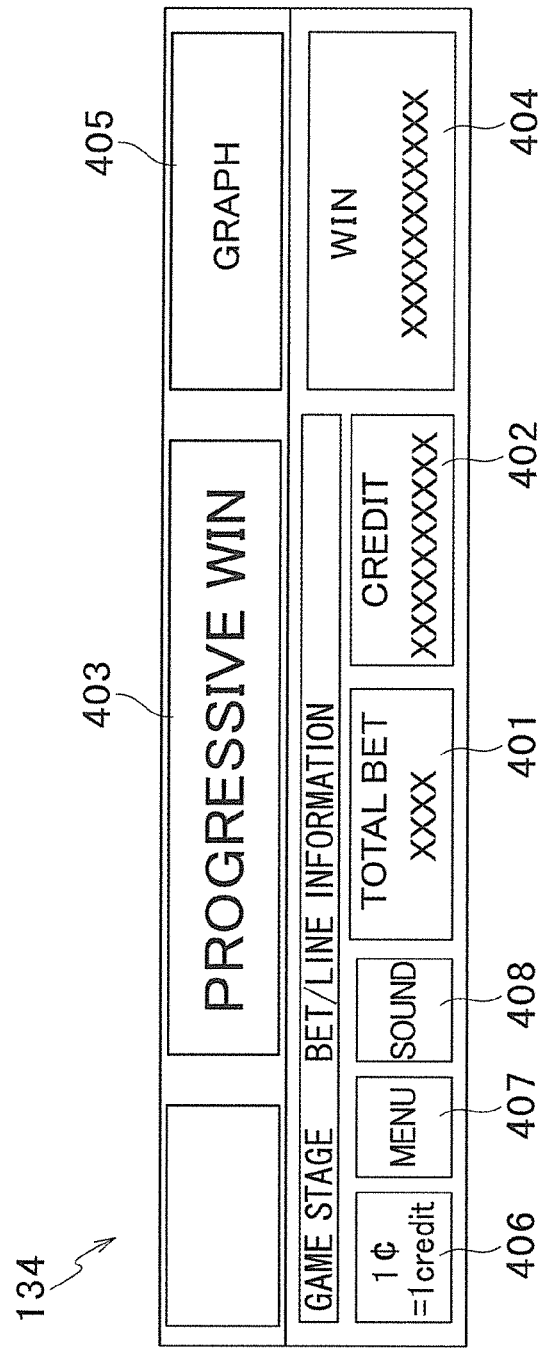
FIG. 7 is an explanatory diagram of a liquid crystal display device of the slot machine of the embodiment of the present invention.

As shown in FIG. 7, on the liquid crystal display device 134 is displayed meters indicating the conditions of the game. For example, a total bet meter 401 displays "Total Bets". The numerical value is re-calculated at every game play. The credit meter 402 indicates the total credit amount at the time. The default value is 0. The numerical value is increased or decreased according to the gaming value input, the bet, and the game result. A game message area 403 indicates a message explaining the current gaming status. The win meter 404 indicates the total credit amount of the payout having been won.

The liquid crystal display device 134 is provided with a graph touch area 405, a denomination indicator 406, a menu touch area 407, and a sound volume switching touch area 408. When touched by the player, the graph touch area 405 displays, in the form of graphs, the change of the obtained payout amount, the number of game play in the normal mode executed until the shifting to the high-probability mode, and the total obtained credit amount in the high-probability mode, on the upper image display panel 131. As the graph touch area 405 is touched, three types of graph images, i.e., line-graph, bar-graph, and block-graph are displayed in order. The denomination indicator 406 displays current denomination. When the menu touch area 407 is touched by the player, the upper image display panel 131 displays the first page of the HELP screen. The sound volume switching touch area 408 is used for switching the game sound volume in three stages. Each time the sound volume switching touch area 408 is touched by the player, the game sound volume is switched such that, for example, from low to middle to high to small to middle.

The upper image display panel 131 is provided at the front face of the top box 12. The upper image display panel 131 includes a liquid crystal panel, and forms the display. The upper image display panel 131 displays images related to effects and images showing introduction of the game contents and explanation of the game rules.

Below the reel unit M1 are provided a control panel 30 having various buttons, a PTS device 700, and a bill entry 60 (equivalent to an input device).

The bill entry 60 validate bills and receives genuine bills into the cabinet 11. The bill entry 60 is electrically connected to the PTS device 700, and when a legitimate bill is received, transmits to the PTS device 700 an input signal based on the value of the bill. The input signal includes information on credit data or the like related to the received bill.

The PTS device 700 is a unit in which an LCD (liquid crystal display), a human detection camera, a microphone, and the like are integrated. The human detection camera makes it possible to detect the presence of a player by the camera function. The microphone is used for the player's participation in a game by voice and the authentication of a player by voice recognition. Further, the PTS device 700 has a card insertion slot to which an IC card can be inserted. With this, the player is able to insert an IC card into the card insertion slot and use the credits stored in the IC card in the slot machine 1.

(Control Panel 30)

On the control panel 30, a HELP button 31 and a CASHOUT button 32 are arranged in the left side area, a 1-BET button 34, a 2-BET button 35, and a 3-BET button 36 are arranged in the middle area, and a spin button 46 is arranged in the lower stage on the left side area.

The HELP button 31 is pressed when, for example, it is unclear how to play a game. As the HELP button 31 is pressed, various help information is displayed on the upper image display panel 131. The CASHOUT button 32 is an operation button used when checking out credits reserved in the slot machine 1 is discharged.

Each time the 1-BET button 34 is pressed, one of the credits currently owned by the player is betted. The 2-BET button 35 is used to start a game with two bets. The 3-BET button 36 is used to start a game with three bets. A gaming value corresponding to one bet can be optionally changed by setting the denomination.

The spin button 46 is used to start the rotation of the reels 101, 102, and 103.

(Symbol Array)

Now, with reference to FIG. 5, the arrays of the symbols 501 on the first reel 101, the second reel 102, and the third reel 103 of the slot machine 1 will be described.

A symbol table shown in FIG. 5 shows arrays of the symbols 501 displayed on the outer circumferential surfaces of the first reel 101, the second reel 102, and the third reel 103. To each of the first reel 101, the second reel 102, and the third reel 103 is assigned a symbol array including 22 symbols 501 respectively corresponding to code numbers 0 to 21.

As shown in FIG. 5, the types of the symbols include "FIRE7", "RED7", "3BAR", "2BAR", "1BAR", and "BLANK".

[Structures of Circuits Provided to Slot Machine]

Figure 8:
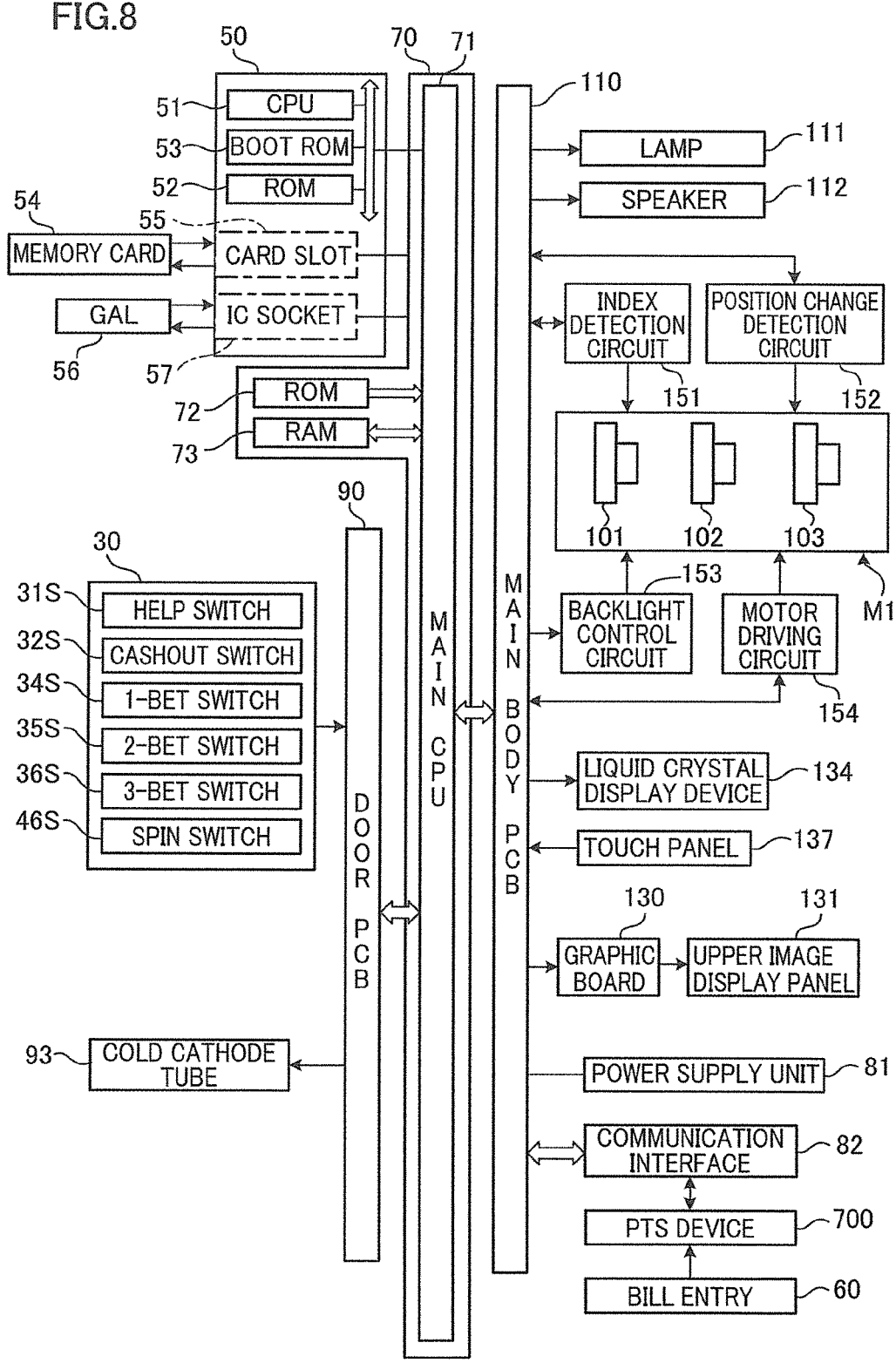
FIG. 8 is a block diagram showing an internal structure of the slot machine of the embodiment of the present invention.

Now, referring to FIG. 8, the configuration of a circuit in the slot machine 1 will be described. FIG. 8 is a block diagram showing an internal structure of the slot machine of the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a nonvolatile memory, and stores a game program. The game program includes a program related to game progression and an effect program for producing effects by images and sounds.

Further, the card slot 55 is configured so that the memory card 54 can be inserted thereinto and removed therefrom, and is connected to a motherboard 70 by an IDE bus. The type and contents of the game to be played on the slot machine 1 can be changed by drawing out the memory card 54 from the card slot 55, writing another game program into the memory card 54, and inserting the memory card 54 into the card slot 55.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents and settings of the game to be played on the slot machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the preliminary authentication program, and the like. The authentication program is a program (falsification check program) for authenticating the game program. The pre-authentication program is a program for authenticating the aforementioned preliminary authentication program. The authentication program and the preliminary authentication program are written along a procedure (authentication procedure) for proving that the program to be the subject has not been falsified.

The motherboard 70 is provided with a main CPU 71, a ROM 72, a RAM 73, and a communication interface 82. The ROM 72 and the RAM 73 correspond to a storage device.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted. Further, through the gaming board 50, a process of loading the game program stored in the memory card 54 is started.

The processor of the present invention includes the main CPU 71, the ROM 72, and the RAM 73 above and the memory card 54 storing the game program, and controls the slot machine by causing the main CPU 71 to execute the game program. Needless to say, the processor may alternatively store the game program in the ROM 72 instead of the memory card 54.

The RAM 73 stores data and programs which are used in operation of the main CPU 71. For example, when the process of loading the aforementioned game program or authentication program is executed, the RAM 73 can store the program. The RAM 73 is provided with working areas used for operations when these programs are executed. Examples of the areas include: an area that stores counter which manages the number of game play, a bet amount, the credit amount, a payout value of each progressive payout, and the like; and an area that stores symbols (code numbers) randomly determined.

In addition to the above, the RAM 73 stores tables such as a symbol combination table (see FIG. 9), a normal mode symbol random determination table determination table (see FIG. 10), a 1BET-2BET symbol random determination table determination table (see FIG. 11), a high-probability mode symbol random determination table determination table (see FIG. 12), symbol random determination tables 0 to 9 (see FIG. 13 to FIG. 22), a high-probability mode shifting random determination table (see FIG. 23), and a falling table (see FIG. 31).

The communication interface 82 is for communicating with the PTS device 700 and the external controller 200. The PTS device 700, upon reception of an input signal from the bill entry 60, transmits credit data contained in the input signal to the main CPU 71 via the communication interface 82. Further, when an IC card is inserted into the card insertion slot, the PTS device 700 transmits credit data stored in the IC card to the main CPU 71 via the communication interface 82. The PTS device 700 also writes credit data into the IC card inserted into the card insertion slot, based on a control signal received from the main CPU 71 via the communication interface 82.

Further, the motherboard 70 is connected with a later-described door PCB (Printed Circuit Board) 90 and a main body PCB 110 by respective USBs. The motherboard 70 is also connected with a power supply unit 81. When the power is supplied from the power supply unit 81 to the motherboard 70, the main CPU 71 of the motherboard 70 is activated, and then power is supplied to the gaming board 50 through the PCI bus so as to activate the CPU 51.

The door PCB 90 and the main body PCB 110 are connected with input devices such as a switch and a sensor, and peripheral devices the operations of which are controlled by the main CPU 71. The door PCB 90 is connected with a control panel 30, and a cold cathode tube 93.

The control panel 30 is provided with a HELP switch 31S, a CASHOUT switch 32S, a 1-BET switch 34S, a 2-BET switch 35S, a 3-BET switch 36S, and a spin switch 46S, correspondingly to the above-described buttons. Each of the switches outputs a signal to the main CPU 71 upon detection of press of the button corresponding thereto by the player.

The cold cathode tube 93 functions as a backlight installed on the rear face side of the upper image display panel 131, and lights up based on a control signal output from the main CPU 71.

The body PCB 110 is connected with a lamp 111, a speaker 112, a graphic board 130, the liquid crystal display device 134, a touch panel 137, an index detection circuit 151, a position change detection circuit 152, a backlight control circuit 153, and a motor driving circuit 154. The index detection circuit 151, the position change detection circuit 152, a backlight control circuit 153, and a motor driving circuit 154 are connected with the reel unit Ml.

The lamp 111 turns on based on a control signal outputted from the main CPU 71. The speakers 112 output BGM sound or the like in accordance with a control signal output from the main CPU 71.

The graphic board 130 controls displaying of images on the upper image display panel 131 based on a control signal output from the main CPU 71. The graphic board 130 is provided with a VDP (Video Display Processor) configured to generate image data, a video RAM configured to store the image data generated by the VDP, and the like. It is to be noted that the image data used for generating image data by the VDP is included in the game program that has been read from the memory card 54 and stored into the RAM 73.

The liquid crystal display device 134 displays an image based on a control signal output from the main CPU 71. The touch panel 137 detects a position on the liquid crystal display device 134 touched by a finger or the like of the player, and outputs a signal corresponding to the detected position to the main CPU 71.

The motor driving circuit 154 is connected to a stepper motor configured to rotate the reels 101, 102, and 103. Further, the motor driving circuit 154 includes an FPGA (Field Programmable Gate Array) and a driver. The FPGA is an electronic circuit such as a programmable LSI, and functions as a control circuit of the stepper motor. The driver functions as an amplifying circuit for pulses to be input to the stepper motor.

The index detection circuit 151 detects the positions of the rotating reels 101, 102, and 103 and is able to detect the step out of the reels 101, 102, and 103.

The position change detection circuit 152 is configured to detect a change in the stop position of the reels 101, 102, and 103 after the rotation of the reels 101, 102, and 103 is stopped. The position change detection circuit 152 detects a change in the stop positions of the reels 101, 102, and 103 when, for example, a stop position is changed to achieve a winning combination of the symbols 501 by an illicit way when no winning combination of the symbols 501 is achieved. The position change detection circuit 152 is configured to detect a change in the stop position of the reels 101, 102, and 103, for example, by detecting not-shown fins which is arranged on the inner sides of the reels 101, 102, and 103 at predetermined intervals.

It should be noted that the method of exciting the stepper motor is not particularly limited, and 1-2 phase excitation system or a 2 phase excitation system are adoptable. Further, a DC motor may be adopted in place of the stepper motor. In cases of adopting a DC motor, the main body PCB 110 is connected to an error counter, a D/A converter, a servo amplifier in this order, and the DC motor is connected to the servo amplifier. Further, the rotational position of the DC motor is detected by the rotary encoder, and the rotary encoder supplies the current rotational position of the DC motor in the form of data to the error counter.

The backlight control circuit 153 is connected to the backlight units to individually supply driving power thereto. Upon receiving an instruction from the main CPU 71, the backlight control circuit 153 changes the amount of light emitted in multiple stages. The five backlight units provided on the inner circumferential surfaces of the reels 101, 102, and 103 are able to individually illuminate 9 symbols 501 having stopped on the display window 150 by means of the backlight control circuit 153.

(Symbol Combination Table)

Now, symbol combination tables will be described with reference to FIG. 9. FIG. 9 shows symbol combination tables in the normal mode and the high-probability mode in the slot machine of the embodiment of the present invention.

The symbol combination tables in the normal mode and the high-probability mode define payouts for bet amounts and symbol combinations achieving winning (WIN). In the slot machine 1, the rotational scroll of the reels 101, 102, and 103 is stopped, and when a combination of three symbols displayed (rearranged) on a payline corresponds to a symbol combination defined in the symbol combination table, winning is achieved. In accordance with the type of winning, a benefit will be given to the player in the form of awarding payout and the like. It is noted that winning is not established (i.e. the game is lost) when the combination of symbols displayed (rearranged) on the payline does not match with any of the combinations of symbols specified by the symbol combination table.

Basically, winning is achieved when three symbols of the following types are displayed on a payline: "FIRE7", "RED7", "3BAR", "2BAR", "1BAR", and "BLANK". Furthermore, winning is achieved as "ANY7" when a symbol combination including "FIRE7" and "RED7" is established. Winning as "ANYBAR" is also achieved when a symbol combination including "3BAR", "2BAR", and "1BAR" is established. When the game is played with one bet, no payout is awarded for "FIRE7", "RED7", and "ANY7". When the game is played with three bets, progressive payout (initial value 1000+incremented amount) is awarded when three "FIRE7" are rearranged on a payline.

(Symbol Random Determination Tables 0 to 9)

Now, 10 types of symbol random determination tables 0 to 9 will be described with reference to FIG. 13 to FIG. 22. In the present embodiment, each of the 10 types of symbol random determination tables 0 to 9 is a random determination table defining probabilities (WEIGHT) of 22 symbols regarding the reels 101, 102, and 103, which are referred to in a symbol random determination process of determining symbols to be rearranged in the middle stage (payline) of the display window 150 in a main control process (normal mode) and a high-probability mode process which will be described later.

In the slot machine 1 of the present embodiment, the 10 types of symbol random determination tables 0 to 9 shown in FIG. 13 to FIG. 22 are stored in the RAM 73. In the 10 types of symbol random determination tables 0 to 9, probabilities (WEIGHT) are set for 22 symbols corresponding to code numbers "0" to "21", respectively. Each probability (WEIGHT) indicates a probability that the corresponding symbol 501 is rearranged in the middle stage (on the payline) of the display window 150. For example, in the symbol random determination table 0 shown in FIG. 13, "FIRE7" of the first reel 101 corresponding to the code number "0" is rearranged in the middle stage of the display window 150 (on the payline) at a probability of 4/71. "RED7" of the second reel 102 corresponding to the code number "4" is rearranged in the middle stage of the display window 150 (on the payline) at a probability of 1/120. "3BAR" of the second reel 103 corresponding to the code number "8" is rearranged in the middle stage of the display window 150 (on the payline) at a probability of 4/46.

As described above, in the 10 types of symbol random determination tables 0 to 9, probabilities (WEIGHT) are set for 22 symbols corresponding to code numbers "0" to "21", respectively. In the 10 types of symbol random determination tables 0 to 9, probabilities (WEIGHT) corresponding to the respective 22 symbols are arranged to be different from one another.

In the symbol random determination table 0, probabilities (WEIGHT) corresponding to the respective 22 symbols on the reels 101 to 103 are set so that the probabilities of the rearrangement of "FIRE7" and "RED7" symbols are low as compared to the other symbol random determination tables 1 to 9. In the symbol random determination table 0, furthermore, in regard to the probabilities (WEIGHT) corresponding to the respective 22 symbols on the reels 101 to 103, the expectation on payout is low as compared to the other symbol random determination tables 1 to 9 (i.e., a low-expectation symbol random determination table). For example, in the symbol random determination table 0, on the first reel 101, a probability that the "FIRE7" is rearranged in the middle stage of the display window 150 (on the payline) is 4/71 (code number "0")+4/71 (code number "10")=8/71. On the second reel 102, a probability that the "FIRE7" is rearranged in the middle stage of the display window 150 (on the payline) is 1/120 (code number "0"). On the third reel 103, a probability that the "FIRE7" is rearranged in the middle stage of the display window 150 (on the payline) is 1/46 (code number "0")+1/46 (code number "10")=2/46. In the meanwhile, in the symbol random determination table 1, on the first reel 101, a probability that the "FIRE7" is rearranged in the middle stage of the display window 150 (on the payline) is 20/60 (code number "0")+20/60 (code number "10")=40/60. On the second reel 102, a probability that the "FIRE7" is rearranged in the middle stage of the display window 150 (on the payline) is 1/76 (code number "0"). On the third reel 103, a probability that the "FIRE7" is rearranged in the middle stage of the display window 150 (on the payline) is 5/400 (code number "0")+5/400 (code number "10")=10/400. As such, in the symbol random determination table 0, probabilities (WEIGHT) corresponding to the respective 22 symbols on the reels 101 to 103 are set so that the probabilities of the rearrangement of "FIRE7" and "RED7" symbols are low as compared to the symbol random determination table 1. Because the probability that "FIRE7" resulting in high payout is rearranged on the payline is low, the symbol random determination table 0 is arranged so that, in regard to the probabilities (WEIGHT) corresponding to the respective 22 symbols on the reels 101 to 103, the expectation on payout is low as compared to the symbol random determination table 1.

In the symbol random determination tables 1 to 3, probabilities (WEIGHT) corresponding to the respective 22 symbols on the reels 101 to 103 are set so that the probabilities of the rearrangement of "FIRE7" and "RED7" symbols in the display window 150 (on which 9 symbols forming three rows and three columns are rearranged) are high as compared to the other symbol random determination table 0. For example, in the symbol random determination table 1, on the first reel 101, a probability that "FIRE7" is rearranged in the upper stage, the middle stage, and the lower stage of the display window 150 is 1/60 (code number "21")+20/60 (code number "0")+1/60 (code number "1")+1/60 (code number "9")+20/60 (code number "10")+1/60 (code number "11")=44/60. On the second reel 102, a probability that the "FIRE7" is rearranged in the upper stage, the middle stage, and the lower stage of the display window 150 (on the payline) is 1/76 (code number "21")+1/76 (code number "0")+1/76 (code number "1")=3/76. On the third reel 103, a probability that "FIRE7" is rearranged in the upper stage, the middle stage, and the lower stage of the display window 150 is 30/400 (code number "21")+5/400 (code number "0")+30/400 (code number "1")+30/400 (code number "9")+5/400 (code number "10")+30/400 (code number "11")=130/400. In the meanwhile, in the symbol random determination table 0, on the first reel 101, a probability that "FIRE7" is rearranged in the upper stage, the middle stage, and the lower stage of the display window 150 is 1/71 (code number "21")+4/71 (code number "0")+2/71 (code number "1")+1/71 (code number "9")+4/71 (code number "10")+1/71 (code number "11")=13/71. On the second reel 102, a probability that the "FIRE7" is rearranged in the upper stage, the middle stage, and the lower stage of the display window 150 (on the payline) is 6/120 (code number "21")+1/120 (code number "0")+6/120 (code number "1")=13/120. On the third reel 103, a probability that "FIRE7" is rearranged in the upper stage, the middle stage, and the lower stage of the display window 150 is 1/46 (code number "21")+1/46 (code number "0")+2/46 (code number "1")+2/46 (code number "9")+1/46 (code number "10")+2/46 (code number "11")=9/46. As such, in the symbol random determination table 1, probabilities (WEIGHT) corresponding to the respective 22 symbols on the reels 101 to 103 are set so that the probabilities of the rearrangement of "FIRE7" and "RED7" symbols in the upper stage, the middle stage, and the lower stage of the display window 150 are low as compared to the symbol random determination table 0.

In the symbol random determination tables 4 to 6, in regard to the first reel 101 and the second reel 102, probabilities (WEIGHT) corresponding to the respective 22 symbols on the reels 101 to 103 are set so that the probabilities of the rearrangement of "FIRE7" and "RED7" symbols in the middle stage of the display window 150 (on the payline) are high as compared to the other symbol random determination tables 0 to 3. In other words, in the symbol random determination tables 4 to 6, the probabilities (WEIGHT) corresponding to the respective 22 symbols on the reels 101 to 103 are arranges so that the tenpai (a state in which a combination of symbols is one short of a predetermined symbol combination: also known as lizhi) of winning with "FIRE7" or winning with "RED7" is more probable to be established as compared to the other symbol random determination tables 0 to 3. For example, in the symbol random determination table 4, on the first reel 101, a probability that the "FIRE7" is rearranged in the middle stage of the display window 150 (on the payline) is 30/88 (code number "0")+30/88 (code number "10")=60/88. On the second reel 102, a probability that the "FIRE7" is rearranged in the middle stage of the display window 150 (on the payline) is 5/104 (code number "0"). In the symbol random determination table 4, a probability that the tenpai of "FIRE7" is established is (60/88)×(5/104)≈0.032. In the meanwhile, in the symbol random determination table 1, on the first reel 101, a probability that the "FIRE7" is rearranged in the middle stage of the display window 150 (on the payline) is 20/60 (code number "0")+20/60 (code number "10")=40/60. On the second reel 102, a probability that the "FIRE7" is rearranged in the middle stage of the display window 150 (on the payline) is 1/76 (code number "0"). In the symbol random determination table 1, a probability that the tenpai of "FIRE7" is established is (40/60)×(1/76) ≈0.009. As such, in the symbol random determination table 4, in regard to the first reel 101 and the second reel 102, probabilities (WEIGHT) corresponding to the respective 22 symbols on the reels 101 to 103 are set so that the probabilities of the rearrangement of "FIRE7" and "RED7" symbols in the middle stage of the display window 150 (on the payline) are high as compared to the other symbol random determination table 1.

In the symbol random determination tables 7 to 9, probabilities (WEIGHT) corresponding to the respective 22 symbols on the reels 101 to 103 are set so that winning with "FIRE7" or winning with "RED7" is more probable to be achieved as compared to the other symbol random determination tables 0 to 6. In the symbol random determination tables 7 to 9, furthermore, in regard to the probabilities (WEIGHT) corresponding to the respective 22 symbols on the reels 101 to 103, the expectation on payout is high as compared to the other symbol random determination tables 0 to 6 (i.e., a high-expectation symbol random determination table). For example, in the symbol random determination table 7, on the first reel 101, a probability that the "FIRE7" is rearranged in the middle stage of the display window 150 (on the payline) is 40/138 (code number "0")+40/138 (code number "10")=80/138. On the second reel 102, a probability that the "FIRE7" is rearranged in the middle stage of the display window 150 (on the payline) is 1/140 (code number "0"). On the third reel 103, a probability that the "FIRE7" is rearranged in the middle stage of the display window 150 (on the payline) is 10/78 (code number "0")+10/78 (code number "10")=20/78. Therefore, in the symbol random determination table 7, a probability that the winning with "FIRE7" is established is (80/138)×(1/140)×(20/78) ≈0.00106. In the meanwhile, in the symbol random determination table 1, on the first reel 101, a probability that the "FIRE7" is rearranged in the middle stage of the display window 150 (on the payline) is 20/60 (code number "0")+ 20/60 (code number "10")=40/60. On the second reel 102, a probability that the "FIRE7" is rearranged in the middle stage of the display window 150 (on the payline) is 1/76 (code number "0"). On the third reel 103, a probability that the "FIRE7" is rearranged in the middle stage of the display window 150 (on the payline) is 5/400 (code number "0")+ 5/400 (code number "10")=10/400. Therefore, in the symbol random determination table 1, a probability that the winning with "FIRE7" is established is (40/60)×(1/76)×(5/400) ≈0.0001. As such, in the symbol random determination table 7, probabilities (WEIGHT) corresponding to the respective 22 symbols on the reels 101 to 103 are set so that winning with "FIRE7" is more probable to be achieved as compared to the other symbol random determination table 1. Because the probability that "FIRE7" resulting in high payout is rearranged on the payline is high, the symbol random determination table 7 is arranged so that, in regard to the probabilities (WEIGHT) corresponding to the respective 22 symbols on the reels 101 to 103, the expectation on payout is high as compared to the symbol random determination table 1. Furthermore, in the symbol random determination table 7, a probability of rearrangement of the "FIRE7" symbol is high as compared to the other symbol random determination table 1.

With the 10 types of symbol random determination tables 0 to 9 above, when one of the symbol random determination tables 1 to 9 is selected from the symbol random determination tables 0 to 9, a probability of the selection of a predetermined symbol such as "FIRE7" or "RED7" in the symbol random determination process is high, and hence the predetermined symbol such as "FIRE7" or "RED7" is more probable to be rearranged in the display window 150. This may increase the player's expectation on payout based on a combination of predetermined symbols such as "FIRE7" and "RED7".

When one of the symbol random determination tables 4 to 6 is selected from the symbol random determination tables 0 to 9, a combination one short of a combination of a predetermined symbol such as "FIRE7" or "RED7" (so-called tenpai) is more probable to be established. The player therefore often sees a state in which the predetermined symbol such as "FIRE7" or "RED7" forms tenpai, and hence player's expectation on a payout based on a combination of a predetermined symbol such as "FIRE7" or "RED7" may be increased.

In addition to the above, when a symbol random determination table in which expectation on payout is high as compared to other symbol random determination tables is selected from the symbol random determination tables 0 to 9, symbols with which expectation on payout is high are more probable to be rearranged because in the symbol random determination process a probability of the selection of a symbol with which expectation on payout is high is increased. In the meanwhile, when a symbol random determination table in which expectation on payout is low as compared to other symbol random determination tables is selected from the symbol random determination tables 0 to 9, symbols with which expectation on payout is low are more probable to be rearranged because in the symbol random determination process a probability of the selection of a symbol with which expectation on payout is low is increased. As such, by executing the symbol random determination table random determination (described later) to select a symbol random determination table in each game, expectation on payout awarded as a result of a combination of rearranged symbols is easily changeable.

(Normal Mode Symbol Random Determination Table Determination Table)

Now, the following will describe a normal mode symbol random determination table determination table (equivalent to the symbol random determination table) will be described with reference to FIG. 10. The normal mode symbol random determination table determination table is referred to in a later-described normal mode symbol random determination table random determination process in the main control process (only when three bets are placed).

As shown in FIG. 10, in the normal mode symbol random determination table determination table, a probability of random selection of one of the 10 types of symbol random determination tables 0 to 9 is defined for each of the symbol random determination tables 0 to 9. To be more specific, the symbol random determination table 0 is selected at a probability of 5200/5542 from the 10 types of symbol random determination tables 0 to 9. The symbol random determination table 1 is selected at a probability of 100/5542 from the 10 types of symbol random determination tables 0 to 9. The symbol random determination table 2 is selected at a probability of 100/5542 from the 10 types of symbol random determination tables 0 to 9. The symbol random determination table 3 is selected at a probability of 96/5542 from the 10 types of symbol random determination tables 0 to 9. The symbol random determination table 4 is selected at a probability of 14/5542 from the 10 types of symbol random determination tables 0 to 9. The symbol random determination table 5 is selected at a probability of 14/5542 from the 10 types of symbol random determination tables 0 to 9. The symbol random determination table 6 is selected at a probability of 14/5542 from the 10 types of symbol random determination tables 0 to 9. The symbol random determination table 7 is selected at a probability of 2/5542 from the 10 types of symbol random determination tables 0 to 9. The symbol random determination table 8 is selected at a probability of 1/5542 from the 10 types of symbol random determination tables 0 to 9. The symbol random determination table 9 is selected at a probability of 1/5542 from the 10 types of symbol random determination tables 0 to 9.

(1BET-2BET Symbol Random Determination Table Determination Table)

Now, the following describes a 1BET-2BET symbol random determination table determination table with reference to FIG. 11. The 1BET-2BET symbol random determination table determination table is a table which is referred to in a later-described 1BET-2BET symbol random determination table random determination process in the main control process and a 1BET-2BET symbol random determination table random determination process in the high-probability mode process (when one bet or two bets is/are placed: 1BET-2BET mode).

As shown in FIG. 11, in the 1BET-2BET symbol random determination table determination table, a probability of random selection of one of the 10 types of symbol random determination tables 0 to 9 is defined for each of the symbol random determination tables 0 to 9. To be more specific, the symbol random determination table 0 is selected at a probability of 3340/4168 from the 10 types of symbol random determination tables 0 to 9. The symbol random determination table 1 is selected at a probability of 280/4168 from the 10 types of symbol random determination tables 0 to 9. The symbol random determination table 2 is selected at a probability of 220/4168 from the 10 types of symbol random determination tables 0 to 9. The symbol random determination table 3 is selected at a probability of 200/4168 from the 10 types of symbol random determination tables 0 to 9. The symbol random determination table 4 is selected at a probability of 36/4168 from the 10 types of symbol random determination tables 0 to 9. The symbol random determination table 5 is selected at a probability of 30/4168 from the 10 types of symbol random determination tables 0 to 9. The symbol random determination table 6 is selected at a probability of 30/4168 from the 10 types of symbol random determination tables 0 to 9. The symbol random determination table 7 is selected at a probability of 21/4168 from the 10 types of symbol random determination tables 0 to 9. The symbol random determination table 8 is selected at a probability of 10/4168 from the 10 types of symbol random determination tables 0 to 9. The symbol random determination table 9 is selected at a probability of 1/4168 from the 10 types of symbol random determination tables 0 to 9.

(High-Probability Mode Symbol Random Determination Table Determination Table)

Now, the following will describe a high-probability mode symbol random determination table determination table (equivalent to the high-probability symbol random determination table determination table) will be described with reference to FIG. 12. The high-probability mode symbol random determination table determination table is referred to in a later-described high-probability mode symbol random determination table random determination process in the high-probability mode process (only when three bets are placed).

As shown in FIG. 12, in the high-probability mode symbol random determination table determination table, a probability of random selection of one of the 10 types of symbol random determination tables 0 to 9 is defined for each of the symbol random determination tables 0 to 9. To be more specific, the symbol random determination table 0 is selected at a probability of 20/644 from the 10 types of symbol random determination tables 0 to 9. The symbol random determination table 1 is selected at a probability of 50/644 from the 10 types of symbol random determination tables 0 to 9. The symbol random determination table 2 is selected at a probability of 60/644 from the 10 types of symbol random determination tables 0 to 9. The symbol random determination table 3 is selected at a probability of 80/644 from the 10 types of symbol random determination tables 0 to 9. The symbol random determination table 4 is selected at a probability of 300/644 from the 10 types of symbol random determination tables 0 to 9. The symbol random determination table 5 is selected at a probability of 100/644 from the 10 types of symbol random determination tables 0 to 9. The symbol random determination table 6 is selected at a probability of 10/644 from the 10 types of symbol random determination tables 0 to 9. The symbol random determination table 7 is selected at a probability of 6/644 from the 10 types of symbol random determination tables 0 to 9. The symbol random determination table 8 is selected at a probability of 17/644 from the 10 types of symbol random determination tables 0 to 9. The symbol random determination table 9 is selected at a probability of 1/644 from the 10 types of symbol random determination tables 0 to 9.

By the above-described high-probability mode symbol random determination table determination table, when high-probability symbol random determination table random determination is performed based on the high-probability mode symbol random determination table determination table, a symbol random determination table in which a probability of rearrangement of a predetermined symbol such as "FIRE7" or "RED7" is high is more probable to be selected as compared to normal mode symbol random determination table random determination based on the normal mode symbol random determination table determination table. In other words, in the slot machine 1, when the high-probability symbol random determination table random determination is performed based on the high-probability mode symbol random determination table determination table, a symbol random determination table in which a probability of rearrangement of a predetermined symbol such as "FIRE7" or "RED7" is high is more probable to be selected. In this way, in the high-probability mode, the predetermined symbol such as "FIRE7" or "RED7" is more probable to be rearranged as a result of the symbol random determination process as compared to the normal mode. This may increase the player's expectation on payout based on a combination of predetermined symbols such as "FIRE7" and "RED7".

Furthermore, when the high-probability symbol random determination table random determination is performed based on the high-probability mode symbol random determination table determination table, a symbol random determination table in which a probability of the formation of tenpai with a predetermined symbol such as "FIRE7" or "RED7" is high in the symbol random determination process is more probable to be selected as compared to normal mode symbol random determination table random determination based on the normal mode symbol random determination table determination table. In this way, in the high-probability mode, tenpai with the predetermined symbol such as "FIRE7" or "RED7" is more probable as a result of the symbol random determination process as compared to the normal mode. This may increase the player's expectation on payout based on a combination of predetermined symbols.

In addition to the above, when the high-probability symbol random determination table random determination is performed based on the high-probability mode symbol random determination table determination table, a symbol random determination table in which expectation on payout is high is more probable to be selected as compared to normal mode symbol random determination table random determination based on the normal mode symbol random determination table determination table. That is to say, in the slot machine 1, when the high-probability symbol random determination table random determination is performed based on the high-probability mode symbol random determination table determination table, a symbol random determination table in which expectation on payout is high is more probable to be selected. In this way, in the high-probability mode, expectation on payout as a result of the symbol random determination process is high as compared to the normal mode. This may increase the player's expectation on the payout.

In addition to the above, in the present embodiment, the normal mode in which a symbol random determination table is selected by the normal mode symbol random determination table random determination based on the normal mode symbol random determination table determination table and the high-probability mode in which a symbol random determination table is selected by the high-probability symbol random determination table random determination based on the high-probability mode symbol random determination table determination table are executed. Both in the normal mode symbol random determination table random determination and in the high-probability symbol random determination table random determination, the same symbol random determination tables 0 to 9 are used. As such, the symbol random determination tables 0 to 9 are shared between the normal mode and the high-probability mode. It is therefore possible to save the memory space of the storage device such as the RAM 73 as compared to a case where a dedicated symbol random determination table is prepared for each of the normal mode and the high-probability mode.

(High-Probability Mode Shifting Random Determination Table)

Now, a high-probability mode shifting random determination table will be described with reference to FIG. 23. The high-probability mode shifting random determination table is a table which is referred to in a later-described high-probability mode shifting random determination process in the main control process.

Figure 25:
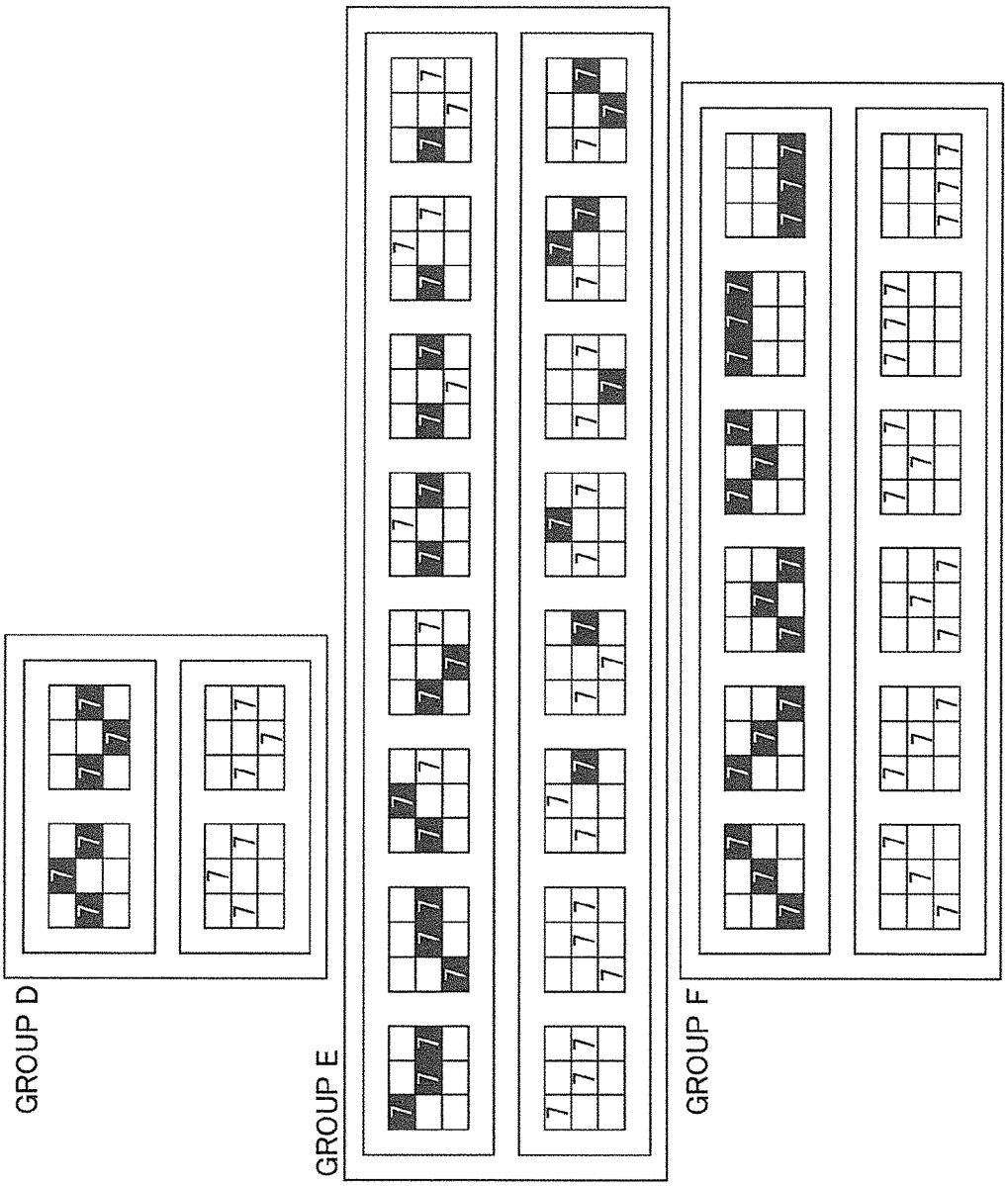
FIG. 25 illustrates groups corresponding to combinations of symbols in the slot machine of the embodiment of the present invention.

In the high-probability mode shifting random determination table, as shown in FIG. 23, a winning probability (WEIGHT) of shifting from the normal mode to the high-probability mode and a probability (loss) of not shifting from the normal mode to the high-probability mode are associated with each of 8 types of groups A to H of symbol combinations (equivalent to combination of plural types of specific symbols) (see FIG. 24 to FIG. 26).

As shown in FIG. 24, a symbol combination of the group A is formed when, for example, "FIRE7" on the first reel 101 is rearranged in the middle stage of the display window 150 (on the payline), "FIRE7" on the second reel 102 is rearranged in the middle stage of the display window 150 (on the payline), and "FIRE7" on the third reel 101 is rearranged in the upper stage of the display window 150. (See FIG. 24 for other symbol combinations of the group A.)

As shown in FIG. 24, a symbol combination of the group B is formed when, for example, "RED7" on the first reel 101 is rearranged in the middle stage of the display window 150 (on the payline), "RED7" on the second reel 102 is rearranged in the middle stage of the display window 150 (on the payline), and "RED7" on the third reel 101 is rearranged in the upper stage of the display window 150. (See FIG. 24 for other symbol combinations of the group B.)

As shown in FIG. 24, a symbol combination of the group C is formed when, for example, "FIRE7" on the first reel 101 is rearranged in the middle stage of the display window 150 (on the payline), "RED7" on the second reel 102 is rearranged in the middle stage of the display window 150 (on the payline), and "FIRE7" on the third reel 101 is rearranged in the upper stage of the display window 150. (See FIG. 24 for other symbol combinations of the group C.)

As shown in FIG. 25, a symbol combination of the group D is formed when, for example, "FIRE7" on the first reel 101 is rearranged in the middle stage of the display window 150 (on the payline), "FIRE7" on the second reel 102 is rearranged in the upper stage of the display window 150 (on the payline), and "FIRE7" on the third reel 101 is rearranged in the middle stage of the display window 150. (See FIG. 25 for other symbol combinations of the group D.)

As shown in FIG. 25, a symbol combination of the group E is formed when, for example, "FIRE7" on the first reel 101 is rearranged in the upper stage of the display window 150 (on the payline), "FIRE7" on the second reel 102 is rearranged in the middle stage of the display window 150 (on the payline), and "FIRE7" on the third reel 101 is rearranged in the middle stage of the display window 150. (See FIG. 25 for other symbol combinations of the group E.)

As shown in FIG. 25, a symbol combination of the group F is formed when, for example, "FIRE7" on the first reel 101 is rearranged in the lower stage of the display window 150 (on the payline), "FIRE7" on the second reel 102 is rearranged in the middle stage of the display window 150 (on the payline), and "FIRE7" on the third reel 101 is rearranged in the upper stage of the display window 150. (See FIG. 25 for other symbol combinations of the group F.)

As shown in FIG. 26, a symbol combination of the group G is formed when, for example, "FIRE7" on the first reel 101 is rearranged in the upper stage of the display window 150 (on the payline), "FIRE7" on the second reel 102 is rearranged in the middle stage of the display window 150 (on the payline), and "RED7" on the third reel 101 is rearranged in the middle stage of the display window 150. (See FIG. 26 for other symbol combinations of the group G.)

The group H is a combination of three symbols "FIRE7" or "RED7" are rearranged in the display window 150 in a manner different from the groups A to G. For example, as shown in FIG. 26, a symbol combination of the group H is formed when "FIRE7" on the first reel 101 is rearranged in the middle stage of the display window 150 (on the payline), "RED7" on the second reel 102 is rearranged in the lower stage of the display window 150, and "RED7" on the third reel 101 is rearranged in the upper stage of the display window 150.

In the present embodiment, as shown in FIG. 23, in the high-probability mode shifting random determination table of the present embodiment, winning probabilities (WEIGHT) of shifting from the normal mode to the high-probability mode associated with the 8 types of group A to H of symbol combinations (see FIG. 24 to FIG. 26), respectively, are as follows: 95/100 is associated with the group A; 75/100 is associated with the group B; 55/100 is associated with the group C; 30/100 is associated with the group D; 19/100 is associated with the group E; 10/100 is associated with the group F; 5/100 is associated with the group G; and 1/100 is associated with the group H. In other words, the winning probabilities of shifting from the normal mode to the high-probability mode are arranged as follows: the group A>the group B>the group C>the group D>the group E>the group F>the group G>the group H.

As described above, because winning probabilities of shifting from the normal mode to the high-probability mode can be differentiated for the respective groups A to H of symbol combinations displayed in the display window 150, it is possible to change a winning probability of shifting from the normal mode to the high-probability mode without requiring complicated control.

(Rules of Grouping)

Figure 27:
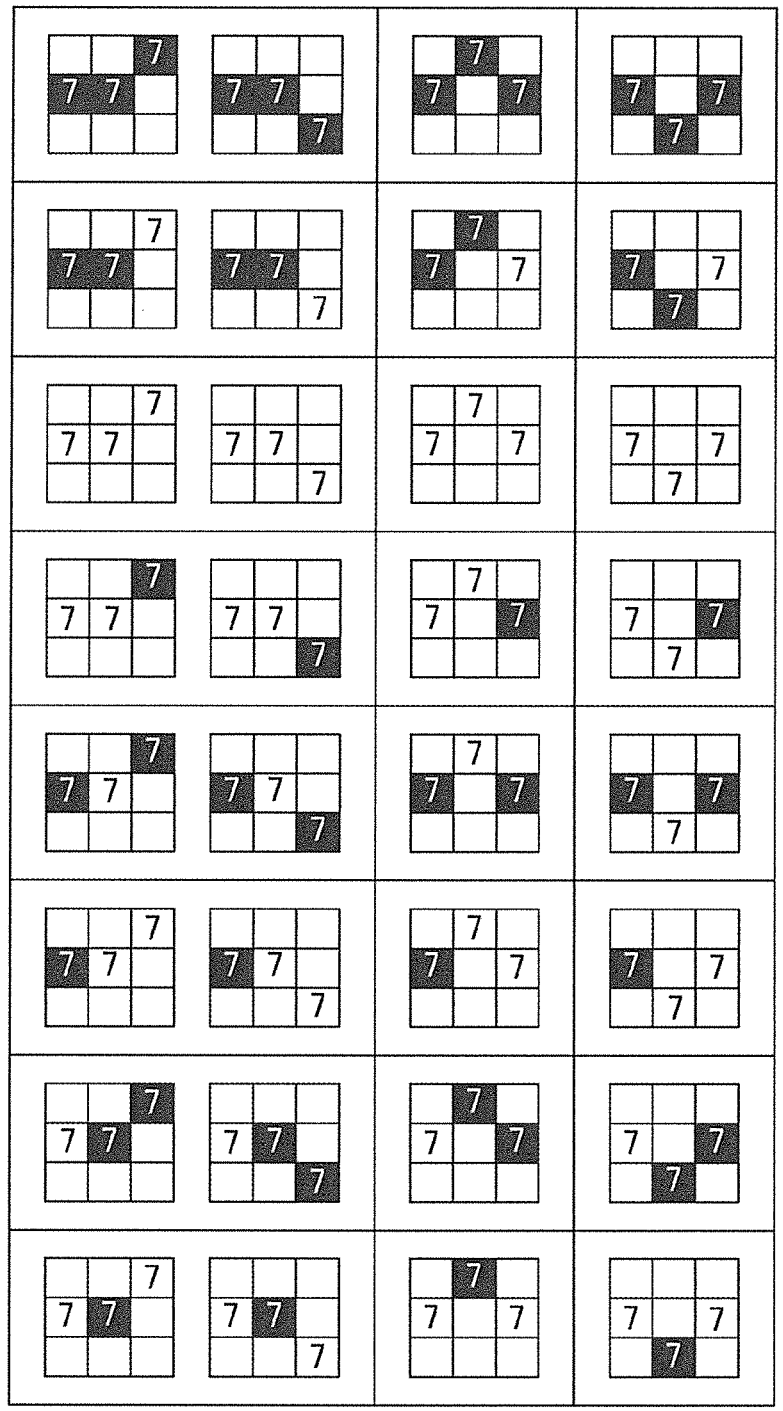
FIG. 27 illustrates the rule of grouping in the embodiment of the present invention.
Figure 28:
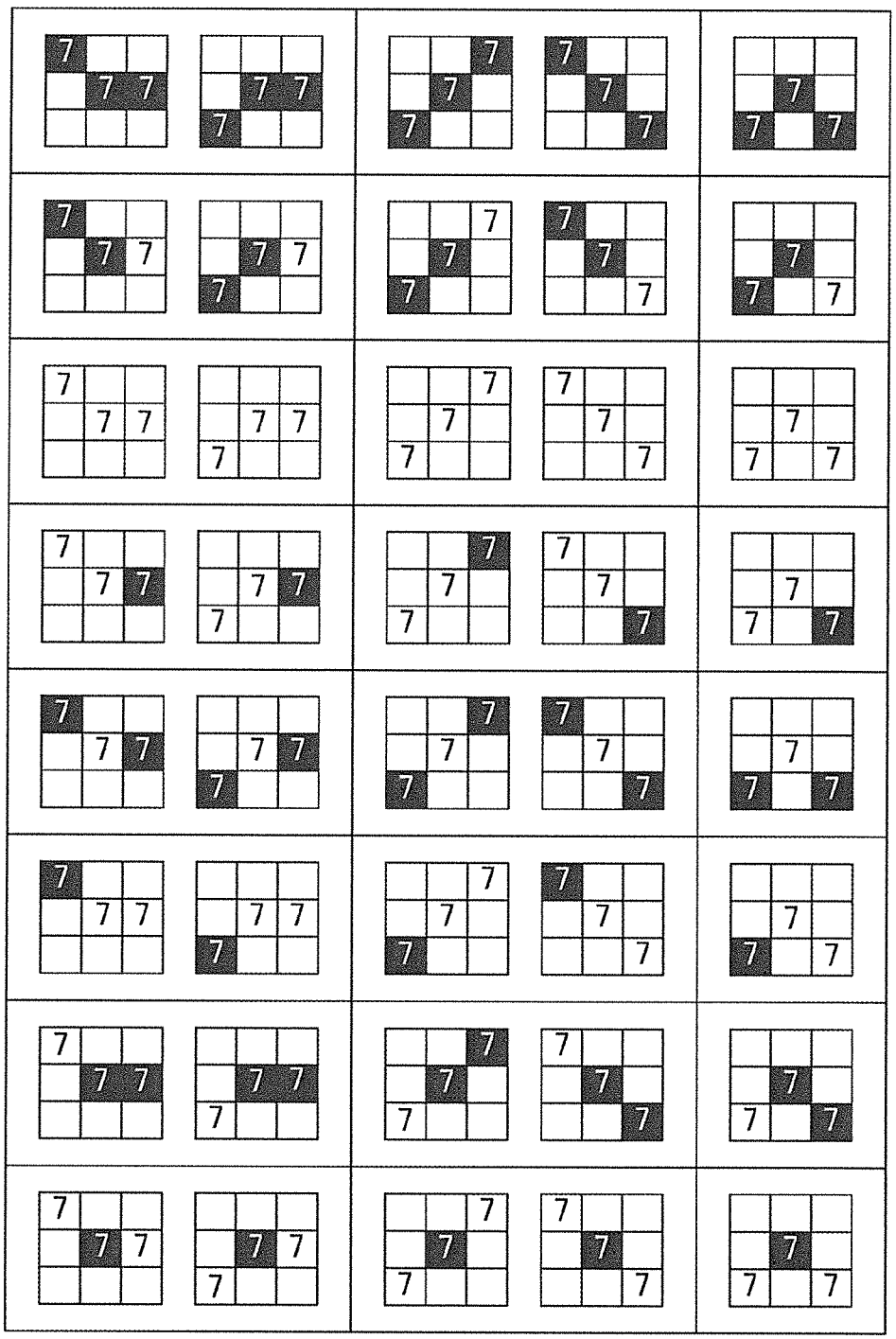
FIG. 28 illustrates the rule of grouping in the embodiment of the present invention.
Figure 29:
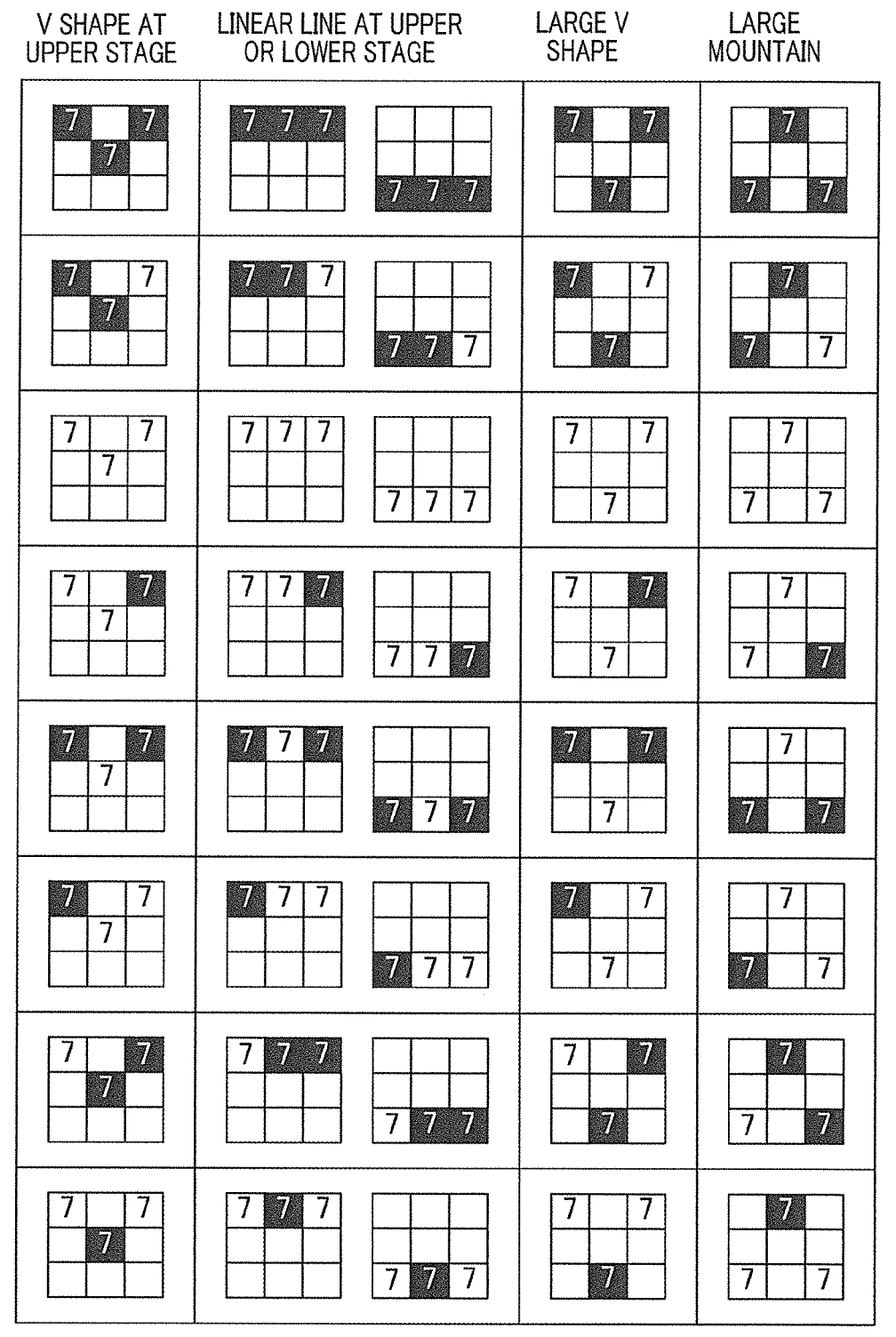

Combinations of symbols rearranged in the display window 150 are grouped into a group with no tenpai, a group with a small mountain at the middle stage, and a group with a V shape at the middle stage shown in FIG. 27, a group with loss by last middle stage, an oblique linear line group, and a group with a small mountain at the lower stage shown in FIG. 28, and a group with a V shape at the upper stage, a group with linear line at the upper or lower stage, a group with a large V shape, and a group with a large mountain shown in FIG. 29. In the cases above, the rank of a symbol combination is high when "FIRE7" or "RED7" is rearranged on a payline. Furthermore, the rank of a symbol combination is high as the number of "FIRE7" is large. Furthermore, rearrangement of "FIRE7" on the first reel 101 is ranked to be higher than rearrangement of "RED7" on the first reel 101, but a symbol combination of three "RED7" is ranked to be higher than a symbol combination of mixed "FIRE7" and "RED7". In addition to the above, the ranks of the groups are as follows: a group with no tenpai>a group with a small mountain at the middle stage=group with a V shape at the middle stage>a group with loss by last middle stage>an oblique linear line group>a group with a small mountain at the lower stage=group with a V shape at the upper stage>a group with linear line at the upper or lower stage>a group with a large V shape=group with a large mountain.

In addition to the above, among the symbol combinations, as shown in FIG. 30, a symbol combination of rearrangement of "FIRE7" on the first reel 101, "FIRE7" on the second reel 102, and "FIRE7" on the third reel 101 in the display window 150 is ranked first. In the meanwhile, a symbol combination of rearrangement of "FIRE7" on the first reel 101, "FIRE7" on the second reel 102, and "RED7" on the third reel 101 in the display window 150 is ranked second. In the meanwhile, a symbol combination of rearrangement of "RED7" on the first reel 101, "RED7" on the second reel 102, and "RED7" on the third reel 101 in the display window 150 is ranked third. In the meanwhile, a symbol combination of rearrangement of "RED7" on the first reel 101, "RED7" on the second reel 102, and "FIRE7" on the third reel 101 in the display window 150 is ranked fourth. In the meanwhile, a symbol combination of rearrangement of "FIRE7" on the first reel 101, "RED7" on the second reel 102, and "FIRE7" on the third reel 101 in the display window 150 is ranked fifth. In the meanwhile, a symbol combination of rearrangement of "FIRE7" on the first reel 101, "RED7" on the second reel 102, and "RED7" on the third reel 101 in the display window 150 is ranked sixth. In the meanwhile, a symbol combination of rearrangement of "RED7" on the first reel 101, "FIRE7" on the second reel 102, and "FIRE7" on the third reel 101 in the display window 150 is ranked seventh. In the meanwhile, a symbol combination of rearrangement of "RED7" on the first reel 101, "FIRE7" on the second reel 102, and "RED7" on the third reel 101 in the display window 150 is ranked eighth.

(Falling Table)

Now, the falling table will be described with reference to FIG. 31. The falling table is referred to in a later-described falling random determination process in the high-probability mode process.

In the falling table, as shown in FIG. 31, a probability (WEIGHT) of maintenance of the high-probability mode and a probability of falling, i.e., shifting from the high-probability mode to the normal mode are defined. To be more specific, in the table, the probability (WEIGHT) of maintenance of the high-probability mode is 70/100 (70%) whereas the probability of falling (shifting from the high-probability mode to the normal mode) is 30/100 (30%).

(Contents of Program)

Figure 33:
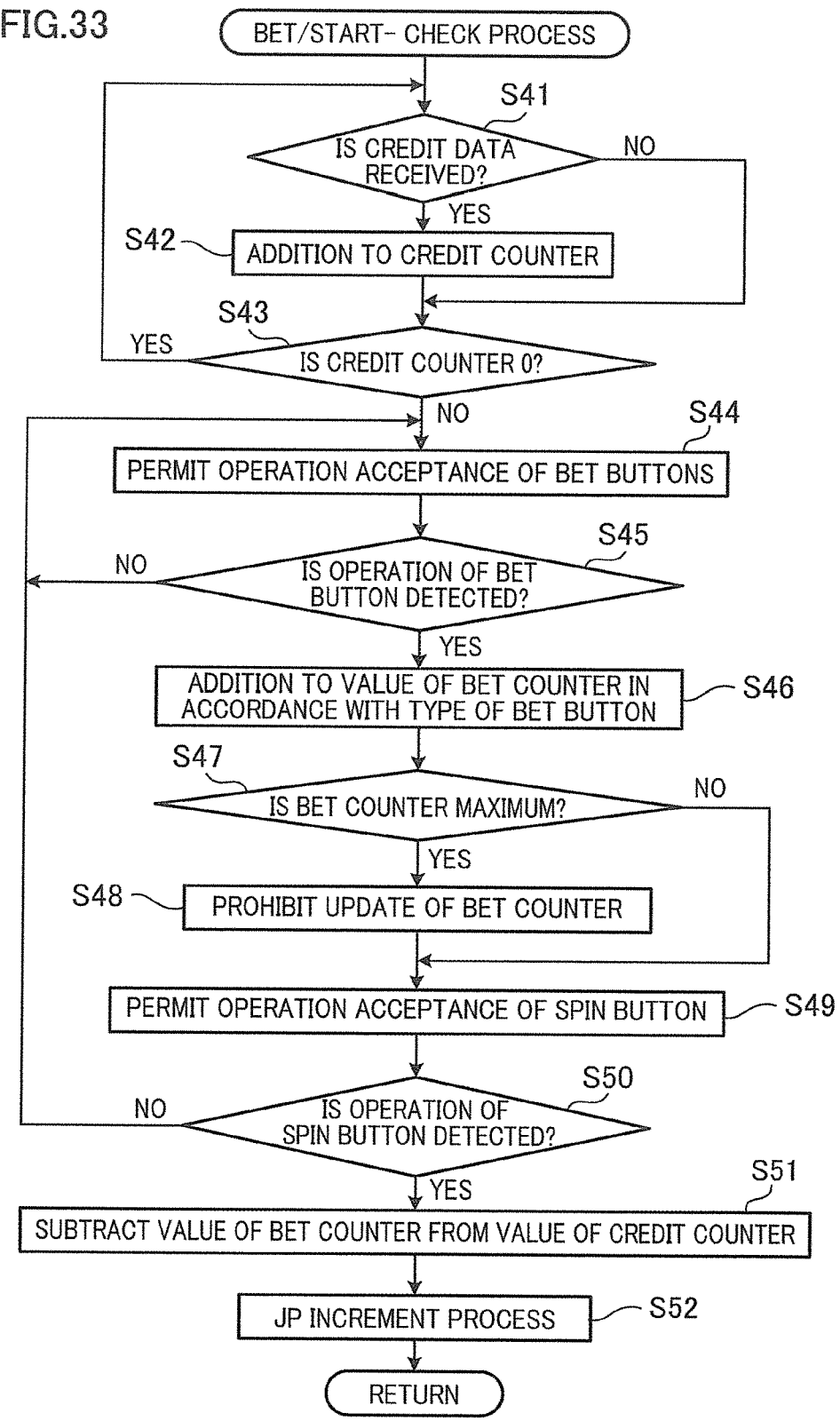
FIG. 33 is a flowchart of a bet/start-check process of the slot machine of the embodiment of the present invention.
Figure 34:
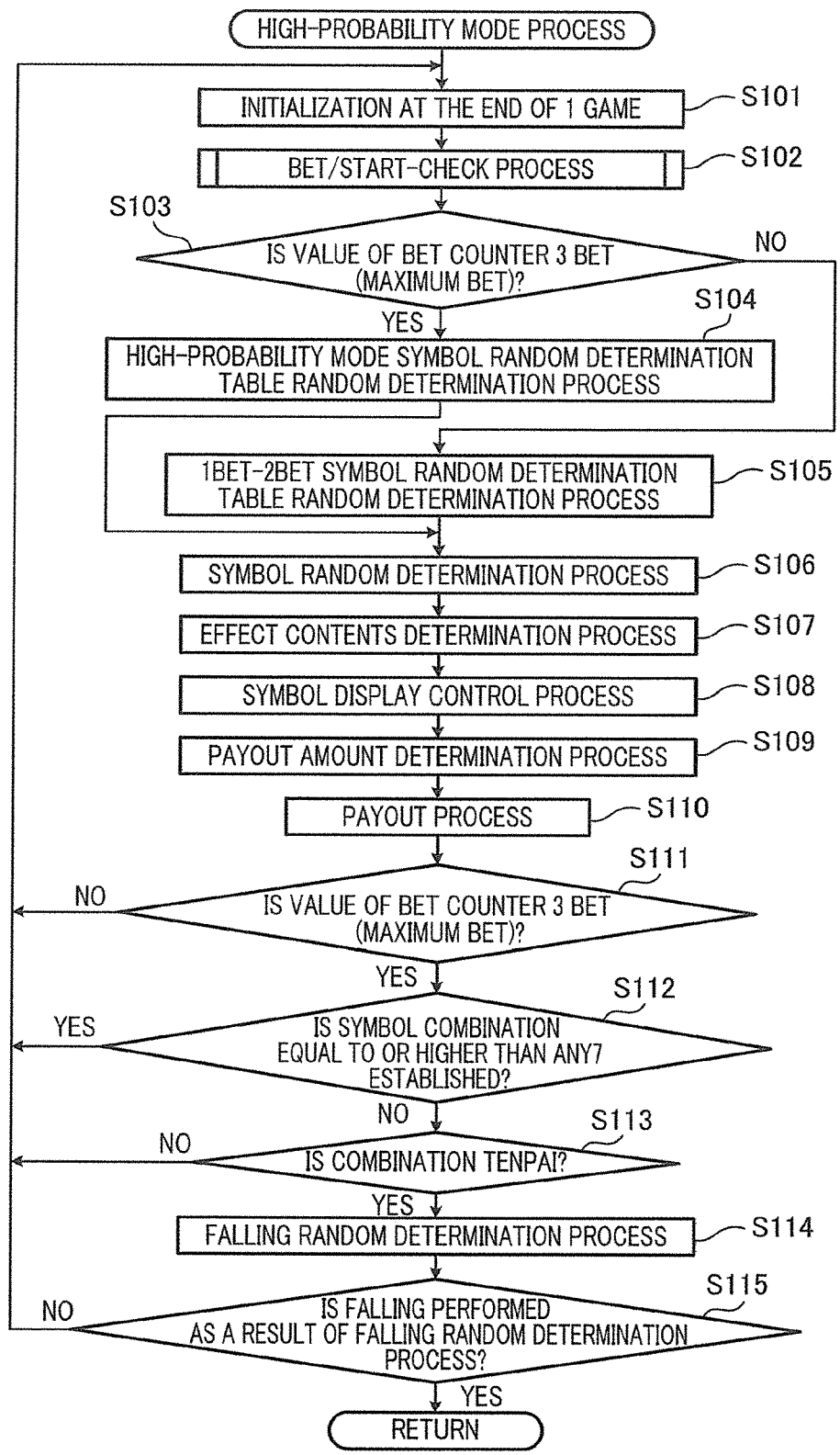
FIG. 34 is a flowchart of a high-probability mode process in the slot machine of the embodiment of the present invention.

Now, the program to be executed by the slot machine 1 is described with reference to FIG. 32 to FIG. 34.

(Main Control Process)

Figure 32:
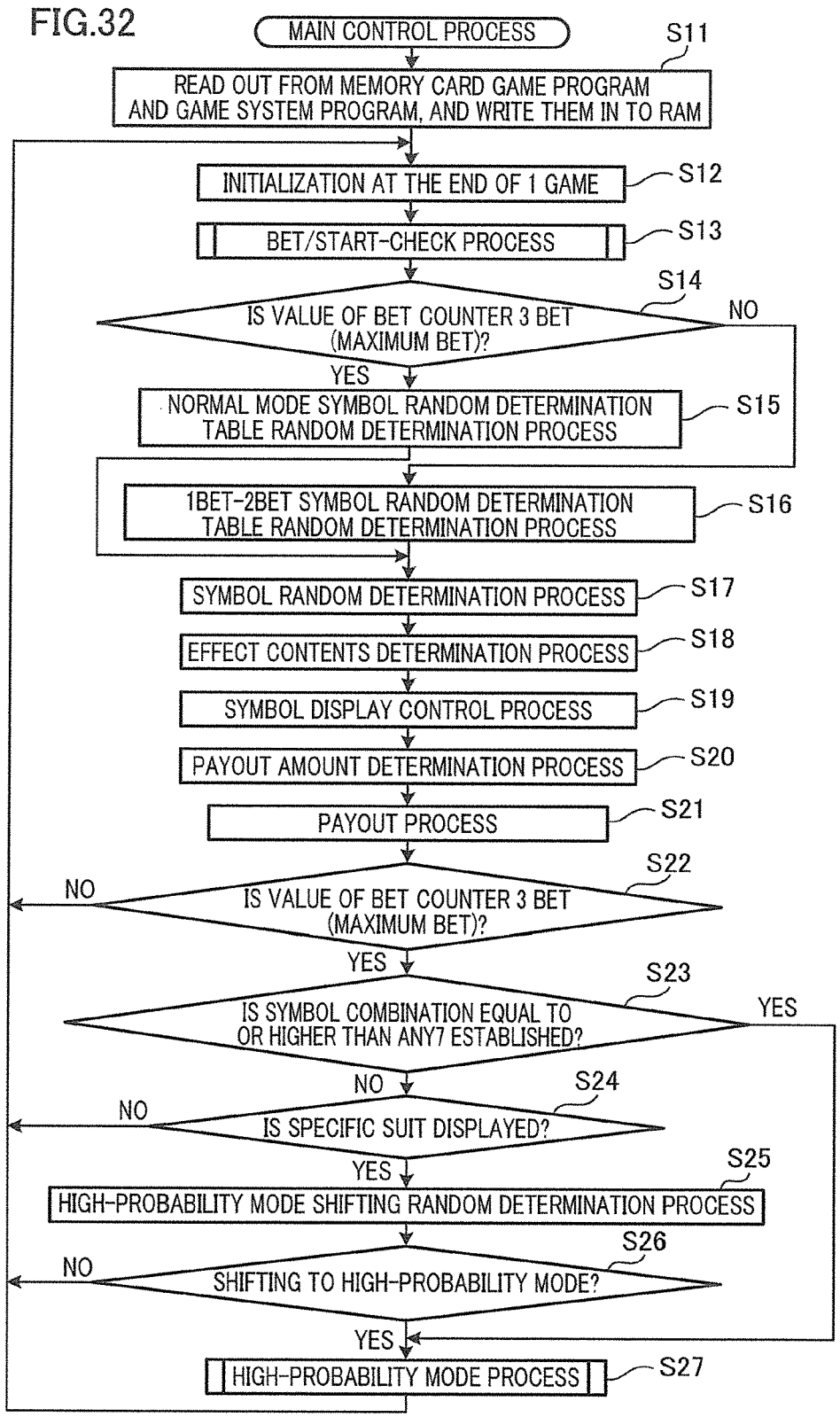
FIG. 32 is a flowchart of a main control process in the slot machine of the embodiment of the present invention.

Referring to FIG. 32, a main control process will be described. In the main control process, a game (normal game) is executed in the normal mode.

First, when the slot machine 1 is powered on, the main CPU 71 reads an authenticated game program and a game system program from a memory card 54 via a gaming board 50, and then write them in the RAM 73 (S11).

Subsequently, the main CPU 71 executes an initializing process at the end of each play of the game, in order to start the normal game (S12). This process clears data in a working area of the RAM 73, which becomes unnecessary at the end of each play of the normal game, e.g., the bet amount, symbols randomly determined, and the like.

The main CPU 71 then executes a later-described bet/start-check process (S13). In this process, an input check or the like is executed for switches such as the 1-BET switch 34S, the 2-BET switch 35S, the 3-BET switch 36S, and the spin switch 46S.

The main CPU 71 then determines whether the value of the bet counter updated in the bet/start-check process is "3" which is the maximum bet (S14). When determining that the value of the bet counter is "3" (S14: YES), the main CPU 71 executes the normal mode symbol random determination table random determination process (S15) (i.e., a game is executed in the normal mode). In the normal mode symbol random determination table random determination process, one of the 10 types of symbol random determination tables 0 to 9 is randomly selected based on the normal mode symbol random determination table determination table (see FIG. 10). For example, as shown in FIG. 10, the symbol random determination table 0 is selected at a probability of 5200/5542 from the 10 types of symbol random determination tables 0 to 9. The symbol random determination table 9 is selected at a probability of 1/5542 from the 10 types of symbol random determination tables 0 to 9.

In the normal mode symbol random determination table random determination process, one of the symbol random determination tables 0 to 9 is randomly selected, and symbols to be rearranged are determined based on the randomly-selected symbol random determination table. This makes it possible to easily change the random determination probabilities of the rearranged symbols in each game play.

When determining that the value of the bet counter is not "3" (S14: NO) (i.e., one bet or two bets is/are placed), the main CPU 71 executes the 1BET-2BET symbol random determination table random determination process (S16) (i.e., a game is executed in the 1BET or 2BET mode). In the 1BET-2BET symbol random determination table random determination process, one of the 10 types of symbol random determination tables 0 to 9 is randomly selected based on the 1BET-2BET symbol random determination table determination table (see FIG. 11). For example, as shown in FIG. 11, the symbol random determination table 0 is selected at a probability of 3340/4168 from the 10 types of symbol random determination tables 0 to 9. The symbol random determination table 9 is selected at a probability of 1/4168 from the 10 types of symbol random determination tables 0 to 9.

As described above, in accordance with the value of the bet counter (betted credit value), switching between execution of the normal mode symbol random determination table random determination process (game in the normal mode) and execution of the 1BET-2BET symbol random determination table random determination process (game in the 1BET-2BET mode) is controlled. Because switching between plural game modes is possible by simply changing a betted credit value, a probability of rearrangement of a predetermined symbol such as "RED7" and "FIRE7" is changeable without requiring complicated control.

Subsequently, the main CPU 71 executes the symbol random determination process (S17). In this symbol random determination process, three to-be-stopped symbols to be rearranged in the middle stage of the display window 150 (on the payline) are randomly determined in regard to the reels 101 to 103, based on the probabilities (WEIGHT) in the symbol random determination table determined in the normal mode symbol random determination table random determination process in S15 or the symbol random determination table determined in the 1BET-2BET symbol random determination table random determination process in S16.

For example, when the symbol random determination table 0 shown in FIG. 13 is selected in the normal mode symbol random determination table random determination process or the 1BET-2BET symbol random determination table random determination process and the code number "0" is selected at the random determination probability of 4/71 for the first reel 101, "FIRE7" which corresponds to the code number "0" of the first reel 101 is selected as the to-be-stopped symbol to be rearranged in the middle stage of the display window 150 (on the payline). When the code number "4" is selected at the random determination probability of 1/120 for the second reel 102, "RED7" corresponding to the code number "4" of the second reel 102 is selected as a to-be-stopped symbol to be rearranged in the middle stage of the display window 150 (on the payline). When the code number "8" is selected at the random determination probability of 4/46 for the third reel 103, "3BAR" corresponding to the code number "8" of the third reel 103 is selected as a to-be-stopped symbol to be rearranged in the middle stage of the display window 150 (on the payline).

The main CPU 71 stores the determined to-be-stopped symbols on the reels 101 to 103 in a symbol storing area in the RAM 73.

Subsequently, the main CPU 71 executes an effect contents determination process (S18). The main CPU 71 samples an effect-use random number and randomly determines any of a plurality of predetermined contents of effect.

The main CPU 71 then executes a symbol display control process (S19). In this symbol display control process, the scroll of the reels 101 to 103 starts, and after a predetermined time elapses, the to-be-stopped symbols corresponding to the reels 101 to 103 selected in the symbol random determination process in S17 stop one by one in the middle stage of the display window 150 (on the payline). That is, 9 symbols including the to-be-stopped symbols are displayed in the display window 150. For example, when the to-be-stopped symbol on the first reel 101 is "FIRE7", the to-be-stopped symbol on the second reel 102 is "RED7", and the to-be-stopped symbol on the third reel 103 is "3BAR", "FIRE7", "RED7", and "3BAR" are rearranged in the middle stage of the display window 150 (on the payline).

The main CPU 71 then executes a payout amount determination process (S20). In this process, payout is determined based on a symbol combination displayed on the payline with reference to the symbol combination table (see FIG. 9) stored in the RAM 73 and the value (1BET, 2BET, or 3BET) of the bet counter, and the payout is stored in the payout amount storage area provided in the RAM 73. For example, when the value of the bet counter is "3" and the symbol combination displayed on the payline is three "RED7", "300" credits are determined as the payout with reference to the symbol combination table and stored in the payout amount storage area in the RAM 73.

Figure 36:
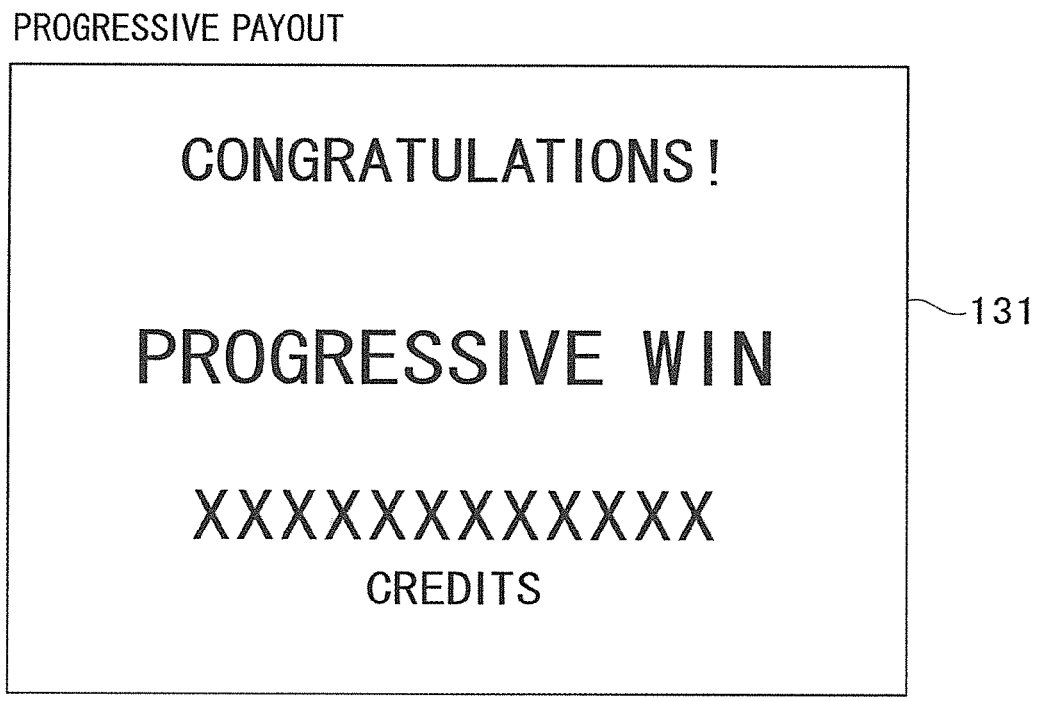
FIG. 36 is an explanatory diagram of an effect screen displayed on an upper image display panel of the slot machine of the embodiment of the present invention.

When the value of the bet counter is "3" (MAXBET) and the symbol combination displayed on the payline is three "FIRE7", progressive payout is awarded. To be more specific, the value of a progressive payout counter (described later) stored in the RAM 73 is awarded as the progressive payout. The value of the progressive payout counter is calculated in such a way that, in a later-described JP increment process in S52, a value calculated by multiplying the value of the bet counter by an increment rate (0.01) is accumulatively added to the initial value of 1000 in each game play. When the progressive payout is won, the value of the progressive payout counter is stored in the payout amount storage area of the RAM 73. Furthermore, when the progressive payout is won, a message which notifies that the progressive payout has been awarded is displayed as shown in FIG. 36. To be more specific, messages "CONGRATULATIONS!", "PROGRESSIVE WIN", and "XXXXXXXX CREDITS" are displayed on the upper image display panel 131.

Then a payout process is executed (S21). The main CPU 71 adds the value stored in the payout amount storage area to the value of the credit counter in the RAM 73.

The main CPU 71 then determines whether the value of the bet counter is "3" which is the maximum bet (S22). When determining that the value of the bet counter is not "3" (S22: NO), the main CPU 71 proceeds to S12.

In the meanwhile, when determining that the value of the bet counter is "3" (S22: YES), the main CPU 71 determines if the combination of the to-be-stopped symbols determined in the symbol random determination process is a combination of "ANY7", a combination of "RED7", or a combination of "FIRE7" (see FIG. 9: symbol combinations equal to or higher than ANY7) (S23). When the symbol combination is a combination of "ANY7", a combination of "RED7", or a combination of "FIRE7" (S23: YES), the routine proceeds to the later-described high-probability mode process. That is to say, when the symbols rearranged in the display window 150 include a combination of "ANY7", a combination of "RED7", or a combination of "FIRE7" (equivalent to a specific symbol), the game mode is switched from the normal mode to the high-probability mode.

In the meanwhile, when the symbol combination is none of a combination of "ANY7", a combination of "RED7", or a combination of "FIRE7" (S23: NO), the main CPU 71 determines if the symbol combination displayed in the display window 150 corresponds to one of symbol combinations of the 8 type of groups A to H (specific suit) shown in FIG. 24 to FIG. 26 (S24). In other words, which one of symbol combinations of the 8 type of groups A to H (specific suit) shown in FIG. 24 to FIG. 26 is displayed in the display window 150 is determined. When the symbol combination displayed in the display window 150 does not correspond to any one of the symbol combinations of the groups A to H (S24: NO), the routine proceeds to S12.

In the meanwhile, when the symbol combination displayed in the display window 150 corresponds to any of the symbol combinations of the groups A to H (S24: YES), the high-probability mode shifting random determination process is executed (S25). In the high-probability mode shifting random determination process, whether shifting from the normal mode to the high-probability mode is performed or not performed (loss) is randomly determined based on the group (one of the groups A to H) corresponding to the symbol combination displayed in the display window 150 and the high-probability mode shifting random determination table (FIG. 23). For example, when "FIRE7" on the first reel 101 is rearranged in the middle stage of the display window 150 (on the payline), "FIRE7" on the second reel 102 is rearranged in the middle stage of the display window 150 (on the payline), and "FIRE7" on the third reel 101 is rearranged in the upper stage of the display window 150, it is determined that the symbol combination corresponds to the symbol combination of the group A (see FIG. 24), and whether shifting from the normal mode to the high-probability mode is performed (95/100) or not performed (5/100) is randomly determined based on the winning probability (95/100) corresponding to the group A in the high-probability mode shifting random determination table.

Subsequently, as a result of the high-probability mode shifting random determination process in S25, the main CPU 71 determines whether to shift from the normal mode to the high-probability mode (S26). When not shifting from the normal mode to the high-probability mode (S26: NO), the routine proceeds to S12.

When shifting from the normal mode to the high-probability mode (S26: YES) as a result of the high-probability mode shifting random determination process in S25 or when the symbol combination is one of a combination of "ANY7", a combination of "RED7", and a combination of "FIRE7" in S23 (S23: YES), the later-described high-probability mode process is executed (S27). After the high-probability mode process, the routine proceeds to S12.

(Bet/Start-Check Process)

Now the bet/start-check process will be described with reference to FIG. 33.

To begin with, the main CPU 71 determines whether credit data has been received from the PTS device 700 (S41). The credit data is sent from the PTS device 700 to the main CPU 71, for example, when the IC card is inserted into the card insertion slot and when the bill entry 60 receives a genuine bill.

When the credit data is received (S41: YES), the main CPU 71 adds the amount indicated by the received credit data to the value of the credit counter (S42).

After the step S42 or when determining in S41 that no credit data is received (S41: NO), the main CPU 71 determines whether or not the value stored in the credit counter is 0 (S43). When determining that the value of the credit counter is 0 (S43: YES), the main CPU 71 goes back to S41.

When the main CPU 71 determines that the value of the credit counter is not 0 (S43: NO), the main CPU 71 permits operation acceptance of the BET buttons (1-BET button 34, 2-BET button 35, and 3-BET button 36) (S44).

Then the main CPU 71 determines whether an operation of the BET button is detected (S45). When an operation of the bet button by a player is detected by the bet switch (1-BET switch 34S, 2-BET switch 35S, or 3-BET switch 36S), the main CPU 71 performs addition to the value of the bet counter in the RAM 73, based on the type of the BET button (S46).

Subsequently, the main CPU71 determines whether the value of the bet counter is at the maximum (S47). When determining that the value of the bet counter is at the maximum (S47: YES), the main CPU 71 prohibits the update of the value of the bet counter (S48). After S48, when determining in S47 that the value of the bet counter is not at the maximum (S47: NO), the main CPU 71 enables operation of the spin button 46 (S49).

After S49, the main CPU 71 determines whether an operation of the spin button 46 is detected (S50). When the main CPU 71 determines that an operation of the spin button 46 is not detected (S50: NO), the routine proceeds to S41.

In the meanwhile, when the main CPU 71 determines that operation of the spin button 46 is detected (S50: YES), the main CPU 71 subtracts the value of the bet counter calculated in S46 from the value of the credit counter (S51).

The main CPU 71 then executes a JP increment process (S52). In the JP increment process, as the resource of the progressive payout, the value of the progressive payout counter in the RAM 73 is incremented by a value calculated by multiplying the value of the bet counter calculated in S46 by an increment rate (0.01 but may be optionally set) set in the present embodiment. For example, when the value of the bet counter calculated in S46 is "3", 3×0.01=0.03 credit is added to the value of the progressive payout counter. In the present embodiment, the initial value of the progressive payout counter is 1000 credits. Therefore, in the progressive payout counter, a value calculated by multiplying the value of the bet counter by the increment rate (0.01) is accumulatively added to the initial value of 1000 in each game play.

Then the bet/start-check process is terminated.

(High-Probability Mode Process)

Now, the high-probability mode process will be described with reference to FIG. 34. The high-probability mode process is executed in S27 of the main control process. In the high-probability mode process, a game (high-probability game) is executed in the high-probability mode.

To begin with, the main CPU 71 executes an initializing process at the end of each play of the game, in order to start the high-probability game (S101). This process clears data in a working area of the RAM 73, which becomes unnecessary at the end of each play of the high-probability game, e.g., the bet amount, symbols randomly determined, and the like.

The main CPU 71 then executes the above-described bet/start-check process (S102). In this process, an input check or the like is executed for switches such as the 1-BET switch 34S, the 2-BET switch 35S, the 3-BET switch 36S, and the spin switch 46S.

The main CPU 71 then determines whether the value of the bet counter updated in the bet/start-check process is "3" which is the maximum bet (S103). When determining that the value of the bet counter is "3" (S103: YES), the main CPU 71 executes the high-probability mode symbol random determination table random determination process (S104). In the high-probability mode symbol random determination table random determination process, one of the 10 types of symbol random determination tables 0 to 9 is randomly selected based on the high-probability mode symbol random determination table determination table (see FIG. 12). For example, as shown in FIG. 12, the symbol random determination table 0 is selected at a probability of 20/644 from the 10 types of symbol random determination tables 0 to 9. The symbol random determination table 9 is selected at a probability of 1/644 from the 10 types of symbol random determination tables 0 to 9.

When determining that the value of the bet counter is not "3" (S103: NO) (i.e., one bet or two bets is/are placed), the main CPU 71 executes the 1BET-2BET symbol random determination table random determination process (S105). In the 1BET-2BET symbol random determination table random determination process, one of the 10 types of symbol random determination tables 0 to 9 is randomly selected based on the 1BET-1BET-2BET symbol random determination table determination table (see FIG. 11). For example, as shown in FIG. 11, the symbol random determination table 0 is selected at a probability of 3340/4168 from the 10 types of symbol random determination tables 0 to 9. The symbol random determination table 9 is selected at a probability of 1/4168 from the 10 types of symbol random determination tables 0 to 9.

That is to say, in the game in the high-probability mode process, when the value of the bet counter (betted credit value) is three bets (MAXBET), the game is executed in the high-probability mode. When the value of the bet counter (betted credit value) is not three bets (MAXBET) (i.e., one bet or two bets), the game mode is switched from the high-probability mode to the 1BET-2BET mode.

As described above, when the value of the bet counter (betted credit value) is three bets (MAXBET), the game is executed in the high-probability mode in which a probability of rearrangement of a predetermined symbol such as "FIRE7" and "RED7" is high as compared to the normal mode. With this, added values may be provided to the placement of three bets (MAXBET) and the player may be induced to place three bets (MAXBET).

When the value of the bet counter (betted credit value) is not three bets (MAXBET) (i.e., one bet or two bets), no game is executed in the high-probability mode, and the game is executed in the 1BET-2BET mode with which a probability of rearrangement of a predetermined symbol such as "FIRE7" or "RED7" is low as compared to the high-probability mode. With this, added values may be provided to the placement of three bets (MAXBET) and the player may be induced to place three bets (MAXBET).

Subsequently, the main CPU 71 executes the symbol random determination process (S106). In this symbol random determination process, three to-be-stopped symbols to be rearranged in the middle stage of the display window 150 (on the payline) are randomly determined in regard to the reels 101 to 103, based on the probabilities (WEIGHT) in the symbol random determination table determined in the high-probability mode symbol random determination table random determination process in S104 or the symbol random determination table determined in the 1BET-2BET symbol random determination table random determination process in S105.

For example, when the symbol random determination table 0 shown in FIG. 13 is selected in the high-probability mode symbol random determination table random determination process or the 1BET-2BET symbol random determination table random determination process and the code number "0" is selected at the random determination probability of 4/71 for the first reel 101, "FIRE7" which corresponds to the code number "0" of the first reel 101 is selected as the to-be-stopped symbol to be rearranged in the middle stage of the display window 150 (on the payline). When the code number "4" is selected at the random determination probability of 1/120 for the second reel 102, "RED7" corresponding to the code number "4" of the second reel 102 is selected as a to-be-stopped symbol to be rearranged in the middle stage of the display window 150 (on the payline). When the code number "8" is selected at the random determination probability of 4/46 for the third reel 103, "3BAR" corresponding to the code number "8" of the third reel 103 is selected as a to-be-stopped symbol to be rearranged in the middle stage of the display window 150 (on the payline).

The main CPU 71 stores the determined to-be-stopped symbols on the reels 101 to 103 in a symbol storing area in the RAM 73.

Subsequently, the main CPU 71 executes an effect contents determination process (S107). The main CPU 71 samples an effect-use random number and randomly determines any of a plurality of predetermined contents of effect.

The main CPU 71 then executes a symbol display control process (S108). In this symbol display control process, the scroll of the reels 101 to 103 starts, and after a predetermined time elapses, the to-be-stopped symbols corresponding to the reels 101 to 103 selected in the symbol random determination process in S106 stop one by one in the middle stage of the display window 150 (on the payline). That is, 9 symbols including the to-be-stopped symbols are displayed in the display window 150. For example, when the to-be-stopped symbol on the first reel 101 is "FIRE7", the to-be-stopped symbol on the second reel 102 is "RED7", and the to-be-stopped symbol on the third reel 103 is "3BAR", "FIRE7", "RED7", and "3BAR" are rearranged in the middle stage of the display window 150 (on the payline).

The main CPU 71 then executes a payout amount determination process (S109). In this process, payout is determined based on a symbol combination displayed on the payline with reference to the symbol combination table (see FIG. 9) stored in the RAM 73 and the value (1BET, 2BET, or 3BET) of the bet counter, and the payout is stored in the payout amount storage area provided in the RAM 73. For example, when the value of the bet counter is "3" and the symbol combination displayed on the payline is three "RED7", "300" credits are determined as the payout with reference to the symbol combination table and stored in the payout amount storage area in the RAM 73.

When the value of the bet counter is "3" (MAXBET) and the symbol combination displayed on the payline is three "FIRE7", progressive payout is awarded. To be more specific, the value of the progressive payout counter stored in the RAM 73 is awarded as the progressive payout. The value of the progressive payout counter is calculated in such a way that, in the JP increment process in S52, a value calculated by multiplying the value of the bet counter by an increment rate (0.01) is accumulatively added to the initial value of 1000 in each game play. When the progressive payout is won, the value of the progressive payout counter is stored in the payout amount storage area of the RAM 73.

Then a payout process is executed (S110). The main CPU 71 adds the value stored in the payout amount storage area to the value of the credit counter in the RAM 73.

The main CPU 71 then determines whether the value of the bet counter is "3" which is the maximum bet (S111). When determining that the value of the bet counter is not "3" (S111: NO), the main CPU 71 proceeds to S101.

In the meanwhile, when determining that the value of the bet counter is "3" (S111: YES), the main CPU 71 determines if the combination of the to-be-stopped symbols determined in the symbol random determination process is a combination of "ANY7", a combination of "RED7", or a combination of "FIRE7" (see FIG. 9: symbol combinations equal to or higher than ANY7) (S112).

When the symbol combination is a combination of "ANY7", a combination of "RED7", or a combination of "FIRE7" (S112: YES), the high-probability mode is maintained and the routine proceeds to S101.

In the meanwhile, when the symbol combination is not a combination of "ANY7", a combination of "RED7", or a combination of "FIRE7" (S23: NO), the main CPU 71 determines if the combination of the to-be-stopped symbols determined in the symbol random determination process is tenpai (a state in which a combination of symbols is one short of a predetermined symbol combination) of a combination of "ANY7", a combination of "RED7", or a combination of "FIRE7" (S113). When the symbol combination is not tenpai (S113: NO), the routine proceeds to S101.

In the meanwhile, when the symbol combination is tenpai (S113: YES), the main CPU 71 executes the falling random determination process (S114). In the falling random determination process, whether to maintain the high-probability mode or execute falling (shifting from the high-probability mode to the normal mode) is randomly determined based on the falling table (see FIG. 31). To be more specific, as shown in FIG. 31, as a result of random determination, the high-probability mode is maintained at the probability of 70/100 (70%) or falling ((shifting from the high-probability mode to the normal mode) is performed at the probability of 30/100 (30%).

Then whether falling is performed as a result of the falling random determination process in S114 is determined (S115). When the falling is not performed and the high-probability mode is maintained (S115: NO), the high-probability mode is maintained and the routine proceeds to S101.

When the falling is performed (S115: YES), the process ends. In other words, the high-probability mode is shifted to the normal mode.

According to the arrangement above, when shifting from the normal mode to the high-probability mode occurs, the high-probability mode symbol random determination table random determination is executed to select one of the symbol random determination tables 0 to 9 based on the high-probability mode symbol random determination table determination table which is arranged such that a symbol random determination table with which a probability of rearrangement of a predetermined symbol such as "RED7" and "FIRE7" is high as compared to the normal mode symbol random determination table determination table, each time the game starts in the high-probability mode. With this arrangement, in the game in the high-probability mode, the predetermined symbol such as "RED7" and "FIRE7" is more probable to be rearranged as compared to the game in the normal mode, and hence the winning probability of the predetermined symbol such as "RED7" and "FIRE7" can be changed by simply changing the table for selecting the symbol random determination table, without requiring complicated control.

In addition to the above, traditionally, to change the probability of rearrangement of each symbol, a provider of the slot machine performs internal operations to change a random determination table. In this regard, according to the arrangement above, the probability of rearrangement of each symbol is directly or indirectly changed by the player (when the symbol random determination table determination table is changeable by a bet pattern such as one bet, two bets, and MAXBET, the probability of rearrangement of each symbol is indirectly changeable by the bet pattern). The inventors of the present invention have found that novel diversity is given to games while the arrangement of known gaming machines (slot machines) is effectively utilized, and providing a gaming machine based on this founding is a significance of the present invention. This founding is an unprecedented point.

(Display Screen: Upper Image Display Panel 131)

Now, a screen displayed on the upper image display panel 131 during the process above will be described with reference to FIG. 35.

Figure 35:
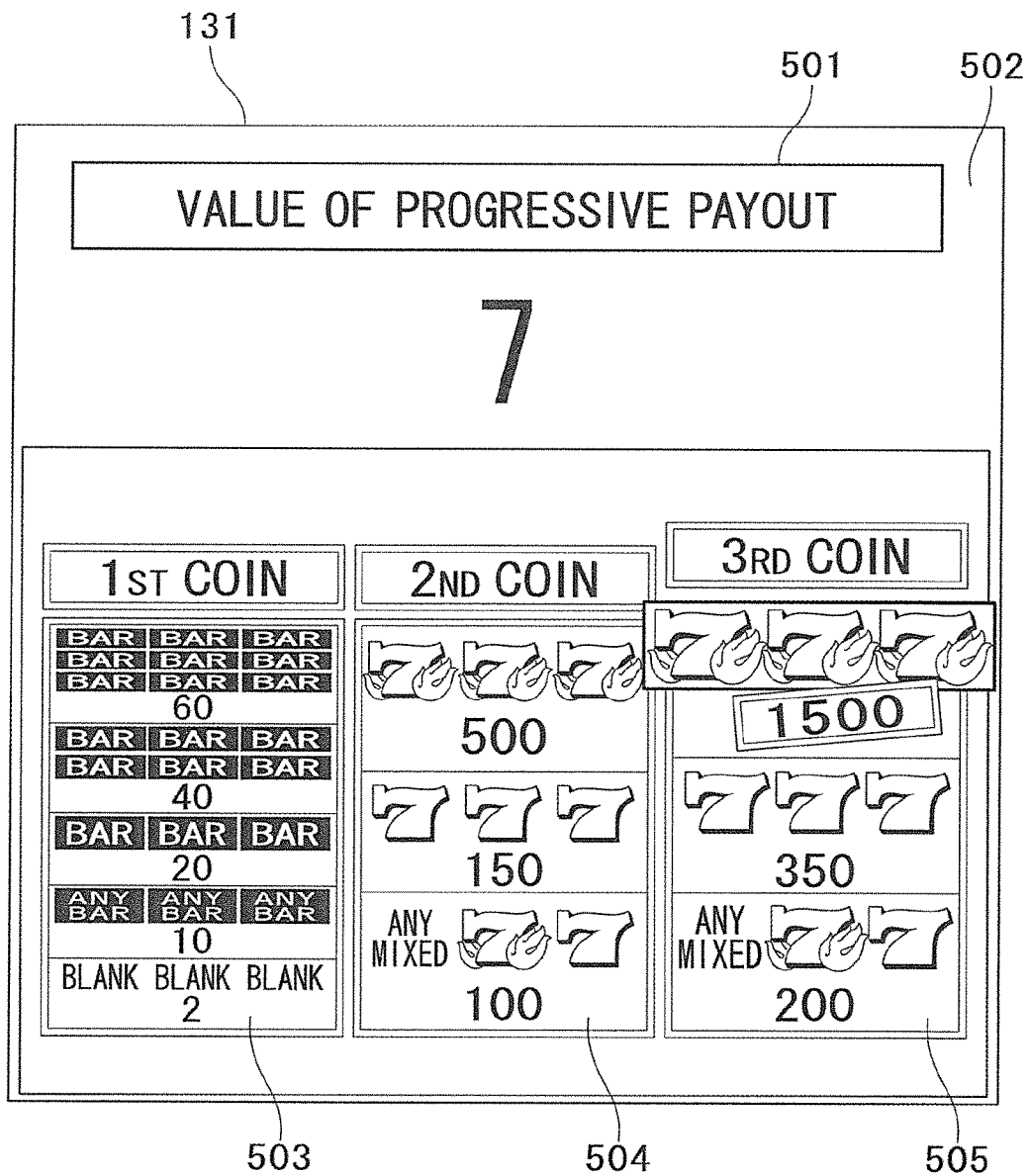
FIG. 35 is an explanatory diagram of an effect screen displayed on an upper image display panel of the slot machine of the embodiment of the present invention.

As shown in FIG. 35, on the upper image display panel 131, a progressive payout display area 501 displaying a current value of the progressive payout counter, an effect display area 502 displaying an effect image of the game, a one-bet payout display area 503 displaying a payout value for a symbol combination achieving winning (WIN) with one bet, a two-bet payout display area 504 displaying a payout value for a symbol combination achieving winning (WIN) with two bets, and a three-bet payout display area 505 displaying a payout value for a symbol combination achieving winning (WIN) with three bets are displayed.

In the game above, when the value of the bet counter is "3" (MAXBET) and the symbol combination displayed on the payline is three "FIRE7", progressive payout is awarded. When this progressive payout is awarded, a message which notifies that the progressive payout has been awarded is displayed on the upper image display panel 131 as shown in FIG. 36. To be more specific, messages "CONGRATULATIONS !", "PROGRESSIVE WIN", and "XXXXXXXX CREDITS" are displayed on the upper image display panel 131.

(Display Screen: Liquid Crystal Display Device 134)

Now, a screen displayed on the liquid crystal display device 134 during the process above will be described with reference to FIG. 37.

Figure 37:
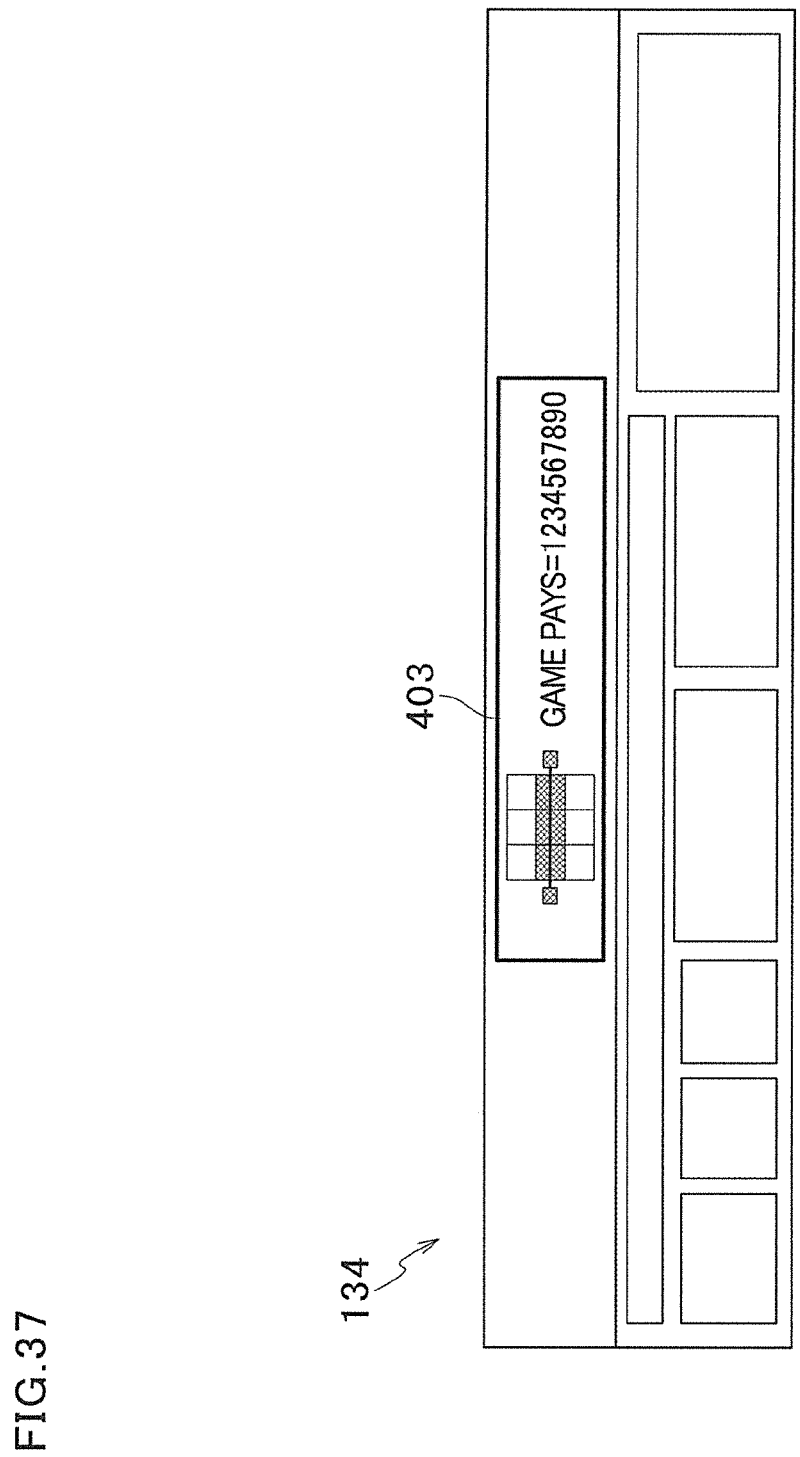
FIG. 37 is an explanatory diagram of an effect screen displayed on a liquid crystal display device of the slot machine of the embodiment of the present invention.

As shown in FIG. 37, in a game message area 403 of the liquid crystal display device 134, a combination of symbols rearranged on the payline is displayed. Then the payline is displayed and the symbol combination achieving winning is flickered. Furthermore, when the progressive payout is awarded, a message "PROGRESSIVE WIN" is displayed. Furthermore, in the game message area 403, a payout amount (e.g., GAMEPAYS=XXXX) for the symbol combination achieving winning is displayed.

(P15-0253)

As a typical gaming machine, a slot machine is arranged such that, each time a player presses a button on a control panel, reels on which symbols are provided are rotated and then stopped, with the result that the symbols are rearranged. In such slot machines, a benefit such as a payout is awarded to a player based on a combination of rearranged symbols.

A type of the slot machines is arranged such that, after each reel is rotated and stopped, symbols are rearranged at equal probabilities. For example, when 22 symbols are arranged on a reel, a probability of rearrangement of each of 22 symbols is 1/22. In the meanwhile, another type of the slot machines is arranged such that, after each reel is rotated and stopped, symbols are rearranged at not equal but different probabilities. In such a slot machine, for example, when 22 symbols are arranged on a reel, a probability of rearrangement of each symbol is different between the symbols, e.g., a probability of rearrangement of a symbol A is 1/10 whereas a probability of rearrangement of a symbol B is 1/50, and a random determination table in which a probability of rearrangement is associated with each symbol is provided (see Japanese Unexamined Patent Publication No. 2013-153875).

In addition to the above, as in Patent Literature 1, the game mode may be changed (from a normal mode to a chance mode) and a random determination table may be changed when the game mode is changed.

Because in the normal mode the same random determination table is used in each game play and in the chance mode the random determination table used is determined in advance in accordance with the number of plays of the game, the game may be monotonous.

An object of the present invention is to provide a gaming machine which makes it possible to avoid monotonous game play without requiring complicated control irrespective of a game mode.

The present invention relates to a gaming machine including: a display device configured to display a game result by rearranging reels on which symbols are arranged;

a storage device including: symbol random determination tables in which probabilities of rearrangement of a predetermined symbol are different as a probability of rearrangement of each symbol on the reels is set;

a normal mode symbol random determination table determination table in which a probability of random selection of one of the symbol random determination tables is defined for each of the symbol random determination tables;

a high-probability mode symbol random determination table determination table in which a probability of random selection of one of the symbol random determination tables is defined for each of the symbol random determination tables such that a symbol random determination table in which a probability of rearrangement of the predetermined symbol is high is more probable to be selected as compared to the normal mode symbol random determination table determination table; and a high-probability mode shifting random determination table in which a winning probability of shifting from a normal mode to a high-probability mode is defined; and a controller configured to execute the processes of:

(1A) at start of game play in the normal mode, randomly selecting one of the symbol random determination tables based on the normal mode symbol random determination table determination table;

(1B) randomly determining symbols to be rearranged based on the symbol random determination table selected in the process (1A);

(1C) displaying the symbols determined in the process (1B) on the display device by rearranging the reels;

(1D) when a combination of the symbols to be rearranged as a result of the process (1B) is a combination of a specific symbol, randomly determining whether to shift the normal mode to the high-probability mode based on the high-probability mode shifting random determination table;

(1E) when shifting from the normal mode to the high-probability mode occurs as a result of the process (1D), at start of game play in the high-probability mode, randomly selecting one of the symbol random determination tables based on the high-probability mode symbol random determination table determination table;

(1F) randomly determining symbols to be rearranged, based on the symbol random determination table selected in the process (1E); and (1G) displaying the symbols determined in the process (1F) on the display device by rearranging the reels.

According to the arrangement above, at the start of each game play, one of the symbol random determination table is randomly selected irrespective of the normal mode or the high-probability mode. Because this makes it possible to change the probability of rearrangement of symbols without requiring complicated control, monotonous game play is avoidable.

In the present invention, the above-described gaming machine is arranged such that there are plural combinations of the specific symbol, and in the high-probability mode shifting random determination table, the winning probability of shifting from the normal mode to the high-probability mode is defined in accordance with the combinations of the specific symbol.

According to the arrangement above, because the winning probabilities of shifting from the normal mode to the high-probability mode are differentiated in accordance with the types of the combinations of the specific symbol rearranged on the display device, it is possible to change the winning probability of shifting from the normal mode to the high-probability mode without performing complicated control.

In the present invention, the above-described gaming machine is arranged such that the symbol random determination tables are shared between the normal mode and the high-probability mode.

According to the arrangement above, the symbol random determination tables are shared between the normal mode and the high-probability mode. It is therefore possible to save the memory space of the storage device as compared to a case where a dedicated symbol random determination table is prepared for each of the normal mode and the high-probability mode.

(P15-0254)

As a typical gaming machine, a slot machine is arranged such that, each time a player presses a button on a control panel, reels on which symbols are provided are rotated and then stopped, with the result that the symbols are rearranged. In such slot machines, a benefit such as a payout is awarded to a player based on a combination of rearranged symbols.

A type of the slot machines is arranged such that, after each reel is rotated and stopped, symbols are rearranged at equal probabilities. For example, when 22 symbols are arranged on a reel, a probability of rearrangement of each of 22 symbols is 1/22. In the meanwhile, another type of the slot machines is arranged such that, after each reel is rotated and stopped, symbols are rearranged at not equal but different probabilities. In such a slot machine, for example, when 22 symbols are arranged on a reel, a probability of rearrangement of each symbol is different between the symbols, e.g., a probability of rearrangement of a symbol A is 1/10 whereas a probability of rearrangement of a symbol B is 1/50. As such, a probability of rearrangement is associated with each symbol (see Japanese Unexamined Patent Publication No. 2013-153875).

Furthermore, in the slot machine above, plural game modes (a normal mode and a chance mode) are provided, and the game mode may be changed and a probability of rearrangement of a predetermined symbol may be changed at the change of the game mode.

In the slot machine above, however, because change to the chance mode is performed only when symbols rearranged in the normal mode satisfy a predetermined condition, the change of the game mode is performed depending on the game progress. That is to say, because the change in the game mode for changing the probability of rearrangement of the predetermined symbol depends on the game progress, the change is controlled by the initiative of the slot machine, with the result that the game progress may be monotonous.

An object of the present invention is to provide a gaming machine which makes it possible to avoid monotonous game progress.

The present invention relates to a gaming machine including: a display device configured to display a game result by rearranging reels on which symbols including a specific symbol are arranged;
an input device capable of receiving an input of plural types of bet values; and
a controller configured to control game modes which are different in a probability of rearrangement of the specific symbol,
the controller switching the game mode in accordance with a bet value input by the input device.

According to the arrangement above, monotonousness in game progress is avoidable as the player participates in the game progress by operating the input device.

In the present invention, the above-described gaming machine is arranged such that the game modes include a high-probability mode in which a probability of rearrangement of the specific symbol is high as compared to another game mode, and
the controller is configured to further execute the processes of:
determining whether a bet value received by the input device is equal to or larger than a predetermined value; and
when the bet value received by the input device is equal to or larger than the predetermined value, running a game in the high-probability mode.

According to the arrangement above, when the bet value received by the input device is equal to or larger than the predetermined value, the game is run in the high-probability mode in which the probability of rearrangement of the predetermined symbol is high as compared to the other game mode. With this, added values may be provided to the placement of bet equal to or larger than the predetermined value, and the player may be induced to place bet equal to or larger than the predetermined value.

In the present invention, the above-described gaming machine is arranged such that the controller is configured to further execute the processes of:
switching the game mode from another game mode to the high-probability mode when symbols rearranged on the display device include the specific symbol; and
in the game after switching to the high-probability mode, the high-probability mode is maintained when the bet value received by the input device is equal to or larger than the predetermined value, or the high-probability mode is switched to another game mode when the bet value is smaller than the predetermined value.

According to the arrangement above, when the received bet is smaller than the predetermined value in the running of the game in the high-probability mode, the game is run not in the high-probability mode but in the other game mode. With this, added values may be provided to the placement of bet equal to or larger than the predetermined value, and the player may be induced to place bet equal to or larger than the predetermined value.

Another Embodiment: P15-0260

The descriptions below may use the same reference numerals as in the embodiment above, but the embodiment below will describe arrangements different from those in the embodiment above.

As a typical gaming machine, a slot machine is arranged such that, as a player presses a button on a control panel, reels on which symbols are provided are scrolled and then stopped, with the result that the symbols are rearranged. In such a slot machine, a benefit such as a payout is awarded to a player based on a combination of rearranged symbols.

The slot machine may execute an indication effect of indicating that a bonus may be awarded as a benefit (see Japanese Unexamined Patent Publication No. 2013-165901). Because it allows the player to recognize in advance that a bonus may be awarded, the indication effect is important to enhance the effects of the gaming machine.

However, because in the slot machine above whether to execute the indication effect is determined solely based on a combination of a predetermined symbol with which a bonus is awarded, the indication effect is monotonous, with the result that the game play is monotonous.

An object of the present invention is therefore to provide a gaming machine which makes it possible to avoid monotonous effects in a game.

The present invention relates to a gaming machine including: a display device configured to display a game result by rearranging reels on which symbols are arranged;

an effect means (equivalent to an effect image of emitting light from eyes of a dragon character 132 displayed on an upper image display panel 131);

a storage device configured to store, for each of the reels, a symbol random determination table in which a probability of rearrangement of each symbol is defined and an indication effect table in which a combination of symbols to be rearranged is associated with an occurrence probability of a predetermined indication effect executed by the effect means; and a controller configured to execute the processes of:

(1A) at start of game play, randomly determining a combination of symbols to be displayed on the display device based on the symbol random determination table;

(1B) determining whether to execute the predetermined indication effect by the effect means with reference to the combination of the symbols determined in the process (1A) and the indication effect table;

(1C) executing the predetermined indication effect by the effect means when it is determined in the process (1B) that the predetermined indication effect is executed by the effect means (equivalent to an indication effect random determination process); and (1D) displaying a combination of the symbols determined in the process (1A) on the display device by rearranging the reels (equivalent to a symbol display control process).

According to the arrangement above, the occurrence probability for determining whether to perform the predetermined indication effect by the effect means corresponds to a symbol combination determined in the symbol random determination process, and the symbol combination determined in the symbol random determination process is based on the symbol random determination table. On this account, the occurrence probability for determining whether to perform the predetermined indication effect by the effect means is changeable by the probability of rearrangement of each symbol in the symbol random determination table. That is to say, whether to execute the indication effect by the effect means is adjustable by the probability of rearrangement of each symbol in the symbol random determination table and the occurrence probability in the indication effect table. This makes it possible to avoid monotonousness in the indication effect in the game.

In the present invention, the above-described gaming machine is arranged such that, in the symbol random determination table and the indication effect table, values calculated by multiplying rates of rearrangement of combinations of symbols by an occurrence probability of the indication effect in each unit game are all added up as an overall probability, and the overall probability is higher than a rate of rearrangement of a combination of a predetermined symbol.

According to the arrangement above, because the overall probability of occurrence of the predetermined indication effect in one game play is higher than the probability of rearrangement of the combination of the predetermined symbol, the occurrence frequency of the predetermined indication effect is higher than the frequency of the rearrangement of the combination of the predetermined symbol on the display device. With this, when the predetermined indication effect occurs, the player may highly expect rearrangement of the combination of the predetermined symbol on the display device, with the result that monotonousness in the indication effect in the game is avoided.

A gaming machine which makes it possible to avoid monotonous effects in a game is provided.

(Outline of Present Invention)

Figure 38:
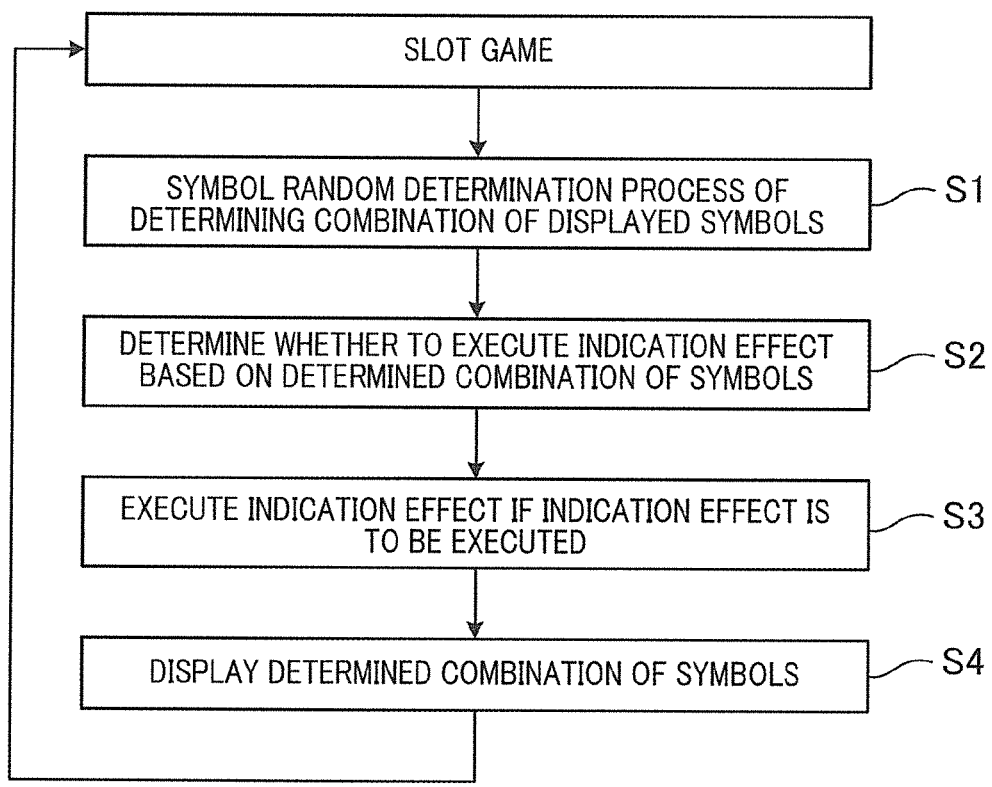
FIG. 38 shows the outline of game content of the slot machine of the embodiment of the present invention.

The following will describe an embodiment the present invention with reference to figures. FIG. 38 shows the outline of a game flow of a slot machine according to the embodiment of the present invention. As shown in FIG. 38, the slot machine of the embodiment of the present invention executes a slot game as a game.

The slot games are of a line type (Left to Right). The slot games employ mechanical reels. The reels are formed of three reels. That is to say, the reels are formed of a first reel, a second reel, and a third reel. Furthermore, a single payline is set.

In the slot game of the present invention, for each reel on which symbols are lined up, a symbol random determination table defining a probability of rearrangement of each symbol and an indication effect table in which a combination of rearranged symbols is associated with an occurrence probability of a predetermined indication effect executed by an effect means are used.

At the start of the game, a symbol random determination process of randomly determining a symbol combination displayed on a display device is performed based on the symbol random determination table (S1). Subsequently, an indication effect random determination process of determining whether to execute the predetermined indication effect by the effect means is performed with reference to the symbol combination determined in the symbol random determination process and the indication effect table (S2). Subsequently, when the predetermined indication effect is to be executed by the effect means as a result of the indication effect random determination process, the predetermined indication effect is executed by the effect means (S3). Then the symbol combination determined in the symbol random determination process is displayed on the display device by rearranging the reels (S4).

(Definition)

While in the present embodiment the slot machine 1 is an example of the gaming machine, the slot machine 1 may be a device which independently executes a game.

The game in the present embodiment is run by the slot machines 1, in the present embodiment. The game is a slot game of rearranging symbols. The rearrangement of symbols in the slot game is carried out by a mechanical reel unit (equivalent to a display device). In the game, on condition that a gaming value is bet, symbols are rearranged in the display window by the mechanical reel unit, and a payout is awarded according to the rearranged symbols.

A free game employed in the present embodiment is a slot game of rearranging symbols without requiring betting of a gaming value. This free game is an example of the bonus game, and the bonus game may be any types of games as long as the game is more advantageous for the player than the normal game. For example, the free game includes a game in which a payout amount and a payout rate are higher than those in the normal game, a mini game different from the normal game, and a game in which a predetermined condition is more probable to be established as compared to the normal game.

The symbols collectively mean "RED7", "3BAR", "2BAR", "1BAR", "BLANK", and "FEATURE".

The gaming value is electrically valuable information such as electronic money and the like. It is to be noted that the gaming value in the present invention is not limited to these, and for example a gaming medium such as a medal, a token, a coin, a ticket or the like can be adopted. The ticket is not particularly limited, and for example, a ticket having data of credit amount and the like in the form of bar code.

Alternatively, the gaming value may be a game point not including valuable information.

The term "rearrangement" indicates that the symbols are rearranged after the arrangement of the symbols is dismissed. Arrangement means a state where the symbols can be visually confirmed by a player. More specifically, "rearrangement" is a state in which, after the symbols on the reels are variably displayed as the reels rotate, the variable display of the symbols stops as the rotation of the reels stops, and the symbols stop in the display window.

(Functional Flow)

Figure 39:
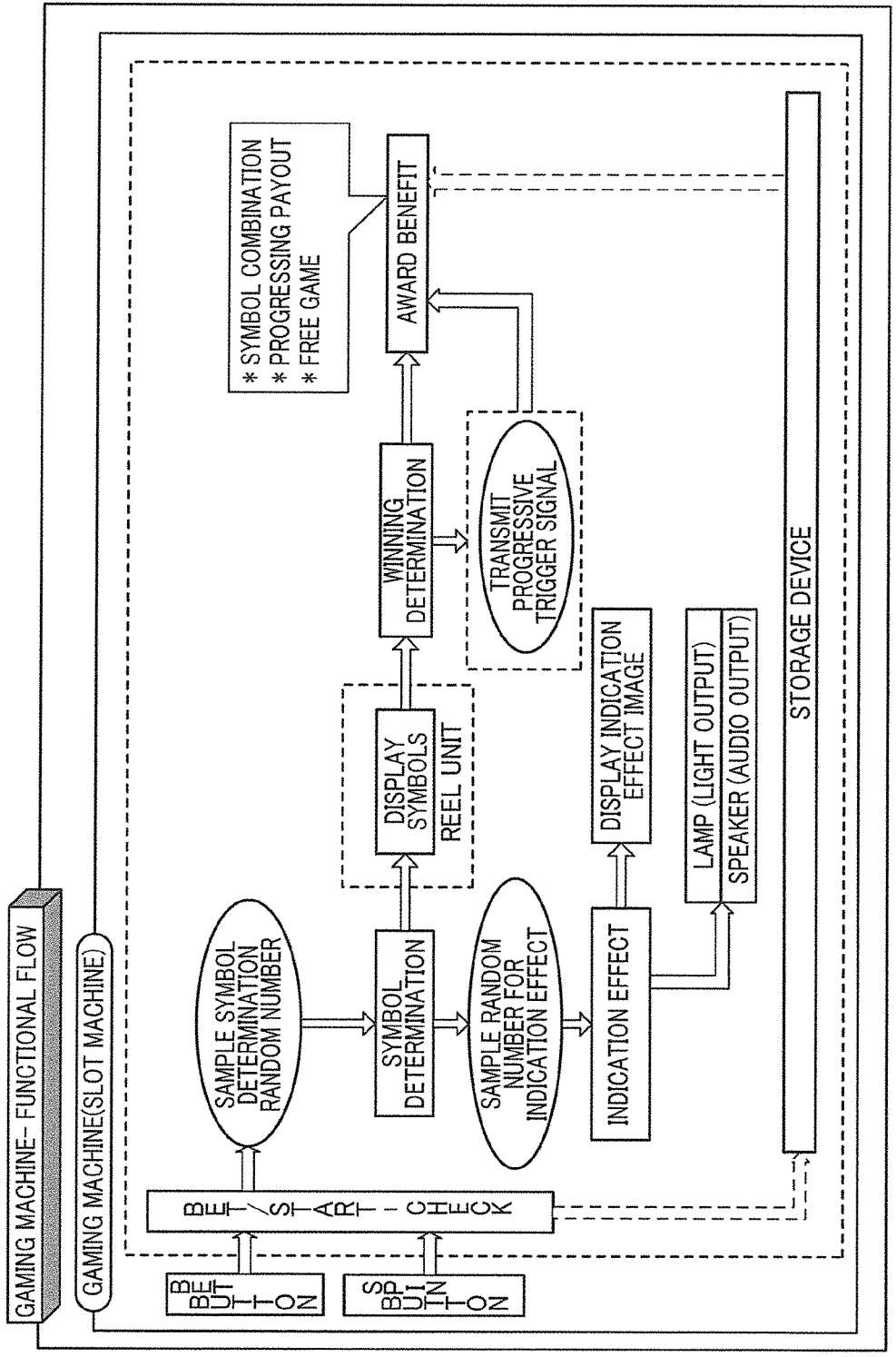
FIG. 39 shows a functional flow of the slot machine of the embodiment of the present invention.

The following describes basic functions of the slot machine related to the embodiment of the present invention, with reference to FIG. 39. FIG. 39 is a diagram showing functional flow of the slot machine related to the embodiment of the present invention.

<Bet/Start-Check>

First, the slot machine checks whether or not a BET button has been pressed by a player, and subsequently checks whether or not a spin button has been pressed by the player.

<Symbol Determination>

Subsequently, when the spin button is pressed by the player, the slot machine extracts a random number for determination, and determines, with reference to the symbol random determination table, symbols to be displayed (rearranged) for the player at the time of stopping the scroll of the reel, for respective reels.

<Determination of Indication Effect>

With reference to a combination displayed for the player and the indication effect table, the slot machine samples a random number for indication effect and determines whether to perform a predetermined indication effect by the effect means such as displaying an image on a display, outputting light from a lamp, and outputting sound from a speaker. When the predetermined indication effect is to be performed, the predetermined indication effect is performed by the effect means such as displaying an image on a display, outputting light from a lamp, and outputting sound from a speaker.

<Reel Control>

Thereafter, the slot machine starts the rotation of each reel and stops the rotation of each reel so that the determined symbols are displayed for the player (symbol display).

<Winning Determination>

Subsequently, as the rotation of each reel is stopped, the slot machine determines whether the combination of the symbols displayed for the player is a combination related to winning.

<Awarding Benefit>

When the combination of the symbols displayed for the player is a combination related to winning, the slot machine offers, to the player, benefit according to the type of the combination. For example, when a combination of symbols related to awarding of a credit is displayed, the slot machine awards credits to the player, the amount of which corresponds to the combination of the symbols.

When a combination of a predetermined symbol is established, shifting to the free game occurs. In the free game, the slot game is run without requiring betting from the player. When the combination of the symbols displayed for the player is a combination related to winning as a result of the free game, a benefit according to the combination is awarded to the player.

In addition to the above, the slot machine may accumulatively add a part of a bet amount to progressive payout stored in the storage device, each time the unit game is executed. When progressive payout is employed, the slot machine awards the progressive payout accumulatively stored in the storage device to the player, when a progressive trigger condition is established. The progressive (jackpot) is a function of accumulating at least one of coins betted by a player at a slot machine (or slot machines) in the progressive payout and awarding the accumulated progressive payout to a slot machine in which a progressive trigger is established. When the progressive payout is accumulated by plural slot machines, an amount (accumulative amount) accumulated to the progressive payout is calculated and transmitted to an external controller each time the game is executed. The external controller adds the accumulative amount sent from each slot machine to the progressive payout.

The slot machine may have other benefits such as a mystery bonus and insurance. In the mystery bonus, a predetermined number of coins are paid out when a win is achieved in dedicated random determination. When a spin button is pressed, the slot machine samples a random number for the mystery bonus, and whether a mystery bonus trigger is established is randomly determined.

The insurance is a function for saving the player when the free game is not executed for a long period of time. Whether the insurance is activated or not is freely determined by an administrator of the slot machine. When the insurance is activated, a predetermined insurance activation amount must be paid. When the insurance is activated, the slot machine starts to count the number of plays of the game. When the counted number of plays reaches a predetermined number without a large amount of payout, the slot machine pays out coins, the amount of which has been set for the insurance.

[Overall Structure of Game System]

Figure 40:
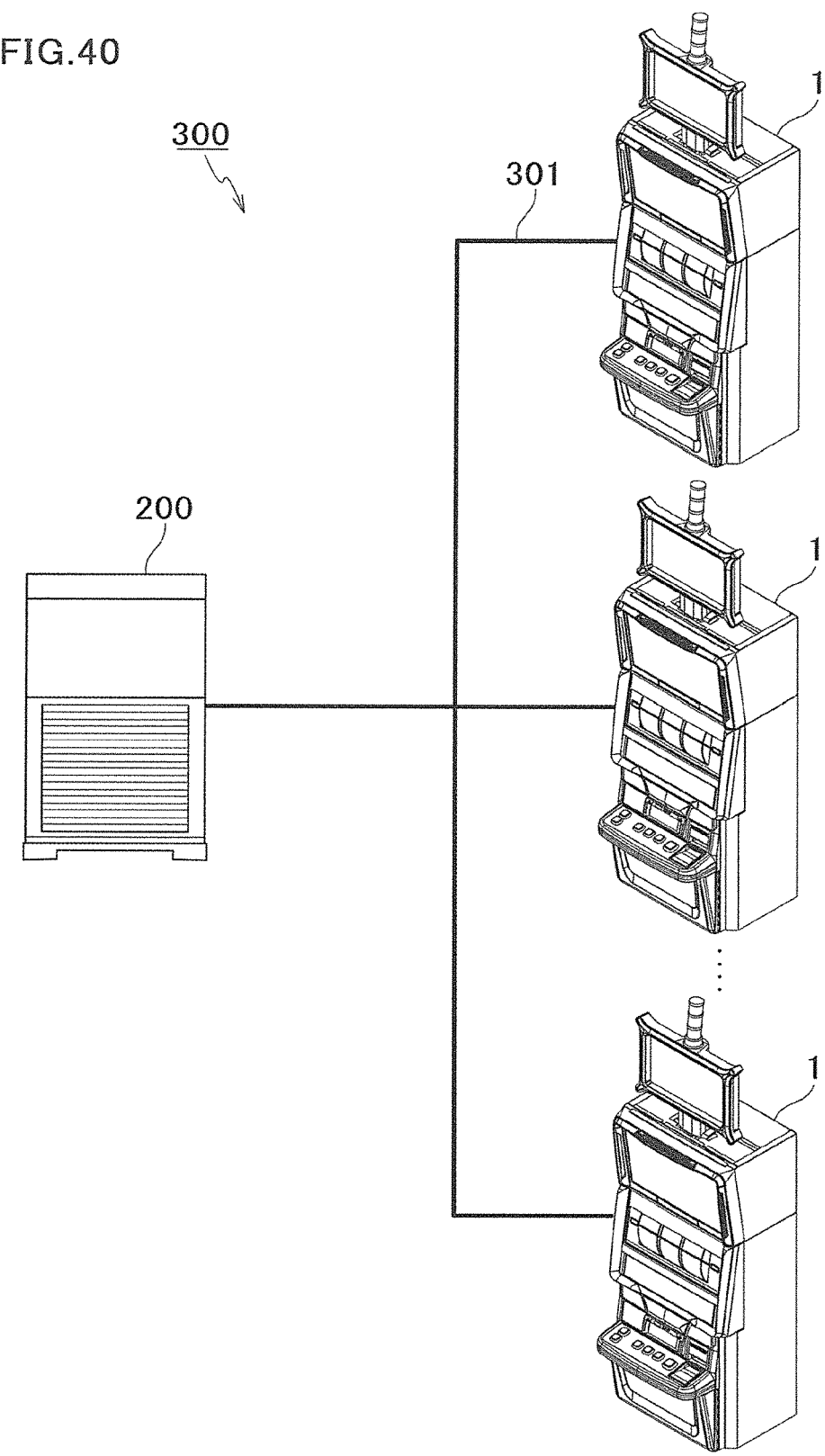
FIG. 40 shows a game system including the slot machine of the embodiment of the present invention.

The basic functions of the slot machine have been described as above. Now, referring to FIG. 40, a game system including the slot machine will be described. FIG. 40 shows the game system including the slot machine of the embodiment of the present invention.

A game system 300 includes a plurality of slot machines 1 and an external controller 200 connected with the slot machines 1 via a communication line 301.

The external controller 200 is for controlling the plurality of slot machines 1. In the embodiment of the present invention, the external controller 200 is a so-called hall server installed in a gaming facility where the plurality of slot machines 1 are provided. Each of the slot machines 1 has a unique identification number, and the external controller 200 identifies which one of the slot machines 1 transmitted data, by referring to the identification number. Further, the external controller 200 determines transmission target of data with the identification number when transmitting data to a slot machine 1.

It is to be noted that the game system 300 may be constructed within a single gaming facility where various games can be performed, such as a casino, or may be constructed among a plurality of gaming facilities. Further, when the game system 300 is constructed in a single gaming facility, the gaming system may be constructed in each floor or section of the gaming facility. The communication line 301 may be a wired or wireless line, and can adopt a dedicated line, an exchange line or the like.

The game system 300 is of a network type in which the slot machines 1 are connected with the external controller 200 by a communication line 301, but the game system 300 may be of a standalone type in which each slot machine 1 independently executes a game.

[Overall Structure of Slot Machine]

Figure 41:
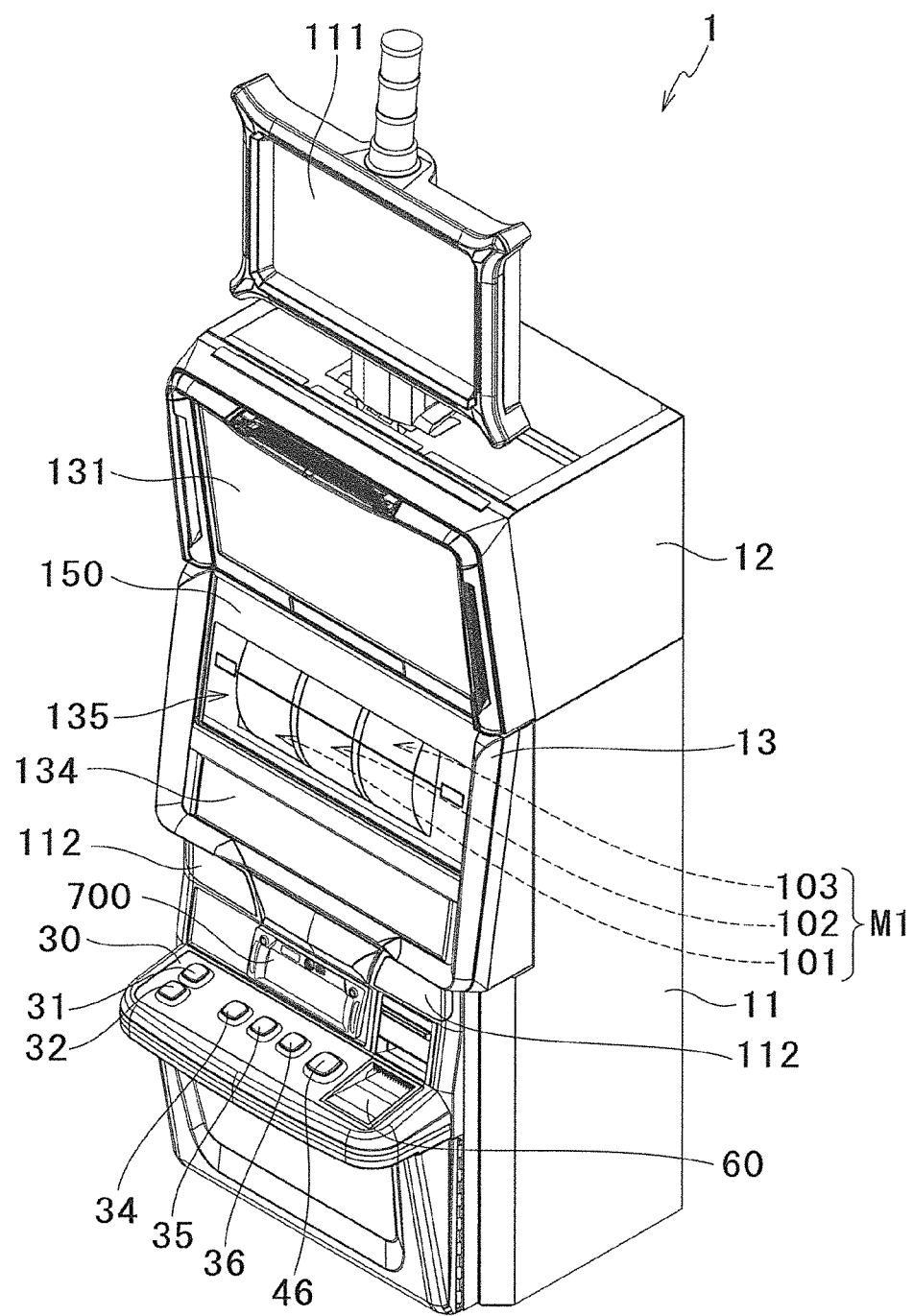
FIG. 41 shows the overall structure of the slot machine of the embodiment of the present invention.

Now, referring to FIG. 41, the overall structure of the slot machine 1 will be described. FIG. 41 shows the overall structure of the slot machine of the embodiment of the present invention.

Electrically valuable information such as electronic money is used as a gaming value in the slot machine 1. It is to be noted that the gaming value is not limited to these, and for example a coin, a medal, a token, a ticket with a bar code and the like can be adopted.

The slot machine 1 includes a cabinet 11, a top box 12 installed on the upper side of the cabinet 11, and a main door 13 provided at the front surface of the cabinet 11. Above the top box 12, a digital signage 111 is provided.

The main door 13 is provided with a reel unit M1 (corresponding to a symbol display device) constituted by three reels 101, 102, and 103. A reel cover 135 is provided in front of the reel unit M1. On the front surface of the reel cover 135, a liquid crystal display device 134 by which a game status is reported to the player and a transparent panel are provided. This liquid crystal display device 134 is provided with a touch panel 137. The reel cover 135 has the display window 150 at its central portion. In the display window 150, one symbol 501 is provided in each of the upper stage, the middle stage, and the lower stage of each of the reels 101, 102, and 103 (see FIG. 43). To put it differently, 9 symbols 501 forming a 3 by 3 matrix are visibly displayed in the display window 150. On the outer circumferential surface of each of the reels 101, 102, and 103, 22 symbols are depicted (see FIG. 42). These 22 symbols 501 are lined up along the rotational direction of the reels 101, 102, and 103 to form a symbol array. Each of the symbol arrays is a combination of "RED7", "3BAR", "2BAR", "1BAR", "BLANK", and "FEATURE". To the main door 13 is provided a speaker 112.

Figure 43:
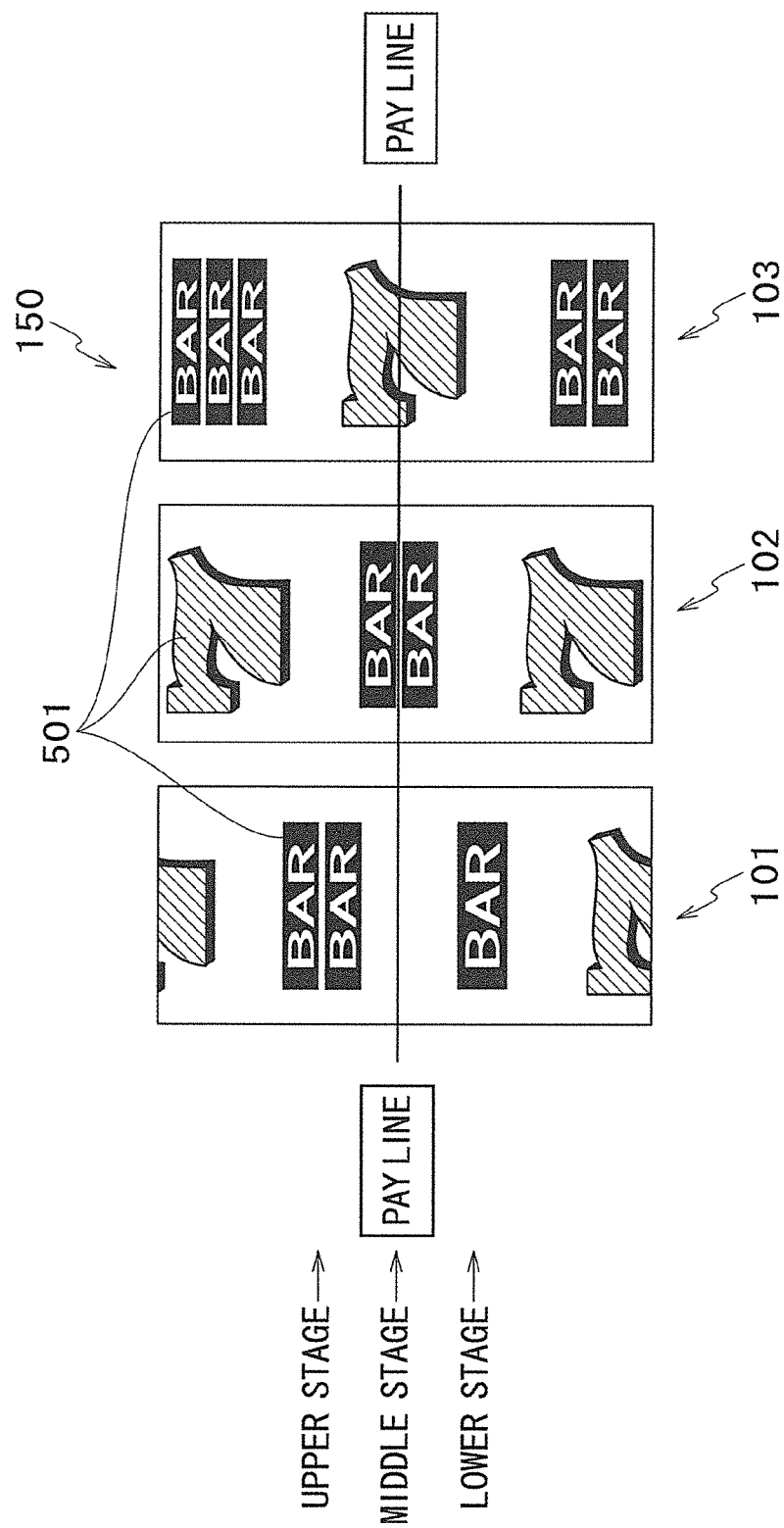
FIG. 43 shows a reel displayed on a display window of the slot machine of the embodiment of the present invention.

As shown in FIG. 43, a payline for result determination of symbols 501 rearranged in the display window 150 is set in the slot machine 1. In the present embodiment, one payline is formed at the middle stage of the display window 150 as shown in FIG. 43. Alternatively, plural paylines may be provided and each payline may be activated upon selection by a player.

As shown in FIG. 43, the reel unit M1 rearranges the symbols 501 on the display window 150 by drivingly rotating the reels 101, 102, and 103 each having the symbols 501 on the outer circumferential surface. In the descriptions below, the reels may be referred to as a first reel 101, a second reel 102, and a third reel 103 from the left end in front elevation.

On the inner circumferential side of each of the reels 101, 102, and 103 arranged as above, a backlight unit M7 (not illustrated) is provided. The backlight unit emits illumination light from the inner circumferential side of the reels 101, 102, and 103 to the outer circumferential surface of the reels and is arranged so that the illumination light passing through the outer circumferential surface of the reels is seen from the outside of the display window 150. The backlight unit is configured to be able to change the amount of illumination light in multiple stages. The degree of freedom in the effects using illumination light is therefore high. Furthermore, each backlight unit is able to emit light in multiple colors, and to illuminate the symbols individually with the illumination light.

It should be noted that the present embodiment deals with a case where the slot machine 1 employs the reel unit M1 in the form of mechanical reels; however, the slot machine 1 of the present invention may adopt video reels that display simulated reels, or adopt a combination of the video reels and the mechanical reels.

Figure 44:
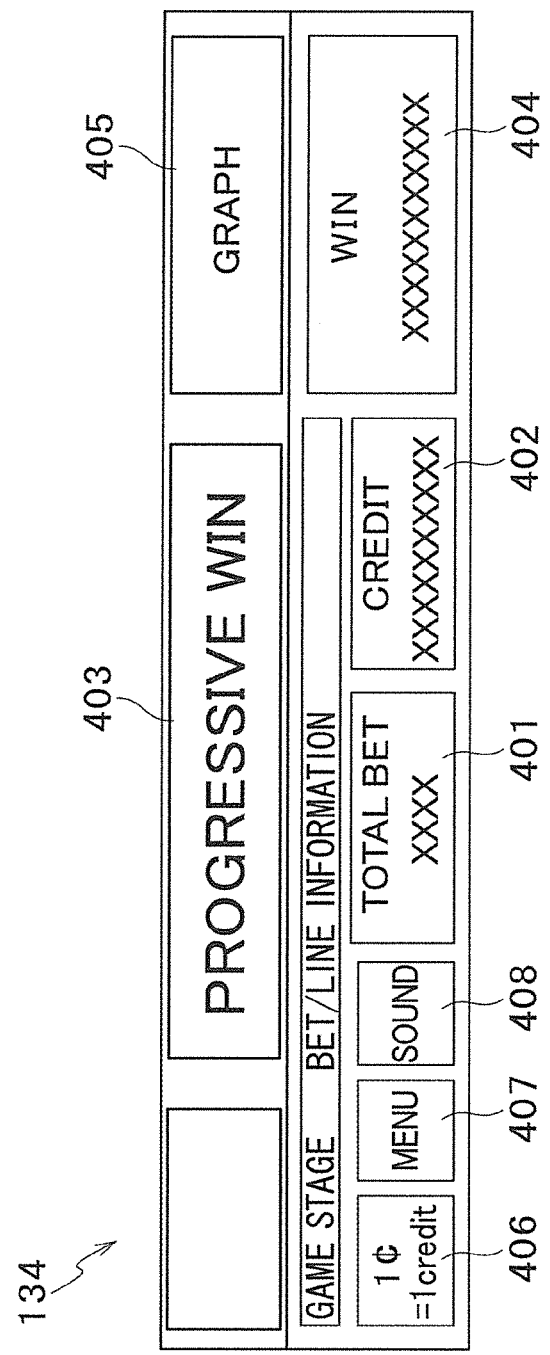
FIG. 44 illustrates the liquid crystal display device of the slot machine of the embodiment of the present invention.

As shown in FIG. 44, on the liquid crystal display device 134 is displayed meters indicating the conditions of the game. For example, a total bet meter 401 displays "Total Bets". The numerical value is re-calculated at every game play. The credit meter 402 indicates the total credit amount at the time. The default value is 0. The numerical value is increased or decreased according to the gaming value input, the bet, and the game result. A game message area 403 indicates a message explaining the current gaming status. The win meter 404 indicates the total credit amount of the payout having been won.

The liquid crystal display device 134 is provided with a graph touch area 405, a denomination indicator 406, a menu touch area 407, and a sound volume switching touch area 408. When touched by the player, the graph touch area 405 displays, in the form of graphs, the change of the obtained payout amount, the number of game play executed until the shifting to the free game, and the total obtained credit amount at the time of the free game, on the upper image display panel 131. As the graph touch area 405 is touched, three types of graph images, i.e., line-graph, bar-graph, and block-graph are displayed in order. The denomination indicator 406 displays current denomination. When the menu touch area 407 is touched by the player, the upper image display panel 131 displays the first page of the HELP screen. The sound volume switching touch area 408 is used for switching the game sound volume in three stages. Each time the sound volume switching touch area 408 is touched by the player, the game sound volume is switched such that, for example, from low to middle to high to small to middle.

The upper image display panel 131 is provided at the front face of the top box 12. The upper image display panel 131 includes a liquid crystal panel, and forms the display. The upper image display panel 131 displays images related to effects and images showing introduction of the game contents and explanation of the game rules.

Below the reel unit M1 are provided a control panel 30 having various buttons, a PTS device 700, and a bill entry 60.

The bill entry 60 validate bills and receives genuine bills into the cabinet 11. The bill entry 60 is electrically connected to the PTS device 700, and when a legitimate bill is received, transmits to the PTS device 700 an input signal based on the value of the bill. The input signal includes information on credit data or the like related to the received bill.

The PTS device 700 is a unit in which an LCD (liquid crystal display), a human detection camera, a microphone, and the like are integrated. The human detection camera makes it possible to detect the presence of a player by the camera function. The microphone is used for the player's participation in a game by voice and the authentication of a player by voice recognition. Further, the PTS device 700 has a card insertion slot to which an IC card can be inserted. With this, the player is able to insert an IC card into the card insertion slot and use the credits stored in the IC card in the slot machine 1.

(Control Panel 30)

On the control panel 30, a HELP button 31 and a CASHOUT button 32 are arranged in the left side area, a 1-BET button 34, a 2-BET button 35, and a 3-BET button 36 are arranged in the middle area, and a spin button 46 is arranged in the lower stage on the left side area.

The HELP button 31 is pressed when, for example, it is unclear how to play a game. As the HELP button 31 is pressed, various help information is displayed on the upper image display panel 131. The CASHOUT button 32 is an operation button used when checking out credits reserved in the slot machine 1 is discharged.

Each time the 1-BET button 34 is pressed, one of the credits currently owned by the player is betted. The 2-BET button 35 is used to start a game with two bets. The 3-BET button 36 is used to start a game with three bets. A gaming value corresponding to one bet can be optionally changed by setting the denomination.

The spin button 46 is used to start the rotation of the reels 101, 102, and 103.

(Symbol Array)

Now, with reference to FIG. 42, the arrays of the symbols 501 on the first reel 101, the second reel 102, and the third reel 103 of the slot machine 1 will be described.

A symbol table shown in FIG. 42 shows arrays of the symbols 501 displayed on the outer circumferential surfaces of the first reel 101, the second reel 102, and the third reel 103. To each of the first reel 101, the second reel 102, and the third reel 103 is assigned a symbol array including 22 symbols 501 respectively corresponding to code numbers 0 to 21.

As shown in FIG. 42, the types of the symbols include "RED7", "3BAR", "2BAR", "1BAR", "BLANK", and "FEATURE".

[Structures of Circuits Provided to Slot Machine]

Figure 45:
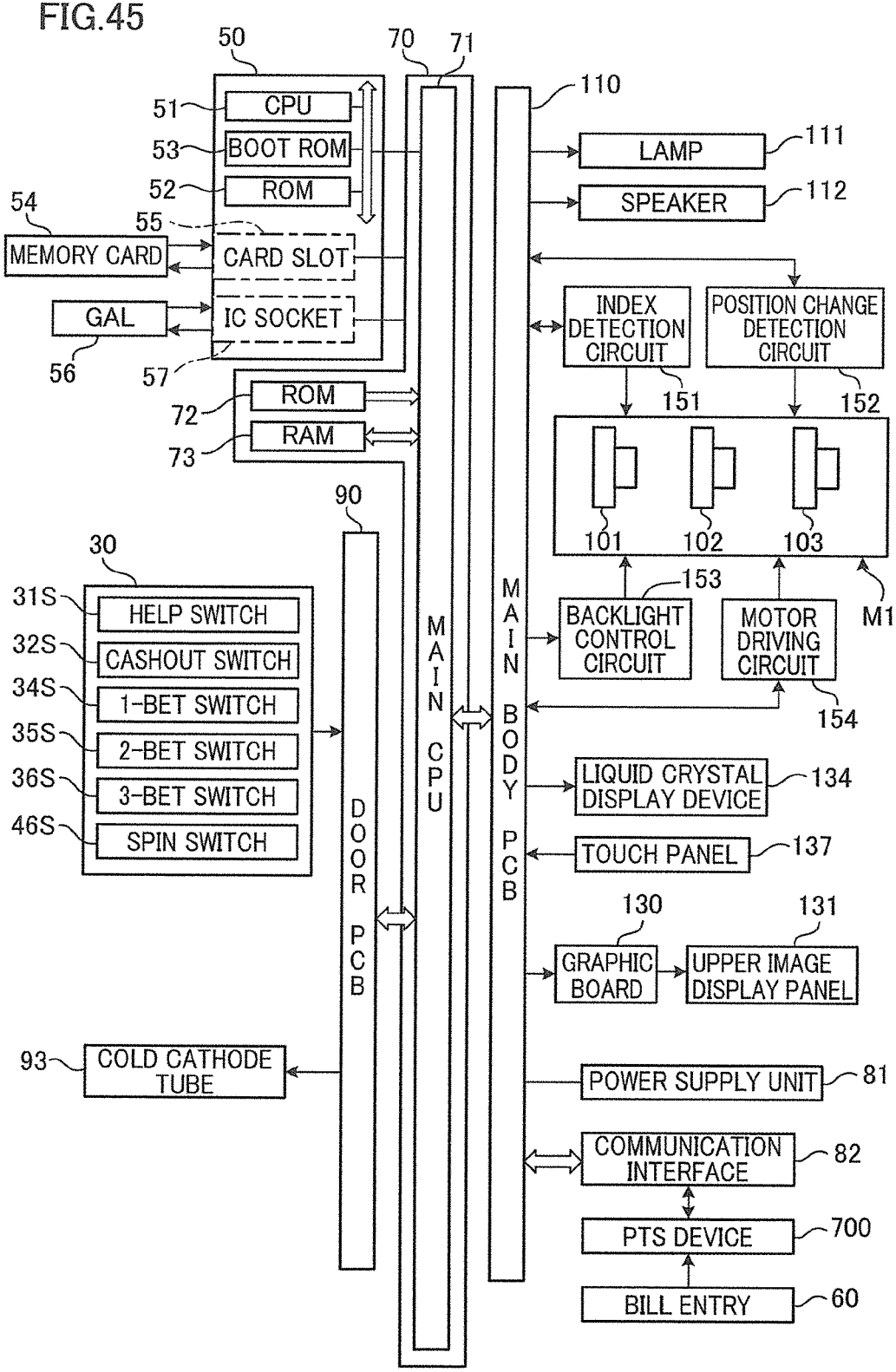
FIG. 45 is a block diagram showing an internal structure of the slot machine of the embodiment of the present invention.

Now, referring to FIG. 45, the structure of a circuit in the slot machine 1 will be described. FIG. 45 is a block diagram showing an internal structure of the slot machine of the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a nonvolatile memory, and stores a game program. The game program includes a program related to game progression and an effect program for producing effects by images and sounds.

Further, the card slot 55 is configured so that the memory card 54 can be inserted thereinto and removed therefrom, and is connected to a motherboard 70 by an IDE bus. The type and contents of the game to be played on the slot machine 1 can be changed by drawing out the memory card 54 from the card slot 55, writing another game program into the memory card 54, and inserting the memory card 54 into the card slot 55.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents and settings of the game to be played on the slot machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the preliminary authentication program, and the like. The authentication program is a program (falsification check program) for authenticating the game program. The pre-authentication program is a program for authenticating the aforementioned preliminary authentication program. The authentication program and the preliminary authentication program are written along a procedure (authentication procedure) for proving that the program to be the subject has not been falsified.

The motherboard 70 is provided with a main CPU 71, a ROM 72, a RAM 73, and a communication interface 82. The ROM 72 and the RAM 73 correspond to a storage device.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted. Further, through the gaming board 50, a process of loading the game program stored in the memory card 54 is started.

The processor of the present invention includes the main CPU 71, the ROM 72, and the RAM 73 above and the memory card 54 storing the game program, and controls the slot machine by causing the main CPU 71 to execute the game program. Needless to say, the processor may alternatively store the game program in the ROM 72 instead of the memory card 54.

The RAM 73 stores data and programs which are used in operation of the main CPU 71. For example, when the process of loading the aforementioned game program or authentication program is executed, the RAM 73 can store the program. The RAM 73 is provided with working areas used for operations when these programs are executed. Examples of the areas include: an area that stores counter which manages the number of game play, a bet amount, the credit amount, a payout value of each progressive payout, and the like; and an area that stores symbols (code numbers) randomly determined.

In addition to the above, the RAM 73 stores tables such as a symbol combination table (see FIG. 46), a symbol random determination table (see FIG. 47), and an indication effect table (see FIG. 48).

The communication interface 82 is for communicating with the PTS device 700 and the external controller 200. The PTS device 700, upon reception of an input signal from the bill entry 60, transmits credit data contained in the input signal to the main CPU 71 via the communication interface 82. Further, when an IC card is inserted into the card insertion slot, the PTS device 700 transmits credit data stored in the IC card to the main CPU 71 via the communication interface 82. The PTS device 700 also writes credit data into the IC card inserted into the card insertion slot, based on a control signal received from the main CPU 71 via the communication interface 82.

Further, the motherboard 70 is connected with a later-described door PCB (Printed Circuit Board) 90 and a main body PCB 110 by respective USBs. The motherboard 70 is also connected with a power supply unit 81. When the power is supplied from the power supply unit 81 to the motherboard 70, the main CPU 71 of the motherboard 70 is activated, and then power is supplied to the gaming board 50 through the PCI bus so as to activate the CPU 51.

The door PCB 90 and the main body PCB 110 are connected with input devices such as a switch and a sensor, and peripheral devices the operations of which are controlled by the main CPU 71. The door PCB 90 is connected with a control panel 30, and a cold cathode tube 93.

The control panel 30 is provided with a HELP switch 31S, a CASHOUT switch 32S, a 1-BET switch 34S, a 2-BET switch 35S, a 3-BET switch 36S, and a spin switch 46S, correspondingly to the above-described buttons. Each of the switches outputs a signal to the main CPU 71 upon detection of press of the button corresponding thereto by the player.

The cold cathode tube 93 functions as a backlight installed on the rear face side of the upper image display panel 131, and lights up based on a control signal output from the main CPU 71.

The body PCB 110 is connected with a lamp 111, a speaker 112, a graphic board 130, the liquid crystal display device 134, a touch panel 137, an index detection circuit 151, a position change detection circuit 152, a backlight control circuit 153, and a motor driving circuit 154. The index detection circuit 151, the position change detection circuit 152, a backlight control circuit 153, and a motor driving circuit 154 are connected with the reel unit M1.

The lamp 111 turns on based on a control signal outputted from the main CPU 71. The speakers 112 output BGM sound or the like in accordance with a control signal output from the main CPU 71.

The graphic board 130 controls displaying of images on the upper image display panel 131 based on a control signal output from the main CPU 71. The graphic board 130 is provided with a VDP (Video Display Processor) configured to generate image data, a video RAM configured to store the image data generated by the VDP, and the like. It is to be noted that the image data used for generating image data by the VDP is included in the game program that has been read from the memory card 54 and stored into the RAM 73.

The liquid crystal display device 134 displays an image based on a control signal output from the main CPU 71. The touch panel 137 detects a position on the liquid crystal display device 134 touched by a finger or the like of the player, and outputs a signal corresponding to the detected position to the main CPU 71.

The motor driving circuit 154 is connected to a stepper motor configured to rotate the reels 101, 102, and 103. Further, the motor driving circuit 154 includes an FPGA (Field Programmable Gate Array) and a driver. The FPGA is an electronic circuit such as a programmable LSI, and functions as a control circuit of the stepper motor. The driver functions as an amplifying circuit for pulses to be input to the stepper motor.

The index detection circuit 151 detects the positions of the rotating reels 101, 102, and 103 and is able to detect the step out of the reels 101, 102, and 103.

The position change detection circuit 152 is configured to detect a change in the stop position of the reels 101, 102, and 103 after the rotation of the reels 101, 102, and 103 is stopped. The position change detection circuit 152 detects a change in the stop positions of the reels 101, 102, and 103 when, for example, a stop position is changed to achieve a winning combination of the symbols 501 by an illicit way when no winning combination of the symbols 501 is achieved. The position change detection circuit 152 is configured to detect a change in the stop position of the reels 101, 102, and 103, for example, by detecting not-shown fins which is arranged on the inner sides of the reels 101, 102, and 103 at predetermined intervals.

It should be noted that the method of exciting the stepper motor is not particularly limited, and 1-2 phase excitation system or a 2 phase excitation system are adoptable. Further, a DC motor may be adopted in place of the stepper motor.

In cases of adopting a DC motor, the main body PCB 110 is connected to an error counter, a D/A converter, a servo amplifier in this order, and the DC motor is connected to the servo amplifier. Further, the rotational position of the DC motor is detected by the rotary encoder, and the rotary encoder supplies the current rotational position of the DC motor in the form of data to the error counter.

The backlight control circuit 153 is connected to the backlight units to individually supply driving power thereto. Upon receiving an instruction from the main CPU 71, the backlight control circuit 153 changes the amount of light emitted in multiple stages. The five backlight units provided on the inner circumferential surfaces of the reels 101, 102, and 103 are able to individually illuminate 9 symbols 501 having stopped on the display window 150 by means of the backlight control circuit 153.

(Symbol Combination Table)

Now, symbol combination tables will be described with reference to FIG. 46. FIG. 46 shows a symbol combination table in the slot machine of the embodiment of the present invention.

The symbol combination table defines payouts for bet amounts and symbol combinations achieving winning (WIN). In the slot machine 1, the rotational scroll of the reels 101, 102, and 103 is stopped, and when a combination of three symbols displayed (rearranged) on a payline corresponds to a symbol combination defined in the symbol combination table, winning is achieved. In accordance with the type of winning, a benefit will be given to the player in the form of awarding payout and the like. It is noted that winning is not established (i.e. the game is lost) when the combination of symbols displayed (rearranged) on the payline does not match with any of the combinations of symbols specified by the symbol combination table.

Basically, winning is achieved when three symbols of the following types are displayed on a payline: "RED7", "3BAR", "2BAR", "1BAR", "BLANK", and "FEATURE". Winning as "ANYBAR" is also achieved when a symbol combination including "3BAR", "2BAR", and "1BAR" is established. When the game is played with one bet, no payout is awarded for "RED7". When the game is played with three bets, progressive payout (initial value 300+ incremented amount) is awarded when three "RED7" are rearranged on a payline. When three "FEATURE" are rearranged on the payline, right to execute the free game 10 times is awarded.

(Symbol Random Determination Table)

Now, the symbol random determination table will be described with reference to FIG. 47. In the present embodiment, the symbol random determination table is a table which is referred to in a later-described symbol random determination process in the main control process and a later-described symbol random determination process in the free game process.

In the symbol random determination table, probabilities (WEIGHT) are set for 22 symbols corresponding to code numbers "0" to "21", respectively. Each probability (WEIGHT) indicates a probability that the corresponding symbol 501 is rearranged in the middle stage (on the payline) of the display window 150. For example, in the symbol random determination table shown in FIG. 47, "RED7" of the first reel 101 corresponding to the code number "4" is rearranged in the middle stage of the display window 150 (on the payline) at a probability of 20/50. "BLANK" of the second reel 102 corresponding to the code number "4" is rearranged in the middle stage of the display window 150 (on the payline) at a probability of 5/50.

"RED7" of the third reel 103 corresponding to the code number "4" is rearranged in the middle stage of the display window 150 (on the payline) at a probability of 10/40. Similarly, "FEATURE" of the first reel 101 corresponding to the code number "14" is rearranged in the middle stage of the display window 150 (on the payline) at a probability of 1/50. "FEATURE" of the second reel 102 corresponding to the code number "14" is rearranged in the middle stage of the display window 150 (on the payline) at a probability of 2/50. "FEATURE" of the third reel 103 corresponding to the code number "14" is rearranged in the middle stage of the display window 150 (on the payline) at a probability of 1/40.

In addition to the above, for example, a provability that the first reel 101, the second reel 102, and the third reel 103 are rearranged and a symbol combination displayed on the payline is "RED7", "RED7", and "RED7" (i.e., a probability of establishment of winning with "RED7") is (20/50)×(5/50)×(10/40)=1000/100000=1% (see FIG. 49).

In the meanwhile, a provability that a symbol combination displayed on the payline is "RED7", "RED7", and "a symbol other than RED7" (i.e., a probability of establishment of tenpai of winning with "RED7") is (20/50)×(5/50)×(30/40)=3000/100000=3% (see FIG. 49).

A probability that three "RED7" are displayed in the display window 150 (but winning with "RED7" is not established) is considered as below. To begin with, in regard to the first reel 101, when "BLANK" corresponding to the code number "3", "RED7" corresponding to the code number "4", or "BLANK" corresponding to the code number "5" is rearranged, "RED7" is displayed in one of the upper stage, the middle stage, and the lower stage of the display window 150. In regard to the second reel 102, when "BLANK" corresponding to the code number "3", "RED7" corresponding to the code number "4", or "BLANK" corresponding to the code number "5" is rearranged, "RED7" is displayed in one of the upper stage, the middle stage, and the lower stage of the display window 150. Similarly, in regard to the third reel 103, when "BLANK" corresponding to the code number "3", "RED7" corresponding to the code number "4", or "BLANK" corresponding to the code number "5" is rearranged, "RED7" is displayed in one of the upper stage, the middle stage, and the lower stage of the display window 150. A provability that a symbol combination displayed on the payline is "RED7", "RED7", and "a symbol other than RED7" (i.e., a probability of establishment of winning with "RED7") is 1% as described above.

Therefore, the probability that three "RED7" are displayed on the display window 150 (but winning with "RED7" is not established) is calculated in such a way that the probability that "RED7" is displayed in any one of the upper stage, the middle stage, and the lower stage of the display window 150 of the first reel 101 by the probability that "RED7" is displayed in any one of the upper stage, the middle stage, and the lower stage of the display window 150 of the second reel 102 and the probability that "RED7" is displayed in any one of the upper stage, the middle stage, and the lower stage of the display window 150 of the third reel 103, and the probability (1%) of establishment of winning with "RED7" is subtracted therefrom.

To be more specific, the probability that three "RED7" are displayed on the display window 150 (but winning with "RED7" is not established) is ((3+20+2)/50)×((10+5+5)/50)×((1+10+1)/40)−(1/100)=(25/50)×(20/50)×(12/40)−(1/100)=(6/100)−(1/100)=5/100=5% (see FIG. 49).

(Indication Effect Table)

Now, the indication effect table will be described with reference to FIG. 48. The indication effect table is referred to in a later-described indication effect random determination process in the main control process and an indication effect random determination process in the free game process.

In the indication effect table, a probability (indication occurrence probability) of performing an indication effect by an image is associated with a combination of symbols rearranged as a result of the symbol random determination process. To be more specific, in the indication effect table, an indication occurrence probability of 80/100 is associated with a symbol combination "RED7" "RED7", and "RED7" (i.e., establishment of winning with "RED7") displayed on the payline. An indication occurrence probability of 10/100 is associated with a symbol combination of "RED7", "RED7", and "a symbol other than RED7" (i.e., establishment of tenpai of winning with "RED7") displayed on the payline. An indication occurrence probability of 5/100 is associated with a symbol combination of three "RED7" (but winning with "RED7" is not established) on the payline in the display window 150.

As shown in FIG. 54, as the indication effect, during the slot game, an effect image that eyes of a dragon character 132 displayed on the upper image display panel 131 emit light. As the indication effect, in addition to the image effect, an optical effect by a lamp 111 and a sound effect by a speaker 112 may be performed.

In the symbol random determination table and the indication effect table of the present embodiment, values (80/10000 (0.80%), 30/10000 (0.30%), and 25/10000 (0.25%)) calculated by multiplying the probability 1% that the symbol combination displayed on the payline is "RED7", "RED7", and "RED7", the probability 3% that the symbol combination displayed on the payline is "RED7", "RED7", and "a symbol other than RED7", and the probability 5% that three "RED7" are displayed in the display window 150 (but winning with "RED7" is not established) by the indication occurrence probabilities (80/100 (80%), 10/100 (10%), and 5/100 (5%)) corresponding to the respective symbol combinations in the indication effect table shown in FIG. 48 are added up as an overall probability (0.80+0.30+0.25=1.35%) of the occurrence of an indication effect in one game play of the slot game (see FIG. 49), and this overall probability (1.35%) is arranged to be higher than the probability 1% that the symbol combination displayed on the payline is "RED7", "RED7", and "RED7".

When the indication effect occurs, a probability of establishment of winning with "RED7" is 0.80/1.35=59.26%; ≈60%. Therefore, the indication effect indicating that winning with "RED7" occurs at a probability of about 60% occurs at a probability of 1.35% in each game play of the slot game.

In the arrangement above, because the overall probability (1.35%) of occurrence of the indication effect is arranged to be higher than the probability (1%) that the symbol combination displayed on the payline is "RED7", "RED7", and "RED7" (winning with "RED7") in each game play of the slot game, the frequency of the occurrence of the indication effect is higher than the frequency of the establishment of winning with "RED7". On this account, when the effect image that eyes of the dragon character 132 displayed on the upper image display panel 131 emit light as the indication effect is displayed, player's expectation on the establishment of winning with "RED7" may be enhanced, and hence monotonousness regarding the indication effect in the slot game is avoided.

(Contents of Program)

Now, the program to be executed by the slot machine 1 is described with reference to FIG. 50 to FIG. 52.

(Main Control Process)

Figure 50:
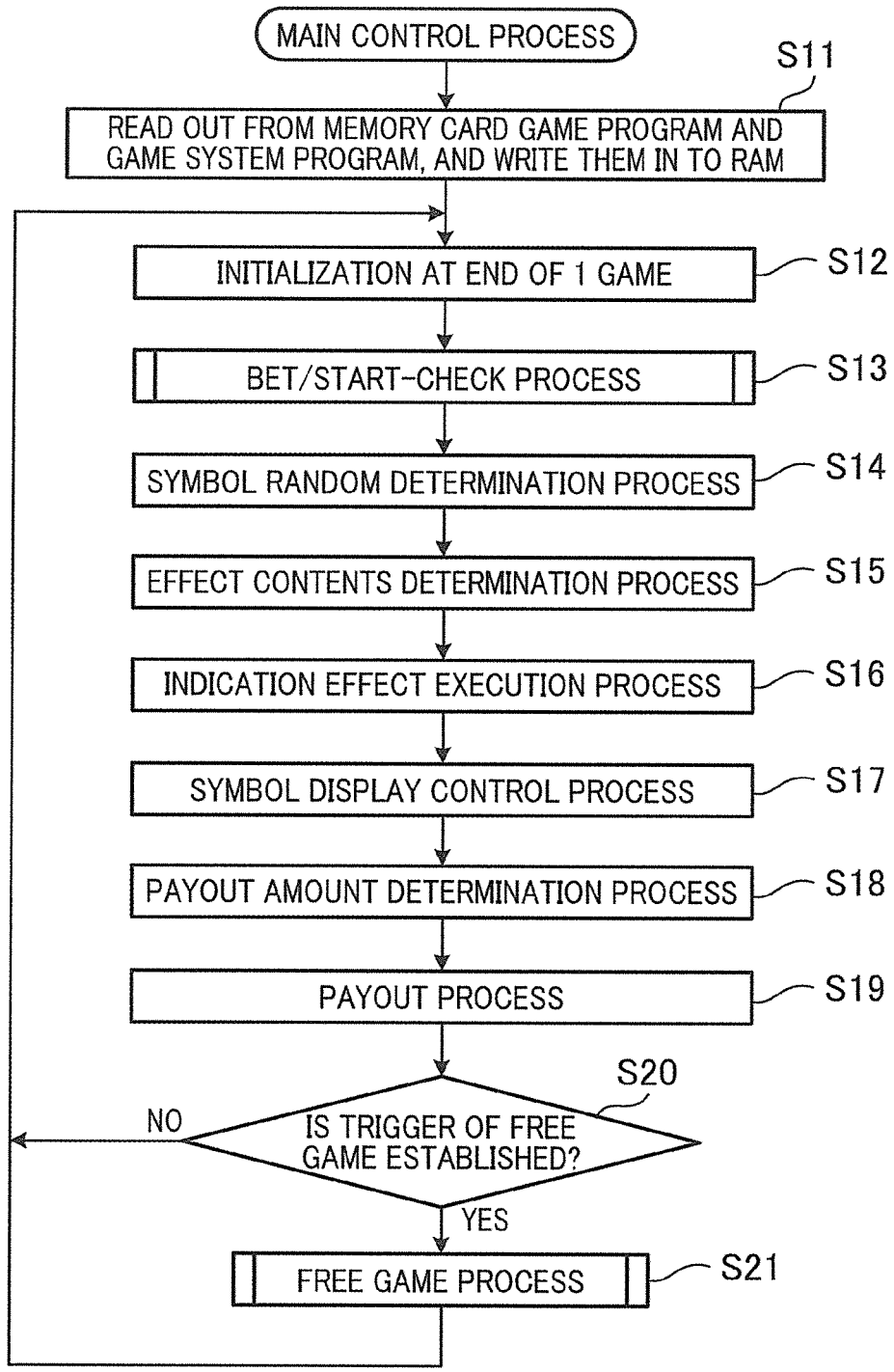
FIG. 50 is a flowchart of a main control process in the slot machine of the embodiment of the present invention.
Figure 51:
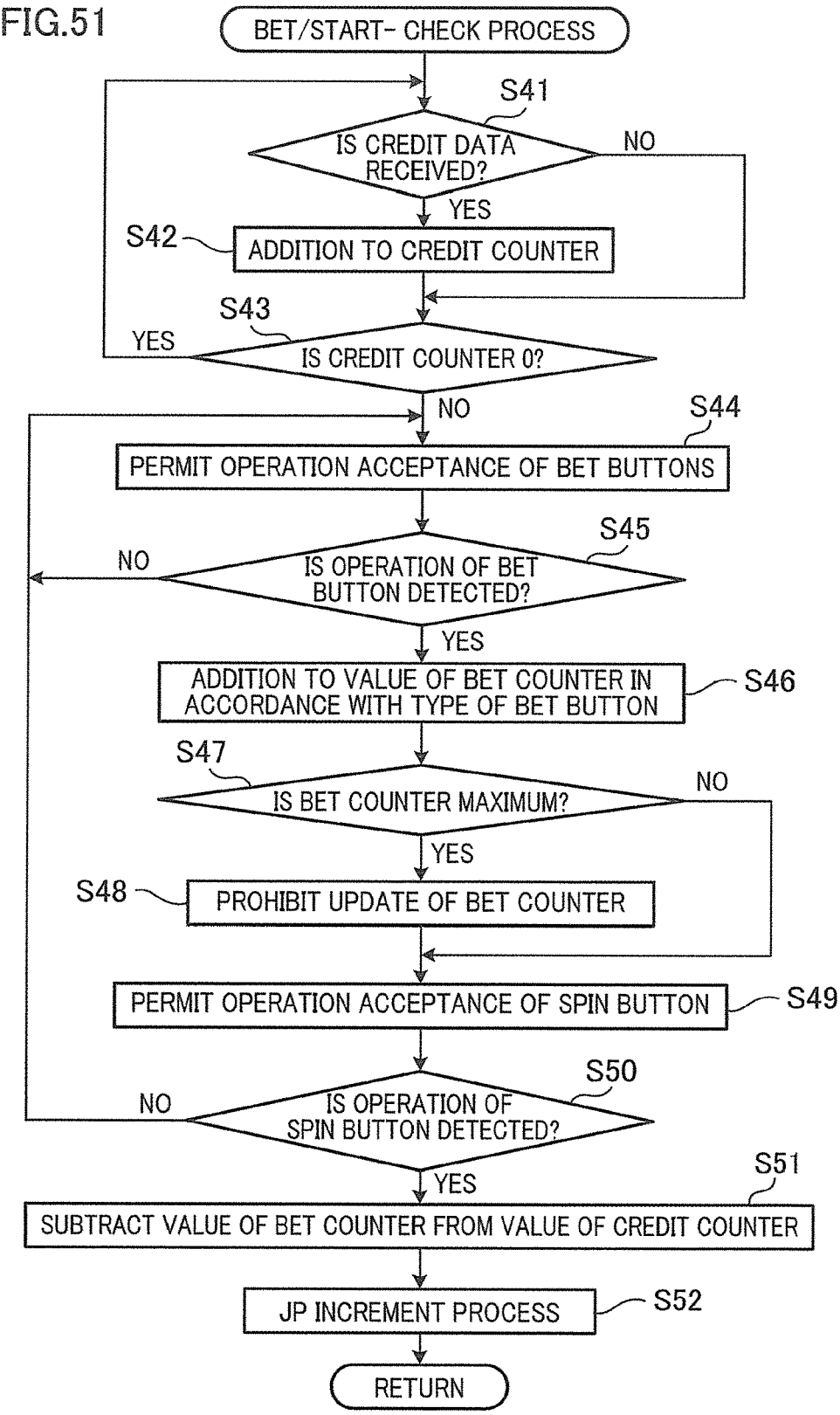
FIG. 51 is a flowchart of a bet/start-check process of the slot machine of the embodiment of the present invention.

Referring to FIG. 50, a main control process will be described. In the main control process, a slot game is executed.

First, when the slot machine 1 is powered on, the main CPU 71 reads an authenticated game program and a game system program from a memory card 54 via a gaming board 50, and then write them in the RAM 73 (S11).

Subsequently, the main CPU 71 executes an initializing process at the end of each play of the game, in order to start the slot game (S12). This process clears data in a working area of the RAM 73, which becomes unnecessary at the end of each play of the normal game, e.g., the bet amount, symbols randomly determined, and the like.

The main CPU 71 then executes a later-described bet/start-check process (S13). In this process, an input check or the like is executed for switches such as the 1-BET switch 34S, the 2-BET switch 35S, the 3-BET switch 36S, and the spin switch 46S.

Subsequently, the main CPU 71 executes the symbol random determination process (S14). In this symbol random determination process, with reference to the RAM 73, three to-be-stopped symbols (on the first reel 101, the second reel 102, and the third reel 103) to be rearranged in the middle stage of the display window 150 (on the payline) are randomly determined based on the probabilities defined in the symbol random determination table (see FIG. 47).

When the code number "4" is selected at the random determination probability of 20/50 for the first reel 101, "RED7" corresponding to the code number "4" of the first reel 101 is selected as a to-be-stopped symbol to be rearranged in the middle stage of the display window 150 (on the payline). When the code number "4" is selected at the random determination probability of 5/50 for the second reel 102, "RED7" corresponding to the code number "4" of the second reel 102 is selected as a to-be-stopped symbol to be rearranged in the middle stage of the display window 150 (on the payline). When the code number "4" is selected at the random determination probability of 10/40 for the third reel 103, "RED7" corresponding to the code number "4" of the third reel 103 is selected as a to-be-stopped symbol to be rearranged in the middle stage of the display window 150 (on the payline).

The main CPU 71 stores the determined to-be-stopped symbols on the reels 101 to 103 in a symbol storing area in the RAM 73.

Subsequently, the main CPU 71 executes the indication effect random determination process (S15). In this indication effect random determination process, with reference to the indication effect table (see FIG. 48), an indication occurrence probability corresponding the three to-be-stopped symbols (on the first reel 101, the second reel 102, and the third reel 103) to be rearranged in the middle stage of the display window 150 (on the payline) as a result of the symbol random determination process in S14 is determined, and whether to execute the indication effect is randomly determined based on the determined indication occurrence probability. For example, when a combination of three to-be-stopped symbols determined as a result of the symbol random determination process is formed of "RED7", "RED7", and "RED7" (i.e., winning with "RED7" is established), the indication effect is performed at the random determination probability of 80/100 (i.e., the indication effect is not performed at the random determination probability of 20/100). When a combination of three to-be-stopped symbols determined as a result of the symbol random determination process is formed of "RED7", "RED7", and "a symbol other than RED7", the indication effect is performed at the random determination probability of 10/100 (i.e., the indication effect is not performed at the random determination probability of 90/100). When a combination of three to-be-stopped symbols determined as a result of the symbol random determination process is formed of three "RED7" in the display window 150, (but winning with "RED7" is not established), the indication effect is performed at the random determination probability of 5/100 (i.e., the indication effect is not performed at the random determination probability of 95/100).

Subsequently, the main CPU 71 executes an indication effect execution process (S16). In this indication effect execution process, when the indication effect is to be performed as a result of the indication effect random determination process in S15, as shown in FIG. 54, the effect image that eyes of the dragon character 132 displayed on the upper image display panel 131 emit light is displayed. When it is determined that the indication effect is not performed, the indication effect is not performed. As the indication effect, in addition to the image effect, an optical effect by a lamp 111 and a sound effect by a speaker 112 may be performed.

Figure 53:
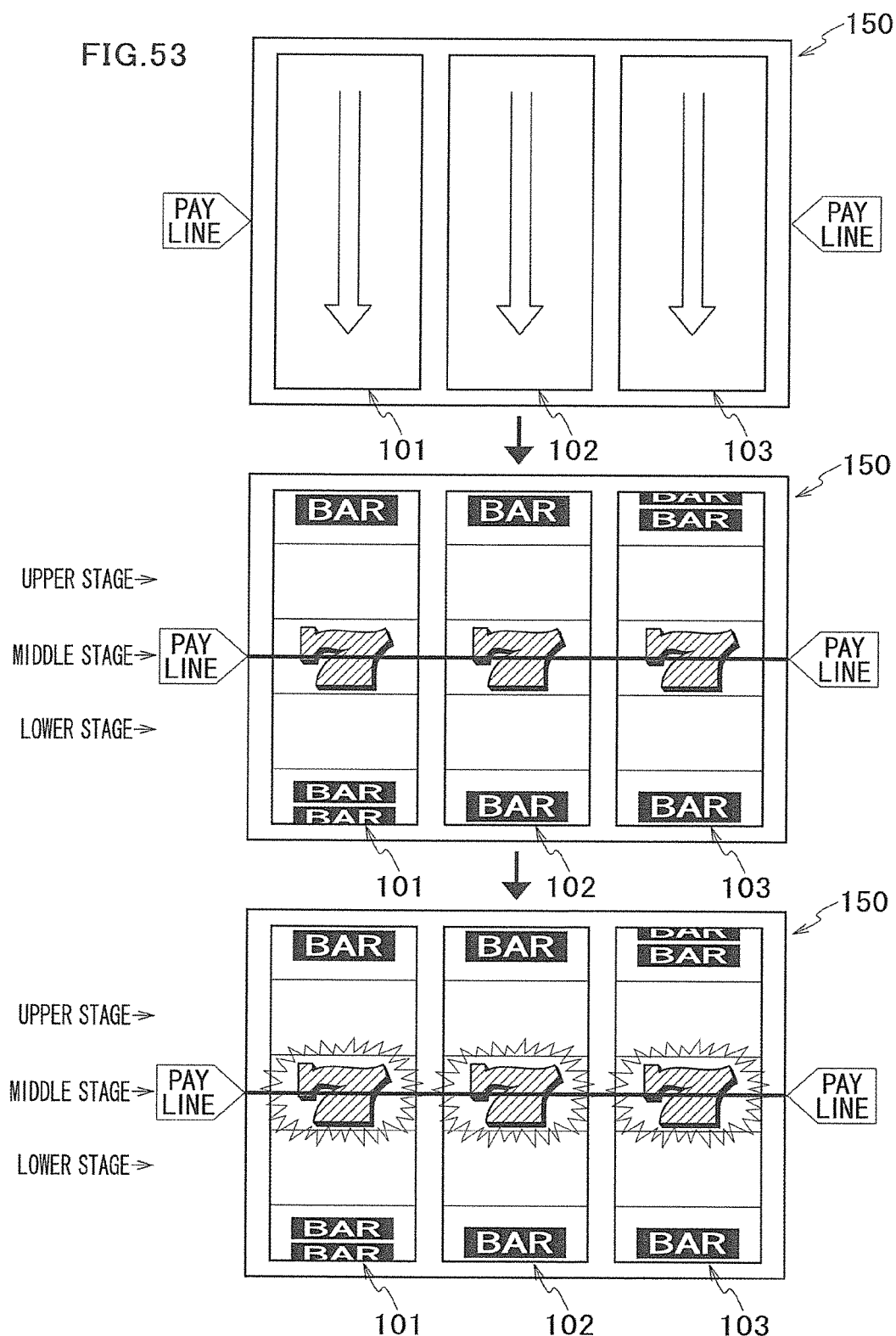
FIG. 53 illustrates game progress in the slot machine of the embodiment of the present invention.

The main CPU 71 then executes a symbol display control process (S17). In this symbol display control process, as shown in FIG. 53, the scroll of the reels 101 to 103 starts, and after a predetermined time elapses, the to-be-stopped symbols corresponding to the reels 101 to 103 selected in the symbol random determination process in S14 stop one by one in the middle stage of the display window 150 (on the payline). That is, 9 symbols including the to-be-stopped symbols are displayed in the display window 150 (in the upper stage, the middle stage, and the lower stage). For example, when the to-be-stopped symbol on the first reel 101 is "RED7", the to-be-stopped symbol on the second reel 102 is "RED7", and the to-be-stopped symbol on the third reel 103 is "RED7", "RED7", "RED7", and "RED7" are rearranged in the middle stage of the display window 150 (on the payline) as shown in FIG. 53.

The above-described effect image (indication effect) of emitting light from the eyes of the dragon character 132 is continued until all of the reels 101 to 103 stop. Alternatively, the eyes of the dragon character 132 may emit light for an instant as the effect image, or the effect image of emitting light from the eyes of the dragon character 132 may be performed before the scroll of each of the reels 101 to 103.

The main CPU 71 then executes a payout amount determination process (S18). In this process, payout is determined based on a symbol combination displayed on the payline with reference to the symbol combination table (see FIG. 46) stored in the RAM 73 and the value (1BET, 2BET, or 3BET) of the bet counter, and the payout is stored in the payout amount storage area provided in the RAM 73. For example, when the value of the bet counter is "3" and the symbol combination displayed on the payline is three "3BAR", "180" credits are determined as the payout with reference to the symbol combination table and stored in the payout amount storage area in the RAM 73.

When the value of the bet counter is "3" (MAXBET) and the symbol combination displayed on the payline is three "RED7", progressive payout is awarded. To be more specific, the value of a progressive payout counter (described later) stored in the RAM 73 is awarded as the progressive payout. The value of the progressive payout counter is calculated in such a way that, in a later-described JP increment process in S52, a value calculated by multiplying the value of the bet counter by an increment rate (0.01) is accumulatively added to the initial value of 300 in each game play. When the progressive payout is won, the value of the progressive payout counter is stored in the payout amount storage area of the RAM 73. Furthermore, when the progressive payout is won, a message which notifies that the progressive payout has been awarded is displayed. To be more specific, messages "CONGRATULATIONS!", "PROGRESSIVE WIN", and "XXXXXXXX CREDITS" are displayed on the upper image display panel 131.

Then a payout process is executed (S19). The main CPU 71 adds the value stored in the payout amount storage area to the value of the credit counter in the RAM 73.

Then the main CPU 71 determines whether a free game trigger is established for 9 symbols rearranged in the display window 150 (S20). To be more specific, whether three "FEATURE" are rearranged on the payline is determined (see FIG. 46). When the free game trigger is established (S20: YES), a later-described free game process is executed (S21).

In the meanwhile, when the free game trigger is not established (S20: NO) or after the free game process (S21), the routine proceeds to S12.

According to the arrangement above, the indication occurrence probability for determining whether to perform the effect image (indication effect) of emitting light from the eyes of the dragon character 132 corresponds to a symbol combination determined in the symbol random determination process, and the symbol combination determined in the symbol random determination process is based on the symbol random determination table. On this account, the indication occurrence probability for determining whether to perform the effect image (indication effect) of emitting light from the eyes of the dragon character 132 can be changed by the probability (WEIGHT) of rearrangement of each symbol in the symbol random determination table. On this account, whether to perform the effect image (indication effect) of emitting light from the eyes of the dragon character 132 is finely adjustable by the probability of rearrangement of each symbol in the symbol random determination table and the indication occurrence probability in the indication effect table. This makes it possible to avoid monotonousness in the indication effect in the slot game.

(Bet/Start-Check Process)

Now the bet/start-check process will be described with reference to FIG. 51.

To begin with, the main CPU 71 determines whether credit data has been received from the PTS device 700 (S41). The credit data is sent from the PTS device 700 to the main CPU 71, for example, when the IC card is inserted into the card insertion slot and when the bill entry 60 receives a genuine bill.

When the credit data is received (S41: YES), the main CPU 71 adds the amount indicated by the received credit data to the value of the credit counter (S42).

After the step S42 or when determining in S41 that no credit data is received (S41: NO), the main CPU 71 determines whether or not the value stored in the credit counter is 0 (S43). When determining that the value of the credit counter is 0 (S43: YES), the main CPU 71 goes back to S41.

When the main CPU 71 determines that the value of the credit counter is not 0 (S43: NO), the main CPU 71 permits operation acceptance of the BET buttons (1-BET button 34, 2-BET button 35, and 3-BET button 36) (S44).

Then the main CPU 71 determines whether an operation of the BET button is detected (S45). When an operation of the bet button by a player is detected by the bet switch (1-BET switch 34S, 2-BET switch 35S, or 3-BET switch 36S), the main CPU 71 performs addition to the value of the bet counter in the RAM 73, based on the type of the BET button (S46).

Subsequently, the main CPU 71 determines whether the value of the bet counter is at the maximum (S47). When determining that the value of the bet counter is at the maximum (S47: YES), the main CPU 71 prohibits the update of the value of the bet counter (S48). After S48, when determining in S47 that the value of the bet counter is not at the maximum (S47: NO), the main CPU 71 enables operation of the spin button 46 (S49).

After S49, the main CPU 71 determines whether an operation of the spin button 46 is detected (S50). When the main CPU 71 determines that an operation of the spin button 46 is not detected (S50: NO), the routine proceeds to S41.

In the meanwhile, when the main CPU 71 determines that operation of the spin button 46 is detected (S50: YES), the main CPU 71 subtracts the value of the bet counter calculated in S46 from the value of the credit counter (S51).

The main CPU 71 then executes a JP increment process (S52). In the JP increment process, as the resource of the progressive payout, the value of the progressive payout counter in the RAM 73 is incremented by a value calculated by multiplying the value of the bet counter calculated in S46 by an increment rate (0.01 but may be optionally set) set in the present embodiment. For example, when the value of the bet counter calculated in S46 is "3", 3×0.01=0.03 credit is added to the value of the progressive payout counter. In the present embodiment, the initial value of the progressive payout counter is 300 credits. Therefore, in the progressive payout counter, a value calculated by multiplying the value of the bet counter by the increment rate (0.01) is accumulatively added to the initial value of 300 in each game play.

Then the bet/start-check process is terminated.

(Free Game Process)

Figure 52:
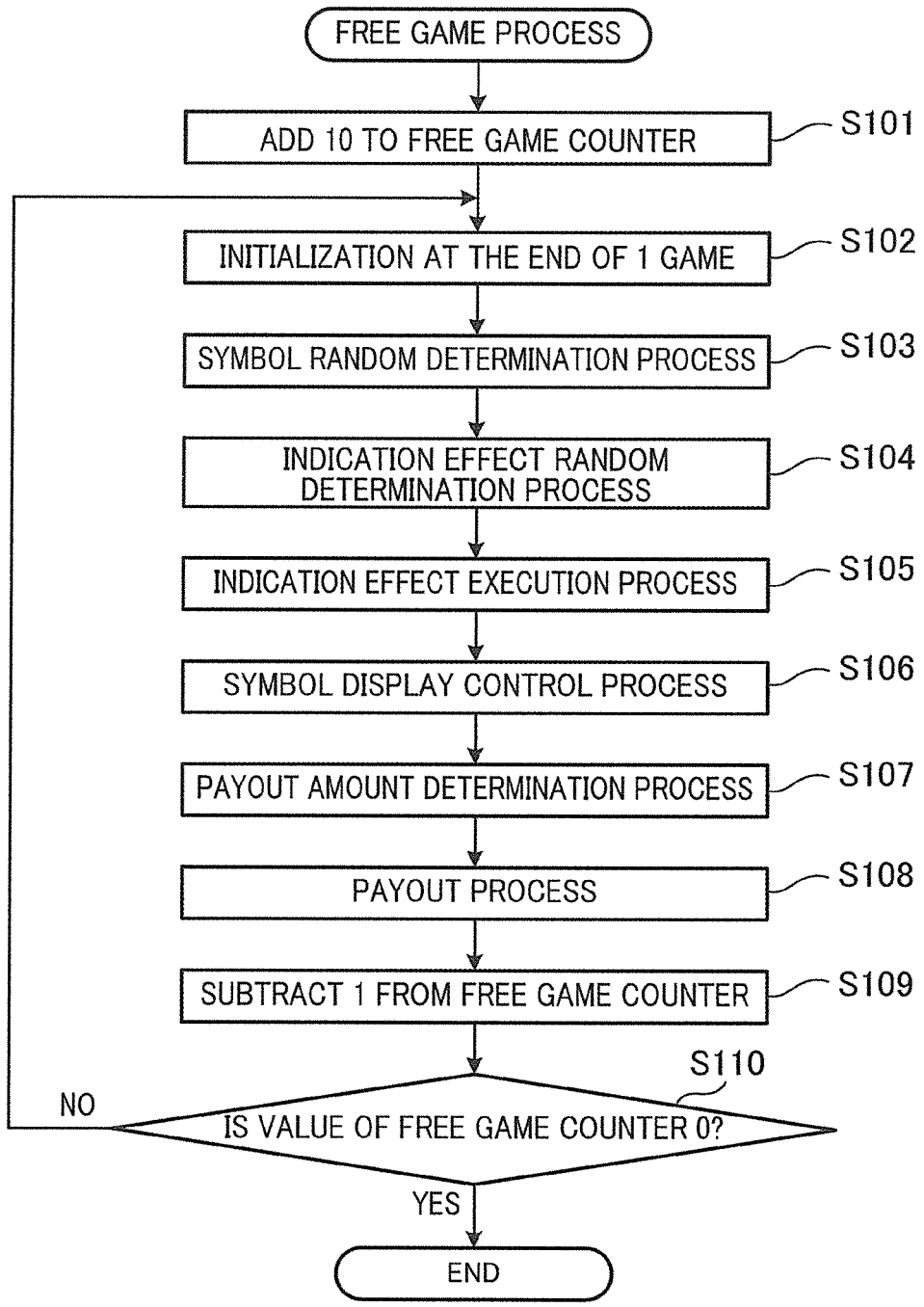
FIG. 52 is a flowchart of a free game process of the slot machine related to the embodiment of the present invention.

The following describes a free game process with reference to FIG. 52. FIG. 52 is a flowchart of a free game process of the slot machine related to the embodiment of the present invention.

To begin with, the main CPU 71 adds "10" to the free game play counter (stored in the RAM 73) and stores the resultant number (S101). This allows the player to play the slot game 10 times without newly placing a bet.

Then the main CPU 71 executes an initializing process at the end of each round of the game in the same manner as in S12 (S102). This process clears data in a working area of the RAM 73, which becomes unnecessary at the end of each play of the free game, e.g., the bet amount, symbols randomly determined, and the like. This process clears data in a working area of the RAM 73, which becomes unnecessary at the end of each play of the free game, e.g., the bet amount, symbols randomly determined, and the like.

Subsequently, the main CPU 71 executes the symbol random determination process as in S14 (S103). In this symbol random determination process, with reference to the RAM 73, three to-be-stopped symbols (on the first reel 101, the second reel 102, and the third reel 103) to be rearranged in the middle stage of the display window 150 (on the payline) are randomly determined based on the probabilities defined in the symbol random determination table (see FIG. 47).

Subsequently, the main CPU 71 executes the indication effect random determination process as in S15 (S104). In this indication effect random determination process, with reference to the indication effect table (see FIG. 48), an indication occurrence probability corresponding the three to-be-stopped symbols (on the first reel 101, the second reel 102, and the third reel 103) to be rearranged in the middle stage of the display window 150 (on the payline) as a result of the symbol random determination process in S103 is determined, and whether to execute the indication effect is randomly determined based on the determined indication occurrence probability.

Subsequently, the main CPU 71 executes the indication effect execution process as in S16 (S105). In this indication effect execution process, when the indication effect is to be performed as a result of the indication effect random determination process in S104, as shown in FIG. 54, the effect image that eyes of the dragon character 132 displayed on the upper image display panel 131 emit light is displayed.

The main CPU 71 then executes the symbol display control process as in S17 (S106). In this symbol display control process, as shown in FIG. 53, the scroll of the reels 101 to 103 starts, and after a predetermined time elapses, the to-be-stopped symbols corresponding to the reels 101 to 103 selected in the symbol random determination process in S103 stop one by one in the middle stage of the display window 150 (on the payline). That is, 9 symbols including the to-be-stopped symbols are displayed in the display window 150 (in the upper stage, the middle stage, and the lower stage).

The main CPU 71 then executes the payout amount determination process as in S18 (S107). In this process, payout is determined based on a symbol combination displayed on the payline with reference to the symbol combination table (see FIG. 46) stored in the RAM 73 and the value (1BET, 2BET, or 3BET) of the bet counter, and the payout is stored in the payout amount storage area provided in the RAM 73.

Subsequently, the main CPU 71 executes the payout process (S108). The main CPU 71 adds the value stored in the payout amount storage area to the value of the credit counter in the RAM 73.

The main CPU 71 then subtracts "1" from the value of the free game play counter (S109).

Subsequently, the main CPU71 71 determines whether the value of the free game play counter is "0" (S110). When determining that the value of the free game play counter is not "0" (S110: NO), the main CPU 71 proceeds to S102.

In the meanwhile, when the value on the free game play counter is "0" (S110: YES), the free game process is terminated.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process exe cuted on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specific ation occasionally personifies the processes carried out in the steps or blocks, these processes are essentially executed by various devices. Further, the other structures necessary for the steps or blocks are obvious from the above descriptions.

What is claimed is:
1. A gaming machine comprising:
 a display device configured to display a game result by rearranging reels on which symbols are arranged;
 a storage device configured to store symbol random determination tables in which a probability of rearrangement of each of the symbols on the reels is defined and a symbol random determination table determination table in which a probability of random selection of one of the symbol random determination tables is defined for each of the symbol random determination tables; and
 a controller configured to execute the processes of:
 (1-1) accepting, via a gaming medium acceptor, a gaming medium with a monetary value which establishes a credit balance for a player;
 (1-2) receiving, via a bet input device, a bet whose amount is designated by the player based on the credit balance;
 (1-3) executing a game as a result of the player's bet;
 (1A) at start of each game play, randomly selecting one of the symbol random determination tables based on the symbol random determination table determination table;
 (1B) randomly determining symbols to be rearranged, based on the symbol random determination table selected in the process (1A); and
 (1C) displaying the symbols determined in the process (1B) on the display device by rearranging the reels, wherein,
 the symbol random determination tables include a symbol random determination table in which a probability of rearrangement of a predetermined symbol is high as compared to the other symbol random determination tables, the storage device further includes symbol random determination table determination tables, and the symbol random determination table determination tables include a high-probability symbol random determination table determination table in which the symbol random determination table in which the probability of rearrangement of the predetermined symbol is high is more probable to be selected as compared to the other symbol random determination table determination tables.

2. The gaming machine according to claim 1, wherein, the symbol random determination tables further include a symbol random determination table in which a probability of rearrangement of a predetermined symbol on reels one short of the all reels is high as compared to the other symbol random determination tables.

3. The gaming machine according to claim 1, wherein, the controller is configured to further execute a process of awarding a payout in accordance with a combination of the symbols rearranged on the display device, and the symbol random determination tables further include, in regard to a probability of rearrangement of a symbol, a low-expectation symbol random determination table which is arranged so that expectation on the payout is low as compared to the other symbol random determination tables and a high-expectation symbol random determination table which is arranged so that expectation on the payout is high as compared to the other symbol random determination tables.

4. The gaming machine according to claim 1, wherein, the game is run in a normal mode in which a symbol random determination table is randomly selected based on the another symbol random determination table determination table or in a high-probability mode in which a symbol random determination table is randomly selected based on the high-probability symbol random determination table determination table, and the symbol random determination tables are shared between the normal mode and the high-probability mode.

5. A gaming machine comprising:
a display device configured to display a game result by rearranging reels on which symbols are arranged;
a storage device including: symbol random determination tables in which probabilities of rearrangement of a predetermined symbol are different as a probability of rearrangement of each symbol on the reels is set;
a normal mode symbol random determination table determination table in which a probability of random selection of one of the symbol random determination tables is defined for each of the symbol random determination tables;
a high-probability mode symbol random determination table determination table in which a probability of random selection of one of the symbol random determination tables is defined for each of the symbol random determination tables such that a symbol random determination table in which a probability of rearrangement of the predetermined symbol is high is more probable to be selected as compared to the normal mode symbol random determination table determination table; and a high-probability mode shifting random determination table in which a winning probability of shifting from a normal mode to a high-probability mode is defined; and a controller configured to execute the processes of:
(1-1) accepting, via a gaming medium acceptor, a gaming medium with a monetary value which establishes a credit balance for a player;
(1-2) receiving, via a bet input device, a bet whose amount is designated by the player based on the credit balance;
(1-3) executing a game as a result of the player's bet;
(1A) at start of game play in the normal mode, randomly selecting one of the symbol random determination tables based on the normal mode symbol random determination table determination table;
(1B) randomly determining symbols to be rearranged based on the symbol random determination table selected in the process (1A);
(1C) displaying the symbols determined in the process (1B) on the display device by rearranging the reels;
(1D) when a combination of the symbols to be rearranged as a result of the process (1 B) is a combination of a specific symbol, randomly determining whether to shift the normal mode to the high-probability mode based on the high-probability mode shifting random determination table;
(1E) when shifting from the normal mode to the high-probability mode occurs as a result of the process (1D), at start of game play in the high-probability mode, randomly selecting one of the symbol random determination tables based on the high-probability mode symbol random determination table determination table;
(1F) randomly determining symbols to be rearranged, based on the symbol random determination table selected in the process (1E); and
(1G) displaying the symbols determined in the process (1F) on the display device by rearranging the reels.

6. The gaming machine according to claim 5, wherein, there are plural combinations of the specific symbol, and in the high-probability mode shifting random determination table, the winning probability of shifting from the normal mode to the high-probability mode is defined in accordance with the combinations of the specific symbol.

7. The gaming machine according to claim 5, wherein, the symbol random determination tables are shared between the normal mode and the high-probability mode.

8. A gaming machine comprising:
a display device configured to display a game result by rearranging reels on which symbols including a specific symbol are arranged;
an input device capable of receiving an input of plural types of bet values; and
a controller configured to accept, via a gaming medium acceptor, a gaming medium with a monetary value which establishes a credit balance for a player, receive, via the input device, a bet whose bet value is input by the player based on the credit balance, execute a game as a result of the player's bet, and control game modes which are different in a probability of rearrangement of the specific symbol, the controller switching the game mode in accordance with a bet value input by the input device, wherein, the game modes include a high-probability mode in which a probability of rearrangement of the specific symbol is high as compared to another game mode, and the controller is configured to further execute the processes of:

determining whether a bet value received by the input device is equal to or larger than a predetermined value;

when the bet value received by the input device is equal to or larger than the predetermined value, running a game in the high-probability mode;

switching the game mode from another game mode to the high-probability mode when symbols rearranged on the display device include the specific symbol; and in the game after switching to the high-probability mode, the high-probability mode is maintained when the bet value received by the input device is equal to or larger than the predetermined value, or the high-probability mode is switched to another game mode when the bet value is smaller than the predetermined value.

9. A gaming machine comprising:

a display device configured to display a game result by rearranging reels on which symbols are arranged;

an effect means;

a storage device configured to store, for each of the reels, a symbol random determination table in which a probability of rearrangement of each symbol is defined and an indication effect table in which a combination of symbols to be rearranged is associated with an occurrence probability of a predetermined indication effect executed by the effect means; and a controller configured to execute the processes of:

(1-1) accepting, via a gaming medium acceptor, a gaming medium with a monetary value which establishes a credit balance for a player;

(1-2) receiving, via a bet input device, a bet whose amount is designated by the player based on the credit balance;

(1-3) executing a game as a result of the player's bet;

(1A) at start of game play, randomly determining a combination of symbols to be displayed on the display device based on the symbol random determination table;

(1B) determining whether to execute the predetermined indication effect by the effect means with reference to the combination of the symbols determined in the process (1A) and the indication effect table;

(1C) executing the predetermined indication effect by the effect means when it is determined in the process (1B) that the predetermined indication effect is executed by the effect means; and (1D) displaying a combination of the symbols determined in the process (1A) on the display device by rearranging the reels, wherein, in the symbol random determination table and the indication effect table, values calculated by multiplying rates of rearrangement of combinations of symbols by occurrence probabilities of the indication effect corresponding to the respective combinations in each unit game are all added up as an overall probability, and the overall probability is higher than a rate of rearrangement of a combination of a predetermined symbol.

* * * * *